US012809667B2

(12) United States Patent
Davies et al.

(10) Patent No.: US 12,809,667 B2
(45) Date of Patent: Nov. 24, 2026

(54) TASK EXECUTION SCHEDULING

(71) Applicant: NVIDIA Corporation, Santa Clara, CA (US)

(72) Inventors: Albert Davies, San Jose, CA (US); Akash Bellubbi, San Jose, CA (US); Ashutosh Tadkase, Los Altos Hills, CA (US); Bruce Holmer, Belmont, CA (US); Suraj Das, Santa Clara, CA (US); Vishanth Iyer, San Jose, CA (US); Sever Topan, Burnaby (CA); Ian Tramble, Mountain View, CA (US); Linda Xiong, Milpitas, CA (US); Sharat Janapareddy, San Jose, CA (US); Ranvijay Singh, Santa Clara, CA (US); John Lore, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 666 days.

(21) Appl. No.: 17/929,672

(22) Filed: Sep. 2, 2022

(65) Prior Publication Data

US 2023/0100552 A1 Mar. 30, 2023

Related U.S. Application Data

(60) Provisional application No. 63/261,827, filed on Sep. 29, 2021.

(51) Int. Cl.
*G06F 9/48* (2006.01)
*G06F 9/30* (2018.01)
(Continued)

(52) U.S. Cl.
CPC ........ *G06F 9/4881* (2013.01); *G06F 9/30087* (2013.01); *G06F 9/3836* (2013.01);
(Continued)

(58) Field of Classification Search
CPC .. G06F 9/4881; G06F 9/30087; G06F 9/3836; G06F 9/485; G06F 9/5055;
(Continued)

(56) References Cited

U.S. PATENT DOCUMENTS

| | | | |
|---|---|---|---|
| 5,901,308 | A | 5/1999 | Cohn et al. |
| 6,260,057 | B1 | 7/2001 | Eykholt et al. |

(Continued)

FOREIGN PATENT DOCUMENTS

WO WO-2020139959 A1 * 7/2020 .......... G05D 1/0248

OTHER PUBLICATIONS

Nadathur, R.S., et al., "Scheduling Task Dependence Graphs with Variable Task Execution Times onto Heterogeneous Multiprocessors", Proceedings of the 8th ACM international conference on Embedded software, pp. 149-158 (Oct. 19, 2008).

(Continued)

*Primary Examiner* — Aimee Li
*Assistant Examiner* — An-An Ngoc Nguyen
(74) *Attorney, Agent, or Firm* — Sanders IP Law

(57) ABSTRACT

One or more embodiments of the present disclosure relate to identifying, based on application data associated with a computing application that includes a set of runnables, a plurality of scheduling branches associated with scheduling execution of at least a subset of runnables of the set of runnables. Further, one or more embodiments relate to selecting a scheduling branch from the plurality of scheduling branches based at least on a coupling constraint that is applied to related runnables of at least the subset of runnables. The related runnables may include a first runnable that is designated for execution on a first compute engine and that triggers execution of a second runnable on a second compute engine. In addition, one or more embodiments may (Continued)

relate to determining an execution schedule of the set of runnables based at least on the scheduling branch.

20 Claims, 37 Drawing Sheets

(51) Int. Cl.

| | |
|---|---|
| ***G06F 9/38*** | (2018.01) |
| ***G06F 9/50*** | (2006.01) |
| ***G06F 9/54*** | (2006.01) |
| ***G06F 11/07*** | (2006.01) |
| ***G06F 21/52*** | (2013.01) |

(52) U.S. Cl.
CPC ............ *G06F 9/485* (2013.01); *G06F 9/5055* (2013.01); *G06F 9/5083* (2013.01); *G06F 9/544* (2013.01); *G06F 11/0721* (2013.01); *G06F 11/0757* (2013.01); *G06F 21/52* (2013.01); *G06F 2221/2151* (2013.01)

(58) Field of Classification Search
CPC .... G06F 9/5083; G06F 9/544; G06F 11/0721; G06F 11/0757; G06F 21/52; G06F 2221/2151; G06F 2209/509; G06F 2201/865; G06F 11/3055; G06F 11/3419; G06F 11/302
See application file for complete search history.

(56) References Cited

U.S. PATENT DOCUMENTS

| | | | | |
|---|---|---|---|---|
| 6,317,774 | B1 * | 11/2001 | Jones | G06F 9/4887 718/107 |
| 7,120,783 | B2 | 10/2006 | Fotland et al. | |
| 7,318,128 | B1 | 1/2008 | Dice | |
| 8,381,203 | B1 | 2/2013 | Beylin et al. | |
| 8,407,322 | B1 | 3/2013 | Sasikumar et al. | |
| 8,533,682 | B2 | 9/2013 | Kakulamarri et al. | |
| 8,688,430 | B1 | 4/2014 | Bonebakker et al. | |
| 8,806,498 | B2 | 8/2014 | Seo et al. | |
| 8,972,784 | B2 | 3/2015 | Mangold et al. | |
| 9,317,408 | B2 | 4/2016 | Szpak | |
| 9,489,289 | B2 | 11/2016 | Hu et al. | |
| 10,162,675 | B2 | 12/2018 | Aoyama | |
| 10,235,207 | B2 | 3/2019 | Hebert et al. | |
| 10,885,698 | B2 | 1/2021 | Muthler et al. | |
| 2006/0112377 | A1 | 5/2006 | Nacul et al. | |
| 2010/0088704 | A1 | 4/2010 | Ringseth et al. | |
| 2010/0110083 | A1 | 5/2010 | Paltashev et al. | |
| 2011/0046837 | A1 * | 2/2011 | Khosla | G05D 1/104 701/26 |
| 2011/0161964 | A1 | 6/2011 | Piazza et al. | |
| 2012/0222043 | A1 | 8/2012 | Gounares et al. | |
| 2013/0305260 | A1 * | 11/2013 | Backensto | G06F 9/4887 718/108 |
| 2014/0006751 | A1 | 1/2014 | Aliseychik et al. | |
| 2015/0169363 | A1 | 6/2015 | Anderson et al. | |
| 2016/0085591 | A1 | 3/2016 | Taira et al. | |
| 2016/0147710 | A1 | 5/2016 | Franke et al. | |
| 2017/0039124 | A1 | 2/2017 | Kiel et al. | |
| 2017/0060642 | A1 * | 3/2017 | Castellano | G06F 9/45558 |
| 2018/0011734 | A1 | 1/2018 | Iwata | |
| 2018/0246802 | A1 | 8/2018 | Cerny et al. | |
| 2018/0276040 | A1 | 9/2018 | Hosmani et al. | |
| 2019/0056972 | A1 | 2/2019 | Zhou et al. | |
| 2019/0130056 | A1 * | 5/2019 | Tascione | G06F 30/20 |
| 2019/0317740 | A1 | 10/2019 | Herr et al. | |
| 2020/0127861 | A1 | 4/2020 | Doshi et al. | |
| 2020/0159572 | A1 * | 5/2020 | Jägemar | G06F 9/5066 |
| 2020/0334081 | A1 | 10/2020 | Vezier et al. | |
| 2021/0019445 | A1 | 1/2021 | Arnold | |
| 2021/0064421 | A1 | 3/2021 | Zebchuk et al. | |
| 2021/0109796 | A1 | 4/2021 | Fozard et al. | |
| 2021/0157651 | A1 * | 5/2021 | Duluk, Jr. | G06T 1/20 |
| 2021/0216357 | A1 | 7/2021 | Mohan Thampi et al. | |
| 2022/0276893 | A1 | 9/2022 | Wood et al. | |
| 2022/0326988 | A1 | 10/2022 | Gunter et al. | |
| 2022/0358421 | A1 | 11/2022 | Oetsch et al. | |
| 2023/0020191 | A1 | 1/2023 | Kim et al. | |

OTHER PUBLICATIONS

Yoshitake, O., et al., "Performance of Static and Dynamic Task Scheduling for Real-Time Engine Control System on Embedded Multicore Processor", Lecture Notes in Computer Science, pp. 1-14 (Mar. 2021) (Abstract).
Lu, C., et al., "Robustness of modular multi-layered software in the automotive domain: a wrapping-based approach", 2009 IEEE Conference on Emerging Technologies & Factory Automation, pp. 1-8, (Sep. 22, 2009).
Gupta, M., et al., "Implementing Cross-Device Atomics in Heterogeneous Processors", 2015 IEEE International Parallel and Distributed Processing Symposium Workshop, pp. 659-668, (May 2015) (Abstract).
"Taxonomy and Definitions for Terms Related to Driving Automation Systems for On-Road Motor Vehicles", Standard No. J3016_201806, SAE International, On-Road Automated Driving (ORAD) Committee, p. 35 (Jun. 15, 2018).
"Taxonomy and Definitions for Terms Related to Driving Automation Systems for On-Road Motor Vehicles", Standard No. J3016_201609, SAE International, On-Road Automated Driving (ORAD) Committee, p. 30 (Sep. 30, 2016).

* cited by examiner

```
VERSION 15.0.0
SCHEDULE 101
HYPEREPOCH{
11:      [11];
}
SYNC{
s0(1,{clientGpuY:CPU()},{clientGpuX:CUDA(1)});
s1(1,{clientGpuX:CPU()},{clientGpuY:CPU(),clientGpuY:CUDA(1)});
s2(0,{clientGpuY:CUDA(1)},{framesync_default_hyperepoch0_epoch0:CPU()});
s3(0,{clientGpuX:CUDA(1)},{clientGpuY:CUDA(1)});
s4(1,{clientGpuY:CPU()},{clientGpuY:CPU(),framesync_default_hyperepoch0_epoch0:CPU()});
s5(1,{framesync_default_hyperepoch0_epoch0:CPU()},{clientGpuX:CPU()});
}
FENCE{
f0(s0,1);
f1(s1,1);
f2(s2,0);
f3(s3,0);
f4(s4,1);
f5(s5,1);
}
CLIENT(default:clientGpuY(6)) {
RESOURCES{
CUDA CUDA_STREAMY;
}
```

FIG. 2H

```
CORE(0, 11) {
WOF f1;
CUF  f3, CUDA_STREAMY;
CUF  f1, CUDA_STREAMY;
CUSUB [11: 0 % 1] f2, CUDA_STREAMY, submit(4);
SIG  f4;
CALL [11: 0 % 1] test1(3);
SIG  f0;
}
}
CLIENT(default:clientGpuX(9)) {
RESOURCES{
CUDA CUDA_STREAMX;
}
CORE(0, 11) {
WOF f5;
CUF  f0, CUDA_STREAMX;
CUSUB [11: 0 % 1] f3, CUDA_STREAMX, submit(7);
SIG  f1;
}
}
CLIENT(default:framesync_default_hyperepoch0_epoch0(11)) {
RESOURCES{
}
CORE(0, 11) {
LOG 0(10);
SIG  f5;
WOF [11: 0 % 1] f4;
WOF [11: 0 % 1] f2;
LOG 1(10);
WUP 100000000(10);
}
}
```

FIG. 2I

| RoadRunnerCamera.RTRRSample.featureTrackerNode_processHost | |
|---|---|
| # | 345 |
| 99.9% ET | 4166.65 us |
| 99.0% ET | 3694.95 us |
| 95.0% ET | 3392.32 us |
| start_violation_frac | 0.00% |
| deadline_violation_frac | 100.00% |
| exec_time_violation_frac | 50.00% |
| over_provision_frac | -45.57% |

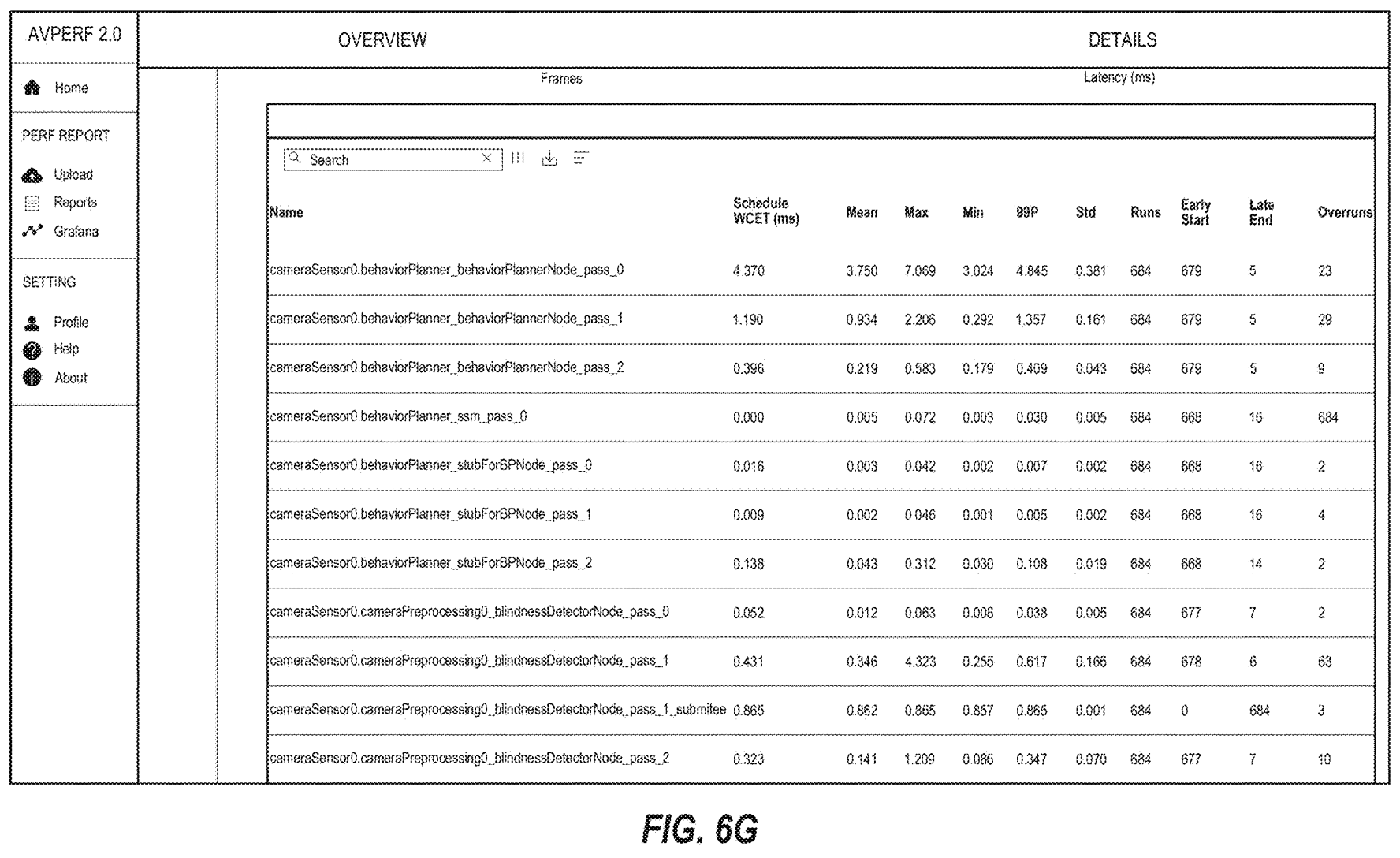

AVPERF 2.0

Home

PERF REPORT

Upload

Reports

Grafana

SETTING

Profile

Help

About

OVERVIEW DETAILS

Frames Latency (ms)

Search

| Name | Schedule WCET (ms) | Mean | Max | Min | 99P | Std | Runs | Early Start | Late End | Overruns |
|---|---|---|---|---|---|---|---|---|---|---|
| cameraSensor0.behaviorPlanner_behaviorPlannerNode_pass_0 | 4.370 | 3.750 | 7.069 | 3.024 | 4.845 | 0.381 | 684 | 679 | 5 | 23 |
| cameraSensor0.behaviorPlanner_behaviorPlannerNode_pass_1 | 1.190 | 0.934 | 2.206 | 0.292 | 1.357 | 0.161 | 684 | 679 | 5 | 29 |
| cameraSensor0.behaviorPlanner_behaviorPlannerNode_pass_2 | 0.396 | 0.219 | 0.583 | 0.179 | 0.409 | 0.043 | 684 | 679 | 5 | 9 |
| cameraSensor0.behaviorPlanner_ssm_pass_0 | 0.000 | 0.005 | 0.072 | 0.003 | 0.030 | 0.005 | 684 | 668 | 16 | 684 |
| cameraSensor0.behaviorPlanner_stubForBPNode_pass_0 | 0.016 | 0.003 | 0.042 | 0.002 | 0.007 | 0.002 | 684 | 668 | 16 | 2 |
| cameraSensor0.behaviorPlanner_stubForBPNode_pass_1 | 0.009 | 0.002 | 0.046 | 0.001 | 0.005 | 0.002 | 684 | 668 | 16 | 4 |
| cameraSensor0.behaviorPlanner_stubForBPNode_pass_2 | 0.138 | 0.043 | 0.312 | 0.030 | 0.108 | 0.019 | 684 | 668 | 14 | 2 |
| cameraSensor0.cameraPreprocessing0_blindnessDetectorNode_pass_0 | 0.052 | 0.012 | 0.063 | 0.008 | 0.038 | 0.005 | 684 | 677 | 7 | 2 |
| cameraSensor0.cameraPreprocessing0_blindnessDetectorNode_pass_1 | 0.431 | 0.346 | 4.323 | 0.255 | 0.617 | 0.166 | 684 | 678 | 6 | 63 |
| cameraSensor0.cameraPreprocessing0_blindnessDetectorNode_pass_1_submitee | 0.865 | 0.862 | 0.865 | 0.857 | 0.865 | 0.001 | 684 | 0 | 684 | 3 |
| cameraSensor0.cameraPreprocessing0_blindnessDetectorNode_pass_2 | 0.323 | 0.141 | 1.209 | 0.086 | 0.347 | 0.070 | 684 | 677 | 7 | 10 |

*FIG. 6G*

TASK EXECUTION SCHEDULING

RELATED APPLICATION

This application claims priority to U.S. Provisional Patent Application No. 63/261,827, filed Sep. 29, 2021, and titled "DETERMINISTIC SCHEDULING FOR AUTONOMOUS MACHINE APPLICATIONS," the entire contents of which are incorporated by reference in the present disclosure.

BACKGROUND

On a complex System on a Chip (SoC), the behavior exhibited by components (e.g., software components) depends on the state of the SoC as exhibited by any number of factors—such as the state of other software components (e.g., locks, memory contention, etc.), the state of the hardware (e.g., caches, physical memory, etc.), a combination thereof, and/or other factors. Scheduling the execution of tasks in such a way that satisfies real-time constraints in such an environment can be difficult.

For example, dynamic scheduling and preemption of tasks by engine-specific schedulers leads to a rapid increase in the size of the state space that may be validated and certified for timing determinism—which may include validating worst case behavior with respect to satisfying timing guarantees of the system applications. Furthermore, existing real-time schedulers are generally centric to Central Processing Units (CPU) and do not provide ordering and timing guarantees on heterogeneous hardware platforms (e.g., hardware platforms that include multiple components such as Graphics Processing Units (GPU), accelerators, etc.). For example, priority-based real-time scheduling policies—such as rate monotonic scheduling and earliest deadline first—are dynamic in nature and may involve preemption, a mechanism well-studied and optimized on CPUs, but expensive on non-CPU engines (e.g., GPUs, accelerators, parallel processing units (PPUs), data processing units (DPUs), vector processing units (VPUs), etc.). Therefore, using this type of scheduling process, achieving determinism is challenging as the resulting schedule is dynamic and may not always complete processing within a given time allocation.

Static scheduling may generate a static schedule offline—e.g. perform Task A at time Ta, then perform Task B at time Tb, then perform Task C at time Tc, and so on—that is then executed later. However, traditional static scheduling is often deficient for optimizations across heterogeneous hardware platforms. For example, traditional static scheduling may fail to account for underlying differences between different types of compute engines that may be included in heterogenous systems.

As a result, typical dynamic or static scheduling may be inadequate for certain scheduling instances, such as scheduling of systems having multiple different types of engines and corresponding processes that may have various safety requirements. Such systems scheduled in this manner may accordingly not be approved for performing at various safety integrity levels that require satisfying more stringent standards.

An example of such an instance may include large scale deployment of autonomous or semi-autonomous machines—such as autonomous or semi-autonomous vehicles, robots, industrial machines, etc.—which may require the reconciliation of two competing goals: performance and safety. For example, perception algorithms that may be executed by such systems—such as object detection algorithms, object tracking algorithms, lane and road boundary detection, etc.—are compute intensive, and require programmers to exploit parallelism between different hardware engines (e.g., central processing units (CPUs), graphics processing units (GPUs), accelerators, and/or the like). In order to comply with safety and efficacy requirements, autonomous or semi-autonomous systems may need to be deterministic.

SUMMARY

One or more embodiments of the present disclosure may relate to management of the execution of tasks ("task management"). In one or more embodiments, the task management may include scheduling the execution of tasks by generating an execution schedule of the tasks corresponding to the computing applications. The execution schedule may indicate execution sequencing and/or timing of the tasks. In these or other embodiments, the schedule may be generated such that different compute engines (e.g., GPUs, CPUs, accelerators, VPUs, DPUs, PPUs, etc.) of the runtime system are able to manage the execution of corresponding tasks with limited oversight by a central compute engine (e.g., a CPU). For example, as discussed in detail in the present disclosure, a synchronization primitive fencing framework may be established in which the different compute engines may determine when to execute their correspondingly scheduled tasks based on timing fences of synchronization primitives. In these or other embodiments the scheduling may be deterministic such that worst case behavior of the executing systems may be validated for timing guarantees and such that the schedule may be followed (e.g., the order and the timing may be followed) on a consistent basis in multiple runs of the schedule.

In these or other embodiments, the task management may include executing the tasks by a runtime system that may include multiple compute engines. The execution may be based on the generated execution schedule with limited oversight, such as discussed above.

In these or other embodiments, the task management may include monitoring the execution of the tasks to verify that the generated schedule is being followed. For example, the monitoring may include monitoring compliance with execution timing constraints associated with tasks, compliance with execution sequence constraints associated with the tasks and/or health of at least a portion of the runtime system. In these or other embodiments, the task management may include performing one or more remedial operations based on the monitoring.

Additionally or alternatively, the task management may include controlling which schedules are being implemented at certain times such that the task management may also include controlling execution of the modules or computing applications and their underlying runnables or tasks. In these or other embodiments, the task management may include performing one or more quality assurance operations with respect to one or more of: the execution schedules, the execution of the execution schedules, underlying code of the computing applications, or any combination thereof.

Additionally or alternatively, the task management may include gathering and storing information related to runs of the execution schedule. In these or other embodiments, the task management may include performing an analysis of the gathered information. The analysis may include determining one or more performance metrics or characteristics associated with implementation of the execution schedule based on the gathered information. Additionally or alternatively, the task management may include performing one or more operations that may adjust the execution schedule based on the analysis.

BRIEF DESCRIPTION OF THE DRAWINGS

The present systems and methods for sensor data processing are described in detail in the present disclosure with reference to the attached drawing figures, wherein:

FIGS. 2H and 2I illustrate code of an example execution schedule, according to one or more embodiments of the present disclosure;

FIGS. 6E-6H illustrate example visualizations of runtime information, according to one or more embodiments of the present disclosure;

DETAILED DESCRIPTION

Figure 1A:
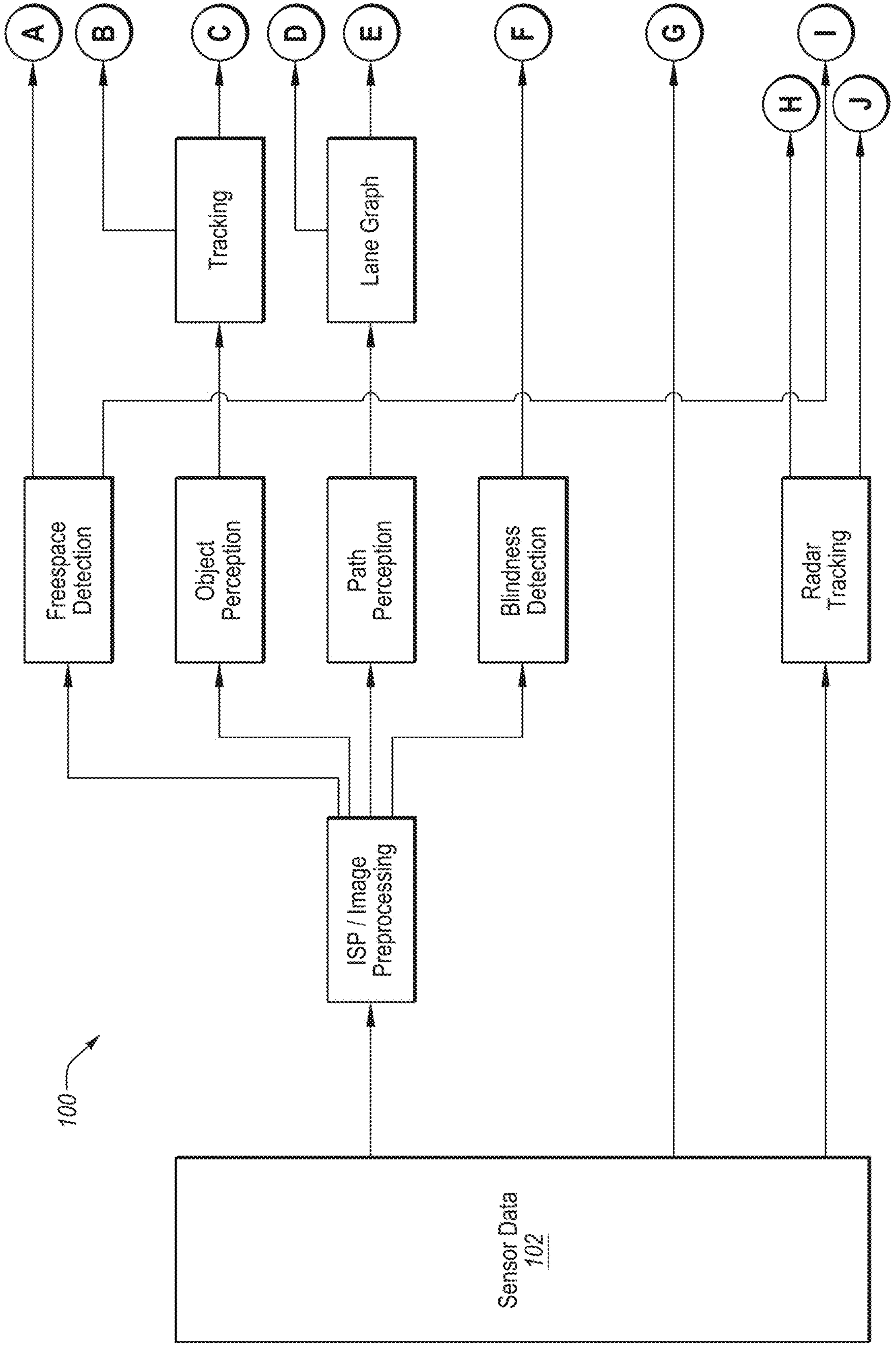
FIGS. 1A and 1B illustrate an example data flow diagram for a sensor processing pipeline of an ego-machine, in accordance with one or more embodiments of the present disclosure.

Computing systems may be configured to perform work (e.g., computing processes, tasks, operations, functions, etc.). In these or other embodiments, the work may be dictated by one or more computing applications.

In the present disclosure, a computing application may generally include a set of tasks that correspond to operations organized for performance with respect to execution of process. In some embodiments, the computing application may be implemented as code and/or routines configured to allow or enable a computing system to perform its corresponding set of tasks (e.g., the computing applications may include a set of computer-readable instructions).

In these or other embodiments, a computing application may include one or more modules. The modules may respectively include a particular set of tasks organized to perform a respective process. The overall process of a computing application may accordingly include the respective processes of the modules included therein. Further, reference to a "computing application" may accordingly refer to the modules and/or tasks associated therewith with the understanding that a single module may also be considered a computing application. As such, reference to a "computing application" may refer to a single module or may correspond to multiple modules. Further, one or more computing applications may include one or more sub-computing applications. In addition, in various portions of the present disclosure "computing applications" and "modules" may be referenced together (e.g., as follows "computing applications or modules") or may be referenced alone without referring to the other. Instances in which one is referred to alone without the other are not meant to be limiting such that the concepts in the text that refers to one alone may also apply to the other that is not specifically mentioned.

As discussed in detail in the present disclosure, one or more embodiments of the present disclosure relate to the management of tasks of computing applications that may be executed by a heterogenous computing system. In the present disclosure, a "heterogenous computing system" may include multiple software and/or hardware engines (referred to generally as "compute engines") configured to operate together in the performance of computing work. For example, the heterogenous computing system may perform work across a set of compute engines that may include one or more: operating system processes, virtual machines, systems on chip, Central Processing Units (CPUS), Graphics Processing Units (GPUs), hardware accelerators (e.g., a deep learning accelerator (DLA), a programmable vision accelerator (PVA), etc.), or any combination thereof.

Further, in the present disclosure, reference to a "runnable" may include an atomic unit of work, such as an engine specific task or operation or a submitter task or operation (e.g., a CPU may have a submitter runnable that triggers another runnable on another engine, such as a GPU or accelerator—in such an example, the GPU or accelerator task may be referred to as a submittee runnable or task). Further, in some embodiments, an "engine specific task" may refer to tasks that may run only on a particular engine or resource. As such, a runnable may correspond to a function level boundary that is constrained to a single engine, while the collective tasks of a computing application or module may be executed using any number of different runnables and/or engines or resources. Further, a runnable may accordingly be a type of task. In many examples given in the present disclosure, runnables are discussed and described. However, such description is not meant to be limiting in that such description may apply to tasks and corresponding task management that may not necessarily be considered runnables.

One or more embodiments of the present disclosure may relate to management of the execution of tasks ("task management"). In one or more embodiments, the task management may include scheduling the execution of tasks by generating an execution schedule of the tasks corresponding to the computing applications. The execution schedule may indicate execution sequencing and/or timing of the tasks. For example, the execution schedule may indicate an execution order of the tasks, which engine may execute a respective task, and/or timing constraints with respect to the tasks (e.g., how much time is allotted for each respective task and/or timing regarding when the respective tasks should begin and/or end). In these or other embodiments the scheduling may be deterministic such that worst case behavior of the executing systems may be validated for timing guarantees and such that the schedule may be followed (e.g., the order and the timing may be followed) on a consistent basis in multiple runs of the schedule.

In these or other embodiments, the task management may include executing the tasks by a runtime system that may include multiple compute engines. The execution may be based on the generated execution schedule. Further, the execution schedule may be generated such that the different compute engines of the runtime system are able to manage the execution of corresponding tasks with limited oversight by a central compute engine. For example, as discussed in detail in the present disclosure, a synchronization primitive fencing framework may be established in which the different compute engines may determine when to execute their correspondingly scheduled tasks based on timing fences of synchronization primitives.

In these or other embodiments, the task management may include monitoring the execution of the tasks to verify that the generated schedule is being followed. For example, the monitoring may include monitoring compliance with execution timing constraints associated with tasks, compliance with execution sequence constraints associated with the tasks and/or health of at least a portion of the runtime system (e.g., of a system task manager configured to help direct execution of the tasks). In these or other embodiments, the task management may include performing one or more remedial operations based on the monitoring.

Additionally or alternatively, the task management may include controlling which schedules are being implemented at certain times such that the task management may also include controlling execution of the modules or computing applications and their underlying runnables or tasks. In these or other embodiments, the task management may include performing one or more quality assurance operations with respect to one or more of: the execution schedules, the execution of the execution schedules, underlying code of the computing applications, or any combination thereof.

Additionally or alternatively, the task management may include gathering and storing information related to runs of the execution schedule. In these or other embodiments, the task management may include performing an analysis of the gathered information. The analysis may include determining one or more performance metrics or characteristics associated with implementation of the execution schedule based on the gathered information. Additionally or alternatively, the task management may include performing one or more operations that may adjust the execution schedule based on the analysis.

One or more of the embodiments disclosed herein may relate to the task management of computing applications that may be performed by ego-machines, which may include any applicable machine or system that is capable of performing one or more autonomous or semi-autonomous operations. Example ego-machines may include, but are not limited to, vehicles (land, sea, space, and/or air), robots, robotic platforms, etc. By way of example, the ego-machine computing applications may include one or more applications that may be executed by an autonomous vehicle or semi-autonomous vehicle, such as an example autonomous vehicle 1400 (alternatively referred to herein as "vehicle 1400" or "egovehicle 1400) described with respect to FIGS. 14A-14D. In the present disclosure, reference to an "autonomous vehicle" or "semi-autonomous vehicle" may include any vehicle that may be configured to perform one or more autonomous navigation or driving operations. As such, such vehicles may also include vehicles in which an operator is required or in which an operator may perform such operations as well.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for hosting real-time streaming applications, systems for presenting one or more of virtual reality content, augmented reality content, or mixed reality content, systems for performing light transport simulation, systems for performing collaborative content creation for 3D assets, systems implemented at least partially using cloud computing resources, and/or other types of systems.

In some embodiments, the task management may relate to the scheduling, execution, and/or monitoring of tasks that correspond to a sensor processing pipeline of an ego-machine. For instance, FIGS. 1A and 1B illustrate an example data flow diagram for a sensor processing pipeline 100 of an ego-machine, in accordance with one or more embodiments of the present disclosure.

Figure 1B:
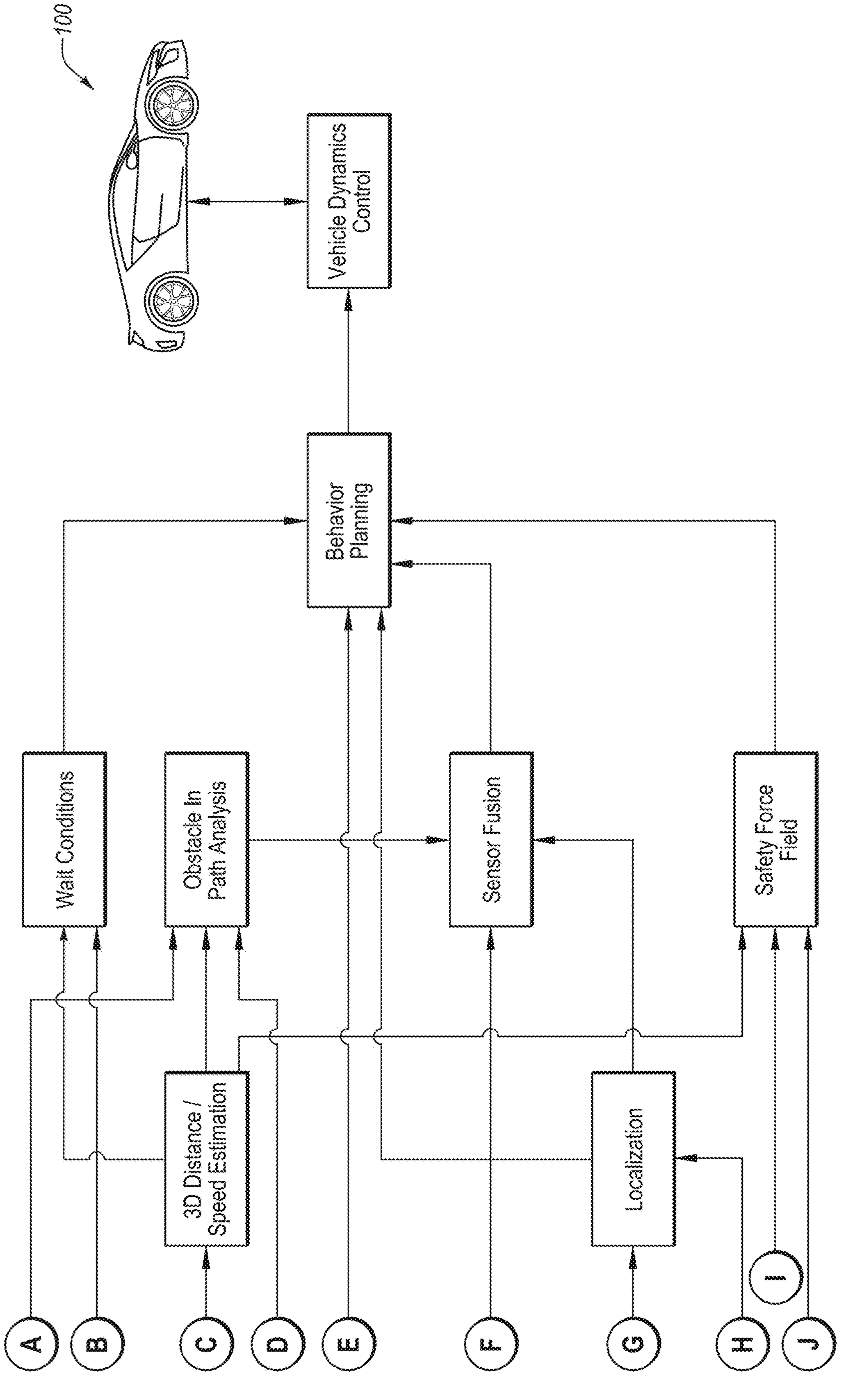

For example, FIGS. 1A and 1B illustrate various different computing applications that may perform one or more processes based on sensor data 102 captured by one or more sensors. In the illustrated example, the processes performed by the applications of the sensor pipeline 100 may be used to obtain information and/or make determinations that may be used by a vehicle dynamics control (VDC) system to determine and implement control decisions.

In some embodiments, the generated and/or received sensor data 102 may include, without limitation, sensor data from any of the sensors of the vehicle 1400 of FIG. 14 (and/or other vehicles, machines, or objects, such as robotic devices, water vessels, aircraft, trains, construction equipment, VR systems, AR systems, etc., in some examples). In some embodiments, the sensor data 102 may be obtained from sensors that are disposed on or otherwise associated with an ego-machine. Additionally or alternatively, the sensor data 102 may be obtained from one or more other ego-machines and/or information sources, such as sensors disposed on or otherwise associated with static objects, such as sensors of a security system, in a parking garage, in a smart cities application (e.g., sensors distributed throughout a location or region), traffic monitoring sensors, and/or the like.

By way of example and not limitation, the sensor data 102 may include data obtained from one or more sensors including: one or more LIDAR (LIght Detection And Ranging) sensors, one or more cameras (stereo camera(s), wide-view camera(s) (e.g., fisheye cameras), infrared camera(s), surround camera(s) (e.g., 360 degree cameras), long-range and/or mid-range camera(s) etc.), one or more global navigation satellite systems (GNSS) sensors (e.g., Global Positioning System sensor(s)), one or more inertial measurement unit (IMU) sensors (e.g., accelerometer(s), gyroscope(s), magnetic compass(es), magnetometer(s), etc.), one or more speed sensors (e.g., for measuring the speed of the ego-machine), one or more RADAR (RAdio Detection And Ranging) sensors, one or more ultrasonic sensors, one or more microphones etc.

Although reference is primarily made herein to real-world sensor data, this is not intended to be limiting, and the sensor data may alternatively or additionally be generated by any of the sensors of the ego-machine, another machine, and/or another system (e.g., a virtual vehicle in a simulated environment, a robotics system, a drone system, etc.). In some examples, the sensor data may include the sensor data generated by one or more forward-facing sensors, side-view sensors, and/or rear-view sensors. In embodiments, any number of sensors may be used to incorporate multiple fields of view (e.g., the fields of view of the long-range cameras 1498, the forward-facing stereo camera 1468, and/or the forward facing wide-view camera 1470 of FIG. 14B) and/or sensory fields (e.g., of a LIDAR sensor 1464, a RADAR sensor 1460, etc.).

The sensor data may be useful for performing any number of operations for a current operating mode or state of the ego-machine. As indicated in the present disclosure, such operations may be dictated by one or more computing applications. For non-limiting examples, as illustrated in FIGS. 1A and 1B, the computing applications and corresponding processes may include sensor data pre-processing, drivable freespace detection, object perception, path perception, sensor blindness or visibility distance detection, tracking, lane graph generation, distance and/or speed estimation, localization, RADAR tracking, safety force field computations (and/or other object or collision avoidance computations), sensor fusion, object in path analysis (OIPA), wait condition detection, behavior planning, vehicle dynamics control, and/or other computing applications.

Although the present disclosure may be described with respect to an example autonomous vehicle 1400, this is not intended to be limiting. For example, the systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although one or more aspects of the present disclosure may be described with respect to or in the context of task management of ego-machines, this is not intended to be limiting, and the systems and methods described herein may be used in applicable context where task management over a heterogenous system may be used. Examples of other fields of application may include augmented reality, virtual reality, mixed reality, robotics, security and surveillance, autonomous or semi-autonomous machine applications, industrial equipment technologies (e.g., refineries, control systems, etc.), medical device technologies (e.g., surgical equipment, medical device implants, etc.), aerodynamic and/or aerospace technologies, defense equipment technologies (e.g., rockets, satellites, drones, etc.), and/or any other technology spaces where scheduling may be used to distribute the performance of processing related to computing applications between and among various compute engines.

Further, it should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Additionally or alternatively, various functions may be carried out by a processing system that may be hardwired to perform one or more of the functions. In some embodiments, the systems, methods, and processes described herein may be executed using similar components, features, and/or functionality to those of example autonomous vehicle 1400 of FIGS. 14A-14D, example computing device 1500 of FIG. 15, and/or example data center 1600 of FIG. 16.

Further, the example embodiments described with respect to the Figures of the present disclosure are described in the context of scheduling runnables or tasks of computing applications, but such a description is not meant to be limiting. The principles and disclosures. herein may relate to the scheduling of any other applicable type of task or sets of tasks associated with any sort of computing process.

Figure 2A:
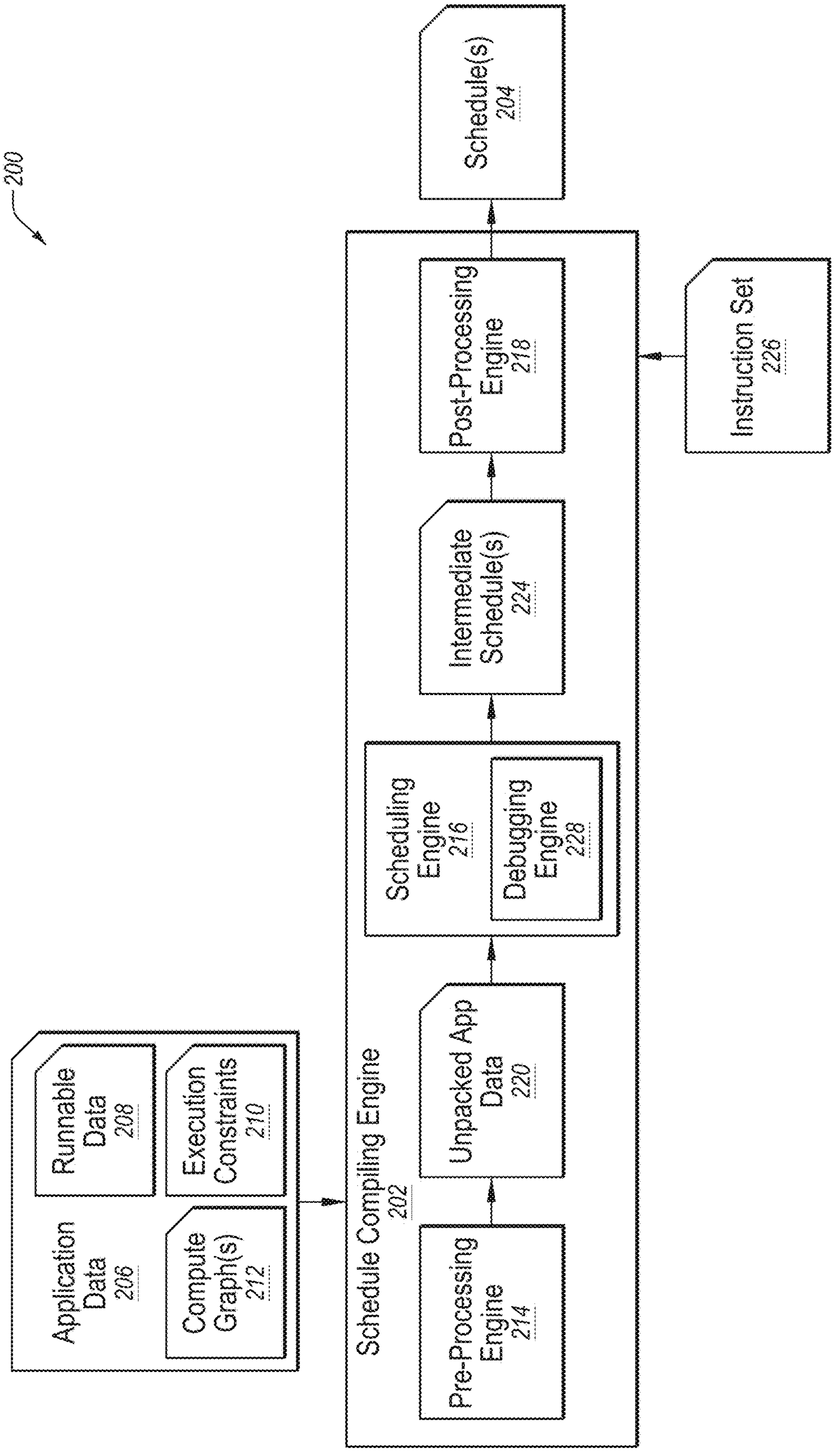
FIG. 2A illustrates an example system associated with generating execution schedules associated with one or more computing applications, according to one or more embodiments of the present disclosure.

Referring now to FIG. 2A, FIG. 2A illustrates an example system 200 associated with generating execution schedules associated with one or more computing applications, according to one or more embodiments of the present disclosure. The system 200 may include a schedule compiling engine 202 ("compiler 202") in some embodiments.

The compiler 202 may include code and routines configured to allow a computing system to perform one or more operations. Additionally or alternatively, the compiler may be implemented using hardware including one or more processors, central processing units (CPUs) graphics processing units (GPUs), data processing units (DPUs), parallel processing units (PPUs), microprocessors (e.g., to perform or control performance of one or more operations), field-programmable gate arrays (FPGA), application-specific integrated circuits (ASICs), and/or other processor types. In some other instances, the compiler 202 may be implemented using a combination of hardware and software. As such, the compiler 202 and/or the computing system on which the compiler 202 may be implemented may be referred to as a compiling system in some embodiments. In the present disclosure, operations described as being performed by the compiler 202 may include operations that the compiler 202 may direct a corresponding computing system to perform. In these or other embodiments, the compiler 202 may be implemented by one or more computing devices, such as that described in further detail with respect to FIG. 15.

The compiler 202 may be configured to generate one or more execution schedules 204 ("schedule(s) 204"). In the example embodiment, the schedules 204 may indicate execution sequencing and/or timing of runnables of a corresponding computing application or module. For example, a particular schedule 204 of a particular computing application may indicate an execution order of the runnables of the particular computing application, which engine may execute a respective runnable, and/or timing constraints with respect to the runnables (e.g., how much time is allotted for each respective runnable and/or timing regarding when the respective runnables should begin and/or end). In these or other embodiments one or more of the schedules 204 may be static (e.g., determined offline and prior to runtime) and deterministic such that the runnables may execute in the same order during every iteration, which may allow for worst case behavior of the executing systems to be validated for timing guarantees. By contrast, a dynamic schedule that may be generated during runtime may not be verifiable as being deterministic. Reference to operations happening "during runtime" in the present disclosure may relate to operations that occur while a corresponding runtime system is executing runnables and/or tasks.

In some embodiments, each schedule 204 may correspond to a respective computing application. Further, given that some computing applications may include one or more modules included therein, one or more schedules 204 may include one or more sub-schedules that respectively correspond to respective modules or sub-applications of a computing application.

In some embodiments, the compiler 202 may be configured to generate one or more of the schedules 204 with respect to a heterogenous runtime system ("runtime system") that may include multiple compute engines, such as described in the present disclosure. In order to effectively execute the sets of operations (e.g., runnables or tasks) of the computing applications or modules, various resources of the runtime system may be used. Examples of the resources may include hardware resources (e.g., a deep learning accelerator (DLA), an artificial intelligence (AI) accelerator, a programmable vision accelerator (PVA) (which may include one or more direct memory access (DMA) systems and/or one or more vector processors (VPUs)), a GPU(s), a CPU(s), a VPU(s), a PPU(s), a DPU(s), etc.), software resources (e.g., CUDA streams, accelerator queues, etc.), and/or scheduling mutexes.

Figure 2B:
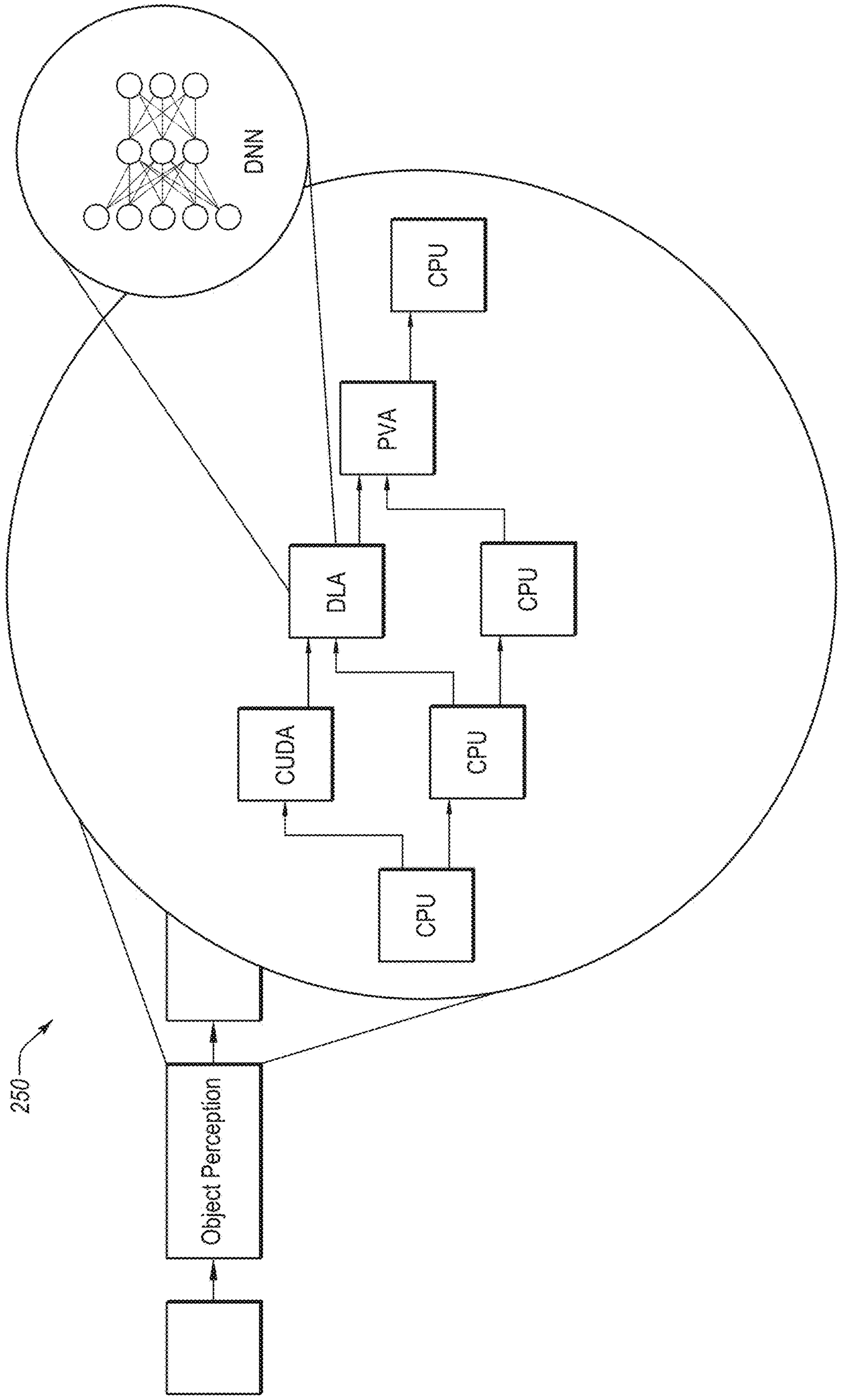
FIG. 2B illustrates an example of various compute engines that may be used in the performance of a process associated with an object perception computing application, in accordance with one or more embodiments of the present disclosure.

By way of example, FIG. 2B illustrates an example of various compute engines that may be used in the performance of a process associated with an object perception computing application 250 ("object perception app 250"), in accordance with one or more embodiments of the present disclosure. In FIG. 2B, each block may correspond to a runnable of the object perception app 250 and may indicate which type of compute engine may execute the corresponding runnable.

Returning to FIG. 2A, more than one computing application or module may use the limited resources of the runtime system such that a challenge of scheduling is to complete the operations of each computing application or module—including each runnable within each computing application or module—using the resources of the runtime system. As such, to perform each runnable of each computing application or module, various different resources may be required and/or these same resources may be required for different computing applications or tasks thereof.

Additionally or alternatively, in some embodiments, the schedules 204 may need to comply with any number of time constraints, safety constraints, efficacy constraints, and/or resource constraints (e.g., hardware and/or software constraints) associated with the corresponding runtime system and/or the computing applications or modules that may be executed by the runtime system (e.g., as indicated in execution constraints 210 included in the app data 206, discussed in further detail in the present disclosure). As such, due to time constraints, safety constraints, and hardware/software resource constraints, in some instances, each of the runnables of a given schedule 204 may need to be mapped in the given schedule 204 to available resources in such a way that one or more (e.g., all) constraints associated therewith are satisfied. The compiler 202 may be configured to generate one or more of the schedules 204 within this framework to account for one or more of the above-enumerated constraints, as compared to other more traditional scheduling systems.

For instance, as described herein, in traditional scheduling systems, there may be either static scheduling or dynamic scheduling. For example, in traditional dynamic scheduling, the system may use a queue, and a runtime scheduler may dynamically determine the ordering of the tasks using the queue as well as priority, first in first out (FIFO), round robin, etc., and may determine the tasks for the compute engines during runtime. These types of systems may use preemption, which adds to the complexity of the system as certain tasks are sent back to the queue due to a current task not having completed processing. In this way, the determinism of the system is reduced or removed, as certain tasks may not be completed, or may be completed later than required to satisfy safety or efficacy constraints.

In addition, the compiler 202 may be configured to generate the schedules 204 such that the schedules 204 may include static ordering in which everything is executed in order. Due to the static nature of the resulting schedules 204, and the lack of preemption, one or more of the schedules 204 may be deterministic such that the same schedule 204 may be used over and over again (e.g., over hundreds, thousands, or millions of hours of operation) with minimal or reduced missed timing or performance targets (e.g., one error or missed target per hundred or thousand hours of operation).

In addition, the generated schedules 204 may support multiple processes on a heterogeneous platform that is extensible to multiple SoCs, multiple virtual machines (VMs), and/or the like. For example, in some embodiments, the schedules 204 may be generated such that each compute engine associated therewith may have one or more queues of runnables available or ready to execute (referred to as "queues" or "processing queues"). As discussed in further detail in the present disclosure, these queues may be blocked and unblocked using various synchronization techniques to orchestrate performance of the work to help ensure a target behavior of an overall application (e.g. to ensure that data dependencies between runnables or tasks are satisfied or to help ensure that a runnable or task always has exclusive access to a compute engine to improve determinism of the system). The queues may be blocked and unblocked by inserting fences between the runnables, where a fence may represent a discrete state (snapshot) of an underlying synchronization primitive. In some embodiments, a synchronization primitive's state may be advanced by signaling it. When a synchronization primitive's state has not reached the fence's snapshot, the fence operates as a barrier and does not allow work to proceed. When the synchronization primitive's state is ahead of the fence snapshot, the fence does not block work in the queue. As also discussed in further detail in the present disclosure, the compiler 202 may thus determine where to fence or insert synchronization primitives and how to use them intelligently such that the runtime system executes the computing applications within a given timeframe in a deterministic way. Further, in the present disclosure, reference to a "fence" may also refer to the corresponding synchronization primitive in some embodiments. Additionally, synchronization primitives on which fences may be generated may be referred to as "sync objects."

In some embodiments, the compiler 202 may be configured to generate the schedules 204 based on computing application data 206 ("app data 206"). The app data 206 may correspond to each of one or more computing applications in some embodiments. In these or other embodiments, the app data 206 may include information related to generating respective schedules 204 for the corresponding computing applications.

For example, in some embodiments, the app data 206 may include runnable (or task) data 208. The runnable data 208 may indicate the runnables that may be associated with a corresponding computing application. In these or other embodiments, the app data 206 may generally include code (e.g., source code) of the corresponding computing application and the runnable data 208 may include the respective code that corresponds to the respective runnables.

The app data 206 may include one or more execution constraints 210. The execution constraints 210 may include one or more constraints that may be directly related to one or more of the runnables ("runnable constraints"). For example, the runnable constraints may include parameters related to when and/or how the runnables may be executed and may include, by way of example, dependencies between the runnables, resource constraints corresponding to respective compute engine types that may be used for execution of the runnables, other resources that may be required for execution of the runnables (e.g., memory constraints, etc.), and respective timing constraints of the runnables.

Additionally or alternatively, the execution constraints 210 may include one or more general execution constraints for the corresponding computing application. For example, the general execution constraints may include, but are not limited to, generally what resources may be used to execute the corresponding computing application or modules—e.g., including which modules or computing applications may share resources and which modules or computing applications may have resource partitioning assigned thereto, such as discussed in further detail in the present disclosure—how many different modules or processes are included in the corresponding computing application, how often to repeat the operations of the corresponding computing application, and/or the distribution of the runnables among a time basis.

In these or other embodiments, the general execution constraints may include constraints associated with the runtime system that is to execute the processes of the computing applications. These constraints may exist to comply with various safety and/or efficacy criteria that may be applied to the underlying system that is to execute the computing applications. For example, the runtime system may have various constraints associated therewith such as latency constraints, worst case response time constraints, throughput constraints, determinism constraints, program flow monitoring constraints, system verification constraints, safety standards or constraints, interrupt management constraints, shared resource constraints, concurrency constraints, Freedom-From-Interference (FFI) constraints, and/or other constraints or considerations. Some example safety constraints may be those included in the safety standards of ISO 26262 including various automotive safety integrity levels (ASILs) and/or efficacy criteria with respect to tracking an object over time (e.g., if tracking is not performed in accordance with the frame rate, the object tracker may end up with higher latency or not capable of providing data that is reliable for real-time or near real-time execution), etc.

Additionally or alternatively, the general execution constraints may include constraints regarding a total amount of time that may be allowed to execute all of the runnables associated with a module and/or computing application (or sub-application). This time basis may be referred to as an "epoch" for the corresponding set of runnables or tasks. In these or other embodiments, the epoch may be based on a refresh rate of input data used by the set of runnables of the corresponding computing application. Further, in the present disclosure, reference to an "epoch" may also refer to execution of the runnables associated therewith.

For example, a particular computing application may include a particular set of runnables or tasks (e.g., corresponding to a particular module) that uses data (e.g., sensor data) that has a refresh rate of 30 hertz (e.g., the component that generates the corresponding data may be, as a non-limiting example, a sensor, such as a camera that operates at a frame rate of 30 frames per second (fps)). In some embodiments, the app data 206 that corresponds to the particular computing application may accordingly indicate that an epoch related to completion of the particular set of runnables is 33.3 milliseconds (ms).

Additionally or alternatively, the general execution constraints may include a completion frequency that may indicate a frequency at which the set of runnables may need to be repeatedly executed to allow for the processing of new input data as it is received. The completion frequency may be based on the input data refresh rate and/or the epoch. For example, the completion frequency for the particular set of runnables discussed above may be 30 Hz or once every 33.3 ms based on the refresh rate of 30 Hz and the epoch duration of 33.3 ms.

In these or other embodiments, the general constraints may include fractional resource mapping constraints. For example, the identified constraints may indicate a respective percentage of one or more resources that may be needed or targeted for execution of the computing applications. During the scheduling discussed in the present disclosure, the compiler 202 may be configured to select runnables during the determination of which runnable to run on which resource according to the indicated usage percentage. For example, the compiler 202 may select a collection of runnables that occupy a percentage of that resource that is less than or equal to the indicated percentage.

As indicated in the present disclosure, a computing application may include multiple modules or sub-applications. Further, different modules or sub-applications may use different types of data (e.g., data from different sources, such as from different sensors) that may correspond to different refresh rates. As such, in some embodiments, a particular computing application that includes multiple modules or sub-applications may have multiple completion deadlines and/or completion frequencies that may respectively correspond to the different modules or sub-applications included therein. As discussed in detail in the present disclosure, the compiler 202 may be configured to account for such circumstances in the generation of the schedules 204.

In some embodiments, one or more elements of the app data 206 may be organized as one or more compute graphs 212. The respective compute graphs 212 may respectively correspond to one or more computing applications. In general, the compute graphs 212 may indicate the framework for scheduling execution of the workload of the corresponding computing applications.

In these or other embodiments, the compute graphs 212 may have a graph structure that may include nodes that represent and indicate the runnables of the respective computing applications to which the compute graphs 212 correspond. The graph structure may also indicate one or more runnable constraints of the runnables included therein. For example, edges between nodes in the compute graph 212 may indicate dependencies between the corresponding runnables. In the present disclosure, the terms "node" and "runnable" (or "task") may be used interchangeably with respect to compute graphs at times such that reference to a "node" of a compute graph may also refer to the corresponding runnable or task, or vice versa.

Additionally or alternatively, the nodes may have certain labels associated therewith (or encoded thereto) that indicate other runnable parameters. By way of example, but not limitation, the nodes may have associated therewith timing labels that may indicate a runtime (e.g., a worst case execution time (WCET)) of the runnables In some embodiments, the WCET may be determined by an tuning engine, such as described at least with respect to FIG. 7.

In these or other embodiments, the nodes may include resource labels that may indicate which resources or resource types may be required for execution of one or more of the runnables. Additionally or alternatively, the resource labels may indicate fractional resource mapping associated with the computing application, such as discussed in the present disclosure.

As another example, the node labels and/or edges of the compute graph 212 may indicate relationships between submitter and submittee runnables. Submitter runnables may include runnables that may be executed on one compute engine (e.g., a CPU) but that may trigger the execution of another runnable on another compute engine (e.g., on a GPU or accelerator). The triggered runnables may be the submittee runnables. Further, nodes that correspond to submitter runnables may be referred to as "submitter nodes" and nodes that correspond to submittee runnables may be referred to as "submittee nodes."

Additional examples of labels associated with nodes may include exclusivity labels that may indicate that the corresponding runnables are mutually exclusive. Mutually exclusive runnables may have a constraint associated therewith such that other runnables marked therewith may not run concurrently with each other. This may be performed using custom resources in the compute graph 212, and the output schedule may capture the exclusivity, but may not include any indication that such exclusivity exists. This ability to mutually exclude any set of runnables and/or corresponding modules to run concurrently may improve the performance of the final schedule during its runtime. For example, if a set of runnables are intensive on the memory, and the memory bus becomes the bottleneck (and increases the execution time of each task), mutual exclusion may help guarantee that they do not run concurrently—thereby improving the execution time of all the runnables involved.

Figure 2C:
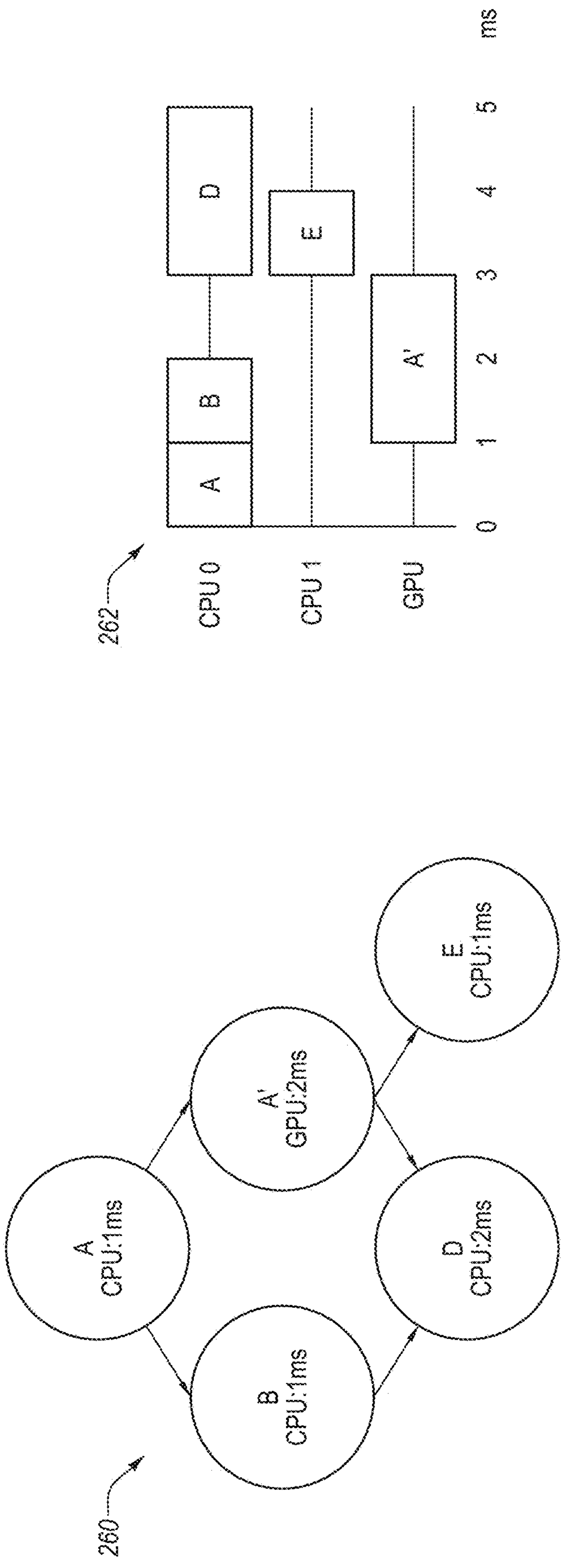
FIG. 2C illustrates an example embodiment of a compute graph, according to one or more embodiments of the present disclosure.

In some embodiments, one or more of the compute graphs 212 may be generated as a directed acyclic graph (DAG) or other graph structure. FIG. 2C illustrates an example embodiment of a compute graph 260 that may be configured as a DAG, according to one or more embodiments of the present disclosure. The compute graph 260 may include nodes related to runnables A, A', B, D, and E that may correspond to an associated computing application. The edges and corresponding arrows between the nodes may indicate the dependencies between the corresponding runnables. For example, the edges from A to B and from A to A' may indicate that both runnables B and A' depend on runnable A. Further, the edges from both B and A' to D may indicate that D depends on both B and A'.

In addition, the nodes of the compute graph 260 may include various labels that may indicate other constraints associated with the corresponding runnables. For example, the labels may indicate a type of compute engine that may be required for executing the corresponding runnable. Additionally or alternatively, the labels may indicate the respective WCETs of the corresponding runnables. In addition, the labeling of A and A' and/or the compute engine types associated with A and A' may indicate that A' is a submittee runnable of A such that the labeling may also indicate that A is a submitter runnable and that A' is a corresponding submittee runnable of A.

Returning to FIG. 2A, in some embodiments, the compiler 202 may receive the app data 206 and generate one or more schedules 204 using the associated data. In some embodiments, the app data 206 that may be obtained (e.g., received, accessed, etc.) by the compiler 202 may be represented in one or more configuration files such as, without limitation, a YAML or JSON file. In these or other embodiments, one or more of the configuration files may represent runnable data 208, execution constraints 210, and/or compute graphs 212 of the app data 206.

In these or other embodiments, the schedules 204 may be organized according to timing frames. The timing frames may be the total amount of time of execution of the runnables of a particular schedule 204. In these or other embodiments, the timing frames may correspond to the epochs of computing applications to be scheduled, such as indicated in the execution constraints 210 of the app data 206.

However, as described in the present disclosure, in some instances, a computing application that may correspond to a particular schedule 204 may include multiple modules having different epochs. Additionally or alternatively, a particular schedule 204 may be generated for more than one computing application, which may also have different epochs.

For example, a first module may have a first epoch that corresponds to first input data that has a first refresh rate and a second module may have a second epoch that corresponds to second input data that has a second refresh rate. The first and second epochs may differ. As such, in some embodiments, all runnables of the first module must be finished within a first timing frame that corresponds to the first refresh rate (e.g., before the next set of first input data is obtained) and all runnables of the second module must be finished within a second timing frame that corresponds to the second refresh rate (e.g., before the next set of second input data is obtained). However, given that the epochs may differ for the first and second modules, scheduling them to use the same resources may result in collisions, which may compromise the execution of the corresponding modules.

In some embodiments, resource partitioning may be used during the scheduling to account for different epochs. The resource partitioning may provide different sets of resources to each time basis or epoch to guarantee there is no collision. As an example, a CPU1, a CPU2, and a GPU of the runtime system may be assigned to the first module, and a CPU3 may be assigned to the second module. However, in many instances resource partitioning may not be practical or as efficient. For example, there may be only x number of CPU cores (e.g., 12) and 1 GPU, so if those resources need to be shared over multiple time bases, this may become a challenge.

In some embodiments, a hyper-epoch may be used to address the challenge of generating a schedule for multiple modules having different epochs. The hyper-epoch may provide a mechanism in which the different epochs are grouped together in a manner such that the same resources may be shared between different modules having different epochs.

In particular, the total amount of time of the hyper-epoch may be based on the longest epoch of the multiple epochs in which the shorter time frames associated with the shorter epochs are repeated a certain number of times such that the hyper-epoch time is greater than or equal to the longest epoch of the multiple epochs, but less than twice the longest epoch. In these or other embodiments, a least common multiple of the different epoch frequencies of the different epochs that may be included in the hyper-epoch may be used to determine the hyper-epoch size.

Figure 2D:
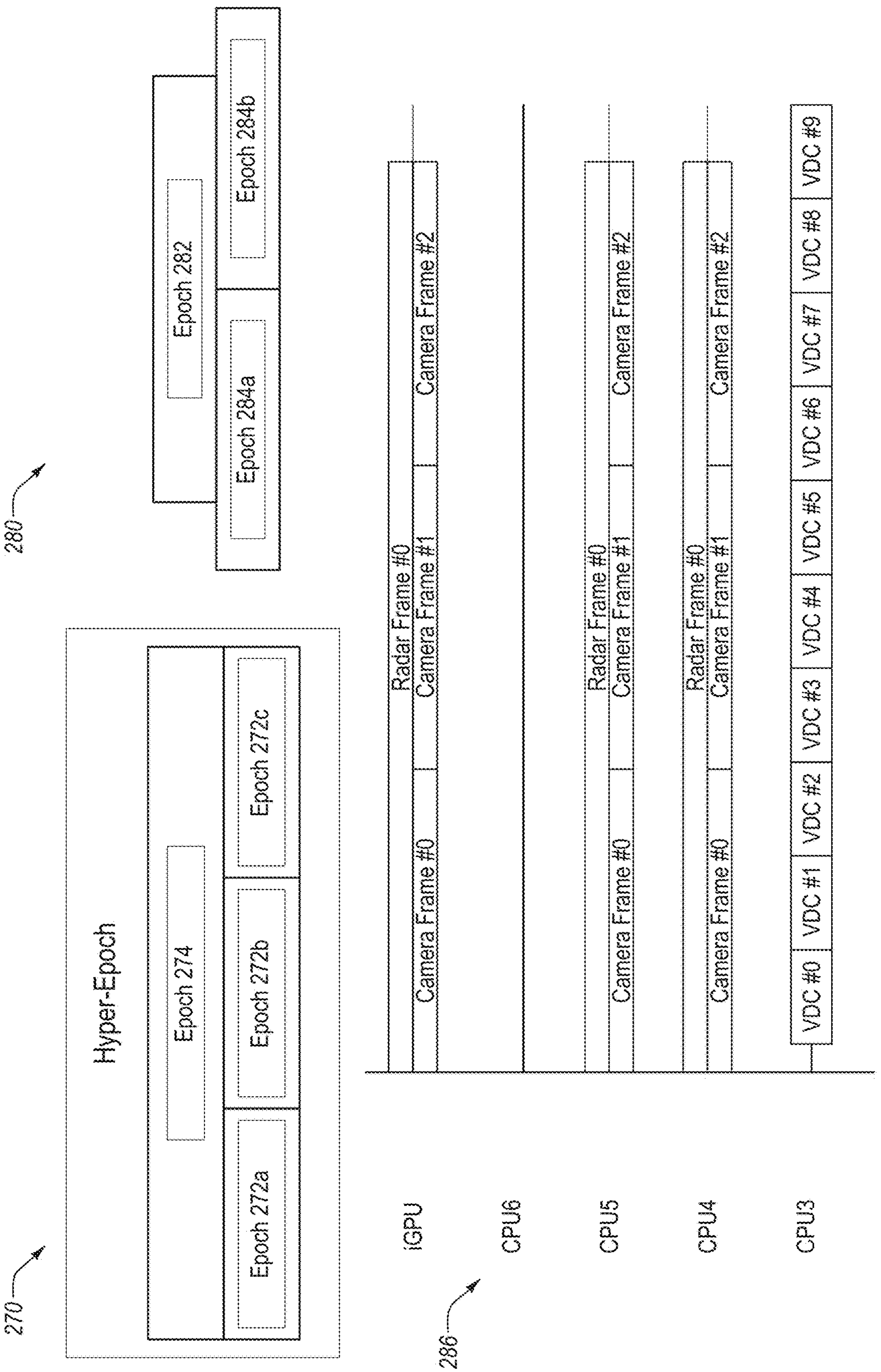
FIG. 2D illustrates example visualizations of hyper-epochs and resource allocation, according to one or more embodiments of the present disclosure.

For example, FIG. 2D illustrates an example hyper-epoch 270 that combines an epoch 272 of a module with an epoch 274 of another module. In the illustrated example, the epoch 274 may be three times as long as the epoch 272. As such, in the illustrated example, the hyper-epoch 270 may be configured such that the epoch 272 may be repeated three times while the epoch 274 is only executed once. As such, these four epochs (three epochs 272 and one epoch 274) may be scheduled together, and at each hyper-epoch 270, the runnables may be spawned again (although one hyper-epoch may include multiple instances of runnables corresponding to grouped epochs of a single data source (e.g., sensor) type, as an example).

FIG. 2D illustrates another example hyper-epoch 280 that corresponds to two different modules may be one in which an epoch 282 of a corresponding first module of the two modules is 1.5 times longer than an epoch 284 of a corresponding second module of the two modules. In this example, the hyper-epoch may include two instances of the epoch 284 such as illustrated.

FIG. 2D also illustrates an example visualization 286 of resource sharing using hyper-epochs and resource partitioning. In the example visualization 286, a camera-data based module ("camera module") and a RADAR-data based module ("RADAR module") are in the same hyper-epoch. In such an example, the camera-data runnables may be completed in the time frame spread across all engines, and the RADAR-data runnables may also be executed over the course of the entire hyper-epoch. In the visualization 286, a vehicle dynamic control (VDC) is also illustrated as including numerous epochs. The VDC is illustrated as corresponding to a separate resource partition different from resource partitions of the camera module and the RADAR module. In embodiments, there may be task data dependencies across resource partitions, but not timing dependencies across different resource partitions.

As such, in some embodiments, the compute engines in the runtime system may be split into resource partitions for scheduling purposes—as described herein—to contain one or more hardware resources to certain modules. Additionally or alternatively, modules and/or computing applications that need access to shared hardware resources (e.g, that are part of a shared sensor processing pipeline) may be included in the same resource partition. Generation of one or more schedules 204 based on a hyper-epoch is discussed in further detail in the present disclosure.

In some instances, the timing frames and a corresponding sync (using some channel such as a TCP/IP, or PCIe) that may be performed—e.g., at the end of the timing frames, before the start of one or more specified runnables and/or at the end of one or more specified runnables—may allow for multiple SoC scheduling to ensure that both SoCs are operating on input for a same or similar point in time. Further, by dividing the execution into frames, the schedule may be quantized to provide synchronization points. The synchronization may help ensure that one SoC does not run ahead of the other if the workload is asymmetrically divided between the two and/or if they operate at different speeds.

In some embodiments, the compiler 202 may include, by way of example but not limitation, a pre-processing engine 214 ("pre-processor 214"), a scheduling engine 216 ("scheduler 216"), and post-processing engine 218 ("post-processor 218"). One or more of these engines may include code and routines configured to allow a computing system to perform one or more operations. Additionally or alternatively, one or more of these engines may be implemented using hardware including one or more processors, central processing units (CPUs) graphics processing units (GPUs), data processing units (DPUs), parallel processing units (PPUs), microprocessors (e.g., to perform or control performance of one or more operations), field-programmable gate arrays (FPGA), application-specific integrated circuits (ASICs), and/or other processor types. In some other instances, one or more of these engines may be implemented using a combination of hardware and software. As such, in some embodiments, one or more of these engines may be configured as or part of a corresponding computing system. In the present disclosure, operations described as being performed by one of these engines may include operations that the corresponding engine may direct a corresponding computing system to perform. Further, the specific discussion and separation of these engines is to help facilitate the explanation of certain operations performed by the compiler 202 and is not meant to a be a limiting implementation.

The pre-processor 214 may be configured to perform pre-processing on the received app data 206 in preparation for operations performed by the scheduler 216. For example, in some embodiments, the pre-processor 214 may be configured to unpack the app data 206 into a simplified form to generate unpacked app data 220. For instance, unpacking of the app data 206 may include identifying one or more modules and/or computing applications that are to be scheduled in a particular schedule 204.

In these or other embodiments, the unpacking may include identifying the different constraints associated with the modules or computing applications that are to be scheduled (e.g., as indicated by the execution constraints 210. For example, the identified constraints may include timing constraints (e.g., WCET of individual runnables, timing frames (e.g., epochs, hyper-epochs, etc.)). Additionally or alternatively, the identified constraints may include dependencies between runnables and/or modules, including identifying submitter and corresponding submittee runnables. In these or other embodiments, the identified constraints may include resource constraints that may indicate which resources may be used by which runnables. Additionally or alternatively, the identified constraints may include resource sharing or partitioning constraints, which may indicate which modules or computing applications may share resources and which modules or computing applications may have resource partitioning assigned thereto.

In these or other embodiments, the unpacking may include identifying compute graphs associated with the modules that are to be scheduled. In these or other embodiments, the unpacking may include organizing the compute graphs of the corresponding modules. The organizing may be based on the timing constraints and/or resource sharing For example, two modules having different epochs may be indicated as sharing the same resources such that a hyper-epoch may correspond to the two modules. In these or other embodiments, the compute graphs of the two modules may be unpacked based on the structure of the hyper-epoch.

Figure 2E:
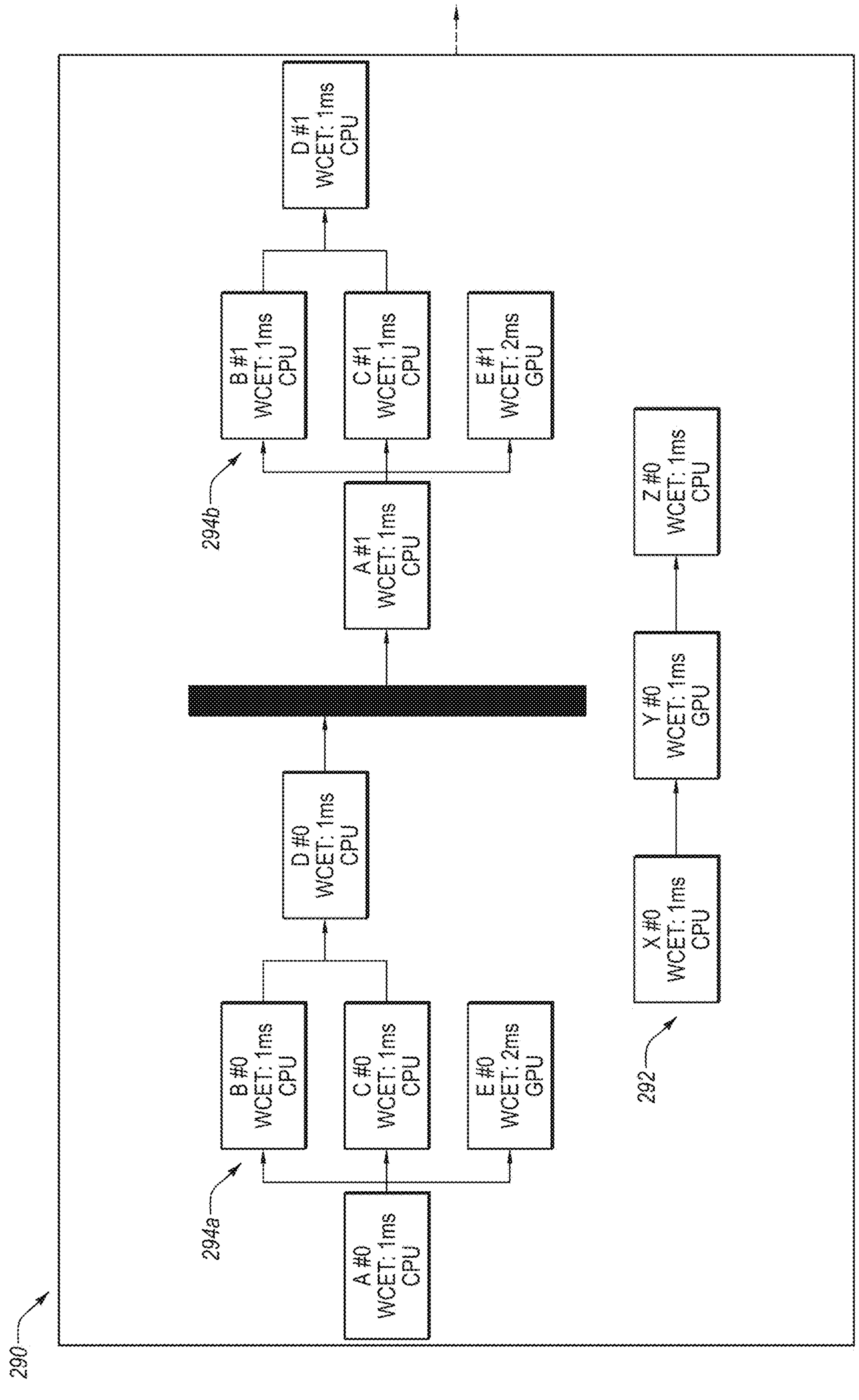
FIG. 2E includes an example compute graph that may be generated based on multiple compute graphs associated with a same hyper-epoch, according to one or more embodiments of the present disclosure.

For example, FIG. 2E includes an example overall compute graph 290 that may be generated by the pre-processor 214 based on multiple compute graphs associated with a same hyper-epoch that corresponds to two separate modules, according to one or more embodiments of the present disclosure. In particular, the overall compute graph 290 may include two instances of a compute graph 294 (instances 294*a* and 294*b*) and one instance of a compute graph 292. The hyper-epoch 280 of FIG. 2D may be an example of the hyper-epoch associated with the overall compute graph 290 in that epochs 284*a* and 284*b* of the hyper-epoch 280 may correspond to the compute graphs 294*a* and 294*b*, respectively, and in that the epoch 282 of the hyper-epoch 280 may correspond to the compute graph 292.

As illustrated in FIG. 2E, two instances of the compute graph 294 may be included in the overall compute graph 290 based on the corresponding hyper-epoch 280 including two epochs 284 of the corresponding module. Further, one instance of the compute graph 292 may be included in the overall compute graph 290 based on the corresponding hyper-epoch 280 including one epoch 282 of the corresponding module. Additionally, the instances 294*a* and 294*b*, and the compute graph 292 may be unrolled to have the timing constraints of their corresponding epochs in the overall compute graph 290, which may be represented based on their placement in the overall compute graph 290 with respect to each other. The pre-processing performed by the pre-processor 214 may accordingly be performed with respect to the overall compute graph 290 as a whole instead of the compute graphs 294 and 292 individually.

The scheduling engine 216 may be configured to determine an intermediate execution schedule 224 ("intermediate schedule 224") based on the unpacked app data 220. For example, the scheduling engine 216 may be configured to determine which runnables to run when and by which compute engines based on the unrolled graph structure(s) and the respective execution constraints of the runnables included in the unpacked app data 220. The intermediate schedule 224 may reflect the determined orders. By way of example, FIG. 2C illustrates an example representation 262 of the scheduling of the runnables of the compute graph 260 of FIG. 2C. The representation 262 is meant to illustrate information that may be included in an intermediate schedule but does not necessarily indicate the actual format of such information.

In some embodiments, the intermediate schedule 224 may be generated according to a high-level programming language. For example, in some embodiments, the intermediate schedule 224 may include a list (e.g., a Python list) that designates the order of runnables on each respective compute engine. In these or other embodiments, the runnables may be represented as a programming object (e.g., a Python object) in which the respective runnable objects include information about the respective dependencies of their corresponding runnables.

In these or other embodiments, the scheduling engine 216 may be configured to perform one or more optimization operations in generating the intermediate schedule 224. The optimization operations may be performed to reduce or minimize the total execution time of the underlying modules or computing applications while satisfying the corresponding constraints. In some embodiments, the scheduling engine 216 may be configured to perform the scheduling in an iterative manner in which the scheduling engine 216 may generate different iterations of the intermediate schedule 224 and then seek to find ways to improve the intermediate schedule 224 by sorting and organizing the runnables.

For example, in some embodiments, the scheduling engine 216 may be configured to sort and organize runnables according to a bubble scheduling algorithm to perform the schedule optimization. In general, the bubble scheduling may include identifying time slots for the execution of runnables. At each time slot, a determination of the available resources may be made, and the scheduling engine 216 may determine where the corresponding runnables should be executed. For example, if there are 5 CPUs (or CPU cores), and 1 CPU runnable is scheduled already, the scheduling engine 216 may know that there are 4 CPUs available at that time, and may find a suitable runnable for that time slot on one or more of the CPUs. In some embodiments, the bubble scheduling may include one or more operations described at least with respect to FIGS. 3A-3B.

Additionally or alternatively, as another example, the scheduling engine 216 may be configured to sort and organize runnables according to a branch and bound (BNB) scheduling algorithm to perform the schedule optimization. In general, the BNB scheduling may include identifying different possible scheduling branches that may occur due to branches in the graph structure. In the present disclosure, "scheduling branches" may include possible permutations of runnable execution orders that may be determined based on one or more of the execution constraints of the graph structure. In some embodiments, the BNB scheduling may include one or more operations described at least with respect to FIGS. 4A-4B.

In these or other embodiments, the scheduling engine 216 may be configured to include one or more partitioning processes with respect to generating the intermediate schedule 224. The partitioning processes may be used to inject modules (and their corresponding runnables) that may be separate from the main computing application in the schedule. The injection may accordingly allow for independence between the corresponding runnables. For example, the partitioning may be such that modules associated with different safety levels (e.g., different ASIL's) than the main computing application and/or quality management (QM) modules may be injected in the intermediate schedule 224 such that the scheduling of the main computing application and the other modules and/or computing applications may be performed together. Further explanation regarding the partitioning is given at least with respect to FIG. 5.

Additionally or alternatively, in some embodiments, the scheduling engine 216 may include a debugging engine 228. The debugging engine 228 may be configured to help facilitate user review/input with respect to generation of the intermediate schedule 224. For example, in some embodiments, the debugging engine 228 may be configured to cause the generation of a graphical user interface (GUI) that provides a representation of the intermediate schedule 224 in its current iteration. For example, the intermediate schedule 224 may be represented in a manner similar to the representation 262 of a schedule in FIG. 2C.

In these or other embodiments, the representation may provide indications of runnable dependencies. The GUI may include any number of applicable visualizations, such as visualizations of DAGs—e.g., such as illustrated in FIG. 2C—current schedule iterations, etc. Further, the GUI may allow for users to zoom in or out on the visualization to allow for a closer analysis of sub portions of the schedule and/or other representations, and/or to allow for an overall assessment of the schedule and/or representations as a whole.

The debugging engine 228 may allow for user input related to placement of runnables in the intermediate schedule 224. For example, the GUI may be configured such that a user may select and move a representation of a runnable from one location in the schedule to another. For instance, a user may move a runnable to an illustrated bubble in the schedule.

In these or other embodiments, the debugging engine 228 may be configured to direct movement of runnables that may be consistent with one or more moving constraints. For example, certain moving constraints may be implemented to account for the heterogenous nature of the runtime system that may execute the finalized schedule that is being compiled. Examples of these execution constraints are discussed in the present disclosure, such as in the context of bubble scheduling and/or BNB scheduling. In some embodiments, the debugging engine 228 may direct movement according to the movement constraints by (e.g., only) allowing movement that complies with the movement constraints. Additionally or alternatively, the directing of the movement may include providing indications or warnings advising that a potential move may violate one or more of the movement constraints. In these or other embodiments, a notification of the type of potential violation may be presented.

In some embodiments, the debugging engine 228 may be configured to pause the generation of the intermediate schedule 224. For example, the debugging engine may be configured to pause the generation after an iteration has been generated. In some embodiments, the pausing may be in response to a user input.

In these or other embodiments, the pausing may be an automatic pausing that is caused by the debugging engine 228. For example, during the iterative generation of the intermediate schedule 224, the debugging engine 228 may be configured to pause the process in response to one or more conditions. The one or more conditions may include a standard breakpoint after a certain number of iterations. In these or other embodiments, the conditions may include a certain number of iterations in which the total runtime of the schedule has not improved by a threshold amount. Additionally or alternatively, the conditions may include single-stepping in which one scheduling decision is made at a time—e.g., where the scheduling decision includes scheduling one runnable on a particular engine at a particular time and/or in a particular order. In these or other embodiments, the debugging engine 228 may accordingly pause the scheduling after each step in instances in which single-stepping is invoked.

The pausing may allow the user to analyze the current iteration of the intermediate schedule 224 and provide input that may help the automated process become more efficient. For example, the visualization may allow the user to identify potential issues and/or improvements in the schedule that may have been missed by the automated process. The user may then accordingly provide input that may change the current iteration.

In these or other embodiments, the debugging engine 228 may be configured to resume the automated generation process, but in which the schedule being analyzed by the automated process includes one or more proposed user changes. Such pausing and resuming of the compiling to allow for the interjection of user input.

Additionally or alternatively, the debugging engine 228 may be configured to log the steps taken during a debugging session to a file. The file may then be used to resume debugging in some embodiments. In these or other embodiments, the file may be used to derive improvements that may be made to the automated scheduling operations. For example, the file may be used to determine if there are certain types of scheduling decisions that are made by the automated process that are also overridden over a threshold percentage of the time. Additionally or alternatively, the file may be used to identify certain types of manual schedule changes that may be better identified and used by the automated process.

Figure 2F:
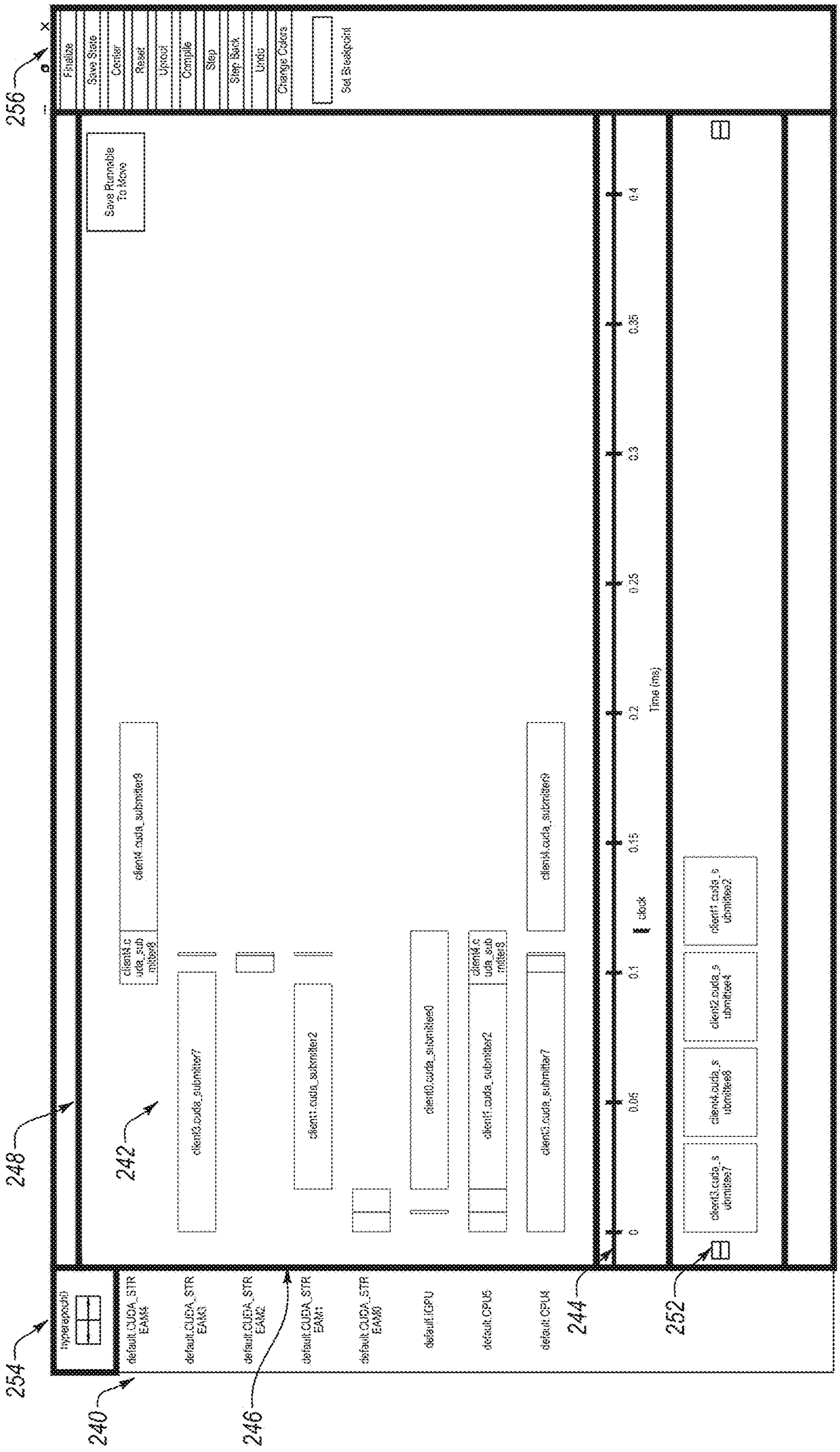
FIG. 2F illustrates an example Graphical User Interface (GUI) that may be used to schedule debugging, according to one or more embodiments of the present disclosure.

As indicated in the present disclosure, in some embodiments the debugging engine 228 may be configured to cause the generation and/or presentation of a GUI that may allow for performing the debugging operations. FIG. 2F illustrates an example GUI 240 that may be generated by the debugging engine 228, according to one or more embodiments of the present disclosure. In some embodiments, the GUI 240 may include a canvas portion 242 ("canvas 242"). The canvas 242 may provide a visual depiction of the runnables across a timeline 244 that may indicate when the corresponding runnables may be scheduled. In addition, the canvas 242 may visually depict to which resource the runnables may be scheduled based on the placement of the runnables in rows of a resource axis 246 that may indicate the different resources to which the runnables may be scheduled.

The visual depiction of the runnables may also include other indications corresponding to the runnables. For example, the indications may include labels identifying the different runnables. In addition, the size of the runnable depictions along the timeline 244 may indicate execution times (e.g., WCET's) of the corresponding runnables. In these or other embodiments, the runnables may be depicted in a manner that indicates dependencies between runnables (e.g., parent/child relationships, submitter/submittee relationships, etc.). Additionally or alternatively, the canvas 242 may be the portion at which users may move runnables (e.g., drag and drop runnables), move the depiction of the schedule along the timeline 244 to view different portions of the schedule, zoom with respect to the depicted schedule, etc.

In some embodiments, the GUI 240 may include a search bar 248. The search bar 248 may allow for searching for various elements. Examples of the elements that may be searched may include, by way of example and not limitation, specific runnables, specific modules, specific computing applications, specific locations within the schedule (e.g., specific portions of the timeline 244), specific compute engines, specific hyper-epochs, specific epochs, etc. In these or other embodiments, the search bar 248 may indicate suggestions for searches and may provide such indications (e.g., via a dropdown list, a popup, etc.).

Additionally or alternatively, the GUI 240 may include a queue field 252 ("queue 252"). The queue 252 may indicate which runnables are next as far as scheduling decisions. As such, the queue 252 may provide a mechanism for a user to view which runnable or runnables may be on deck for being added to the schedule, as depicted in the canvas 242. In some embodiments, the GUI 240 may be such that a user may drag a runnable from the queue 252 to the canvas 242 such that the user may manually add runnables to the schedule. In these or other embodiments, the GUI 240 may be such that a user may reorder the runnables in the queue 252 to change the order of which runnable may apply to the next scheduling decision.

In these or other embodiments, the GUI 240 may include an epoch field 254. The epoch field 254 may indicate which epoch or hyper-epoch is currently being depicted on the canvas 242. In these or other embodiments, the epoch field 254 may allow for users to select between epochs and/or hyper-epochs such that the user may select between which epoch or hyper-epoch may be depicted on the canvas 242.

Additionally or alternatively, the GUI 240 may include a toolbar 256. The toolbar 256 may include one or more selectable graphical elements (e.g., buttons) configured to allow a user to select a function or operation for the compiler or the debugging engine to perform. For example, as illustrated in FIG. 2F, some example functions may include finalizing the schedule, saving the current state of the schedule, centering the canvas depiction of the schedule, rooting runnables (e.g., indicating that selected runnables are not to be moved), uprooting runnables (e.g., indicating that selected runnables are to be moved), compiling the schedule (e.g., such as described with respect to the post-processing engine 218 described in the present disclosure), stepping through schedule generation (e.g., stepping through scheduling decisions), stepping back from schedule generation (e.g., stepping back to before a most recent scheduling decision), undoing one or more operations (e.g., one or more manually performed or automatically performed scheduling decisions), and/or changing visual depictions (e.g., changing colors). These examples are not meant to be limiting or provide a fully comprehensive list of functions that may be performed or included in the toolbar 256.

Returning to FIG. 2A, in some instances, the debugging engine 228 may result in creation of an improved intermediate schedule 224 than if only automated processes were used by leveraging both automated schedule generation techniques with the ability to provide user input. Further, the debugging engine 228 may result in obtaining a decided upon intermediate schedule 224 more quickly than if only the automated process were to be used.

The post-processing engine 218 ("post-processor 218") may be configured to perform one or more post processing operations with respect to the intermediate schedule 224 to generate a corresponding schedule 204. In some embodiments, the post-processing operations may be based on an instruction set 226.

The instruction set 226 may define a set of instructions that the runtime system may be able to execute. In some embodiments, the instruction set 226 may define a low-overhead, flexible protocol for enforcing compiler generated (e.g., heterogeneous, distributed) static scheduling at runtime. The instruction set 226 may be used to define a low-level programming language that may be executed by the runtime system such that the schedules 204 may be written in the low-level language. Further, the instruction set 226 may be configured such that it is universal with respect to all the different types of compute engines that may be included in the runtime system, which may help facilitate generating and implementing the schedule 204 with respect to heterogenous systems.

defined amount of time has passed), etc. By way of example and not limitation, the instruction set 226 may include one or more instructions similar to or the same as those illustrated in TABLE 1.

TABLE 1

| Command | Stands For | Syntax | Description | Example |
|---|---|---|---|---|
| WOF | Wait on Fence | WOF <fence> | Wait on fence. | WOF f1 |
| CALL | Call Function | CALL <func*> | Call a given CPU runnable function. | CALL runnable0 |
| SIG | Signal Fence | SIG <fence> | Signal (unblock) fence. | SIG f1 |
| CUF | CUDA Fence | CUF <fence> <stream*> | Insert a fence on CUDA stream. | CUF f1 CUDA_STREAM0 |
| CUSUB | CUDA Submit | CUSUB <fence> <stream*> <func*> | Call CUDA submitter funnable that submits N CUDA kernels on stream and return fence that will be signaled on the last kernels completion. | CUSUB f1 CUDA_STREAM0 submitter0 |
| DLAF | DLA Fence | DLAF <fence> <handle*> | Insert a fence on the queue of a NvMediaDla handle. | DLAF f1 DLA_HANDLE0 |
| DLASUB | DLA Submit | DLASUB <fence> <handle*> <func*> | Call DLA submitter runnable that submits N DLA tasks on dla handles queue and return fence that will be signaled on the last DLA tasks completion. | DLASUB f1 DLA_HANDLE0 submitter0 |
| WUP | Wait Until Period | WUP <IMM> | Wait until next multiple of IMM nanoseconds. | WUP 33333333 |
| WUT | Wait Until Time | WUT <IMM> | Wait until time IMM nanoseconds has passed from hyperpochs start. | WUT 33333333 |

In some embodiments, the low-level language may be a Domain Specific Language (DSL) that may be an assembly-like language that corresponds to the runtime system. As such, the execution schedule may be written and formatted as a type of assembly code, where each command includes an opcode and operands corresponding to scheduling and synchronization actions, that is formatted such that it may be read and executed by the runtime system. In some embodiments, all synchronization may be performed by the runtime system executing the schedule in the form of commands from the instruction set 226. Such a framework may be such that authors of the computing applications may not need to manage any synchronization manually inside runnables while writing the corresponding code.

In these or other embodiments, the instruction set 226 may include generic commands that may correspond to the control of execution of the runnables. The generic commands may be generic in that they may be applicable for running CPU runnables, submitting accelerator runnables, waiting on fences from CPU/accelerators, signaling fences on CPU/accelerators, synchronizing across processes, resources and SoCs, logging metadata for performance analysis, and/or the like.

By way of example, the generic commands of the instruction set 226 may include one or more of: instantiations of synchronization primitives that may operate as fences that are used to trigger execution of runnables on various compute engines, instructions that call and enqueue runnables on various compute engines, instructions that enqueue fences on various compute engines to block subsequently enqueued runnables from executing, instructions that signal fences in order to unblock previously fenced runnables, instructions related to wait times (e.g., that block runnables until a The instruction set 226 configured as described herein may provide for a modular approach to static scheduling. For example, instruction sets have long been used to interface between hardware and software. Similarly, using an instruction set to enforce a deterministic schedule for an application allows for the schedule enforcement to become programmable—e.g., in the sense that the runtime system can be programmed to wait or signal any dependency and enforce any static schedule. This may help allow a simple instruction set to express complicated scheduling behavior (e.g., mutual exclusion, deadlock resolution, frame-level synchronization and isolation, relay between QM and ASIL, etc.) using a small number of instructions.

For example, the runtime system may spawn one thread per compute engine per client (e.g., operating system process). Therefore, two runnables on the same compute engine may be scheduled on different threads and, in this case, the compiler 202 (e.g., via the post-processor 218) may ensure a deterministic execution order by adding appropriate fences with respect to synchronization primitives. As another example, the different streams may run concurrently on a certain compute engine such as a GPU. In order to ensure deterministic execution of kernels on the GPU the compiler 202 (e.g., via the post-processor 218) may insert appropriate fences to ensure deterministic execution of kernels on the GPU. Finally, CUDA jobs on a particular CUDA Stream are executed in the order of submission. As such, the use of the fences may help ensure that the submits to the CUDA stream are deterministic such that the corresponding kernel execution is also deterministic. Although CUDA is referenced, a different parallel computing platform and API may be used in additional or alternatively, without departing from the scope of the present disclosure.

In addition, the instruction set 226 may enforce strict separation between compiler and runtime, may allow a compiler writer to experiment/iterate quickly in high-level language suited to compiler writing (e.g., Python) as opposed to low level language that runtime is written in (e.g., C/C++). The instruction set 226 may allow compiler writers to add scheduling features without changing or being familiar with any runtime code. In these or other embodiments, the instruction set 226 may be RISC-like (e.g., minimal), allowing the distributed runtime (which may be on a critical path of application) to be simple with relatively low-overhead to reduce or minimize the performance impact of the compiler 202, while also reducing the amount of certain types of code (e.g., ASIL code) that may need to be written and verified. Additionally or alternatively, the use of the instruction set 226 may be such that the code of the computing applications may not need to address synchronization, as mentioned in the present disclosure, which may simplify the computing application code and/or make it easier to scale.

In some embodiments, the post-processor 218 may be configured to translate the intermediate schedule 224 into a finalized execution schedule (e.g., a corresponding schedule 204) that is formatted according to the low-level language defined by the instruction set 226. For example, the post-processor 218 may be configured to translate the lists of runnables in the intermediate schedule 224—that may be generated and formatted according to a high-level programming language (e.g., Python)—into corresponding commands of the instruction set 226. The post-processor 218 may accordingly be configured to translate the intermediate execution schedule 224 from a high-level language and format to the low-level language and format of the instruction set 226.

As indicated in the present disclosure, the commands may dictate the execution timing and/or order of the runnables by the runtime system using fences that may correspond to certain states corresponding to synchronization primitives. In some embodiments, the translating may include inserting fence instructions from the instruction set 226 in the schedule to enforce data dependencies and mutual exclusion guarantees between runnables. In these or other embodiments, the translating may also include inserting instructions to execute and submit runnables. The inserted instructions may operate as timing instructions that may help allow for controlling the timing and/or synchronization of execution of the runnables.

In some embodiments, the fence instructions may include instructions to wait on fences (pre-fences) and signal fences (post-fences). Pre-fence instructions may correspond to a synchronization condition that must be met prior to a particular task or runnable being able to execute. Pre-fence instructions may correspond to ordering constraints on same compute engines, but also with respect to the overall runnables where no dependency exists. For example, a pre-fence instruction may indicate that the runnable associated therewith may not start execution until a prior runnable on the same engine has completed execution and/or another runnable that the runnable relies upon for execution from another engine has completed execution. Post-fence instructions may relate to changing respective fence values of respective fences following execution of corresponding runnables. The post-fence instructions may accordingly be used to trigger pre-fence instruction conditions. Additionally or alternatively, pre-fence instructions and/or post-fence instructions may include the creation of a corresponding fence.

By way of example, a particular fence may be instantiated as a particular integer value of aa counter stored at a particular memory location. In these or other embodiments, the pre-fence instructions for a particular runnable or task may be that the particular runnable waits to execute until the integer value at the particular memory location is a particular value. In these or other embodiments, post-fence instructions of a preceding or ancestor runnable of the particular runnable may be to increment the integer value at the particular location. The post-fence instructions of the preceding runnables of the particular runnable may be such that the value of the particular synchronization primitive is incremented such that the particular value is reached to cause the particular runnable to execute in its scheduled order. The memory location backing a fence may be read and incremented by various compute engines.

As a further example, with reference to the schedule representation 262 of FIG. 2C, the post-processor 218 may be configured to insert fence instructions to enforce the schedule of the representation 262. For instance, the post-processor 218 may be configured to generate a pre-fence instruction for runnable B with respect to runnable A and a corresponding post-fence instruction for runnable A. The pre-fence instruction for runnable B may be such that runnable B does not execute until a corresponding fence satisfies a condition. The corresponding post-fence instruction for runnable A may be such that, upon finishing execution, the fence that corresponds to the pre-fence instruction for runnable B is modified (e.g., incremented) such that the fence satisfies the condition for runnable B. Similar instructions may be generated to enforce the execution order of the schedule of the representation 262.

In these or other embodiments, the post-processor 218 may be configured to remove duplicate fences, which may help improve or optimize the process. For example, because runnable D directly relies on runnable B and runnable A', and indirectly relies on runnable A (e.g., via the dependency of B and A' on A), the post-processor 218 may initially generate three pre-fences for runnable D, one for each of runnable B, A', and A. However, the post-processor 218 may filter out one or more of the pre-fences, such as to remove the pre-fence corresponding to runnable A, as runnables B and A' already have a pre-fence corresponding to runnable A, and thus a pre-fence for runnable A with respect to runnable D would be repetitive.

The use of fences in this manner may allow for cross-engine dependencies to be expressed and controlled, where each dependency is represented by a particular fence value that can be waited on (by multiple engines) and/or signaled during runtime. The compiler 202 (e.g., via the post-processor 218) may accordingly automatically generate the correct sequence of fences to enforce dependencies, and memory locations used for fences may be reused to enforce multiple dependencies in a schedule to reduce or minimize the memory footprint at runtime and simplify the schedule for readability/debugability. In these or other embodiments, the fence instructions may include timestamping fences when they are triggered which can then be monitored for proof of execution and can be used as a heartbeat for the scheduler, as discussed in further detail in the present disclosure.

For example, conventional synchronization approaches, like semaphores, condvars, mutexes, etc., are CPU-specific. Whereas, other hardware engines have their own synchronization primitives (e.g., a GPU may have CUDA events). Fences, on the other hand, may be configured as an abstraction over synchronization primitives that can be understood by many compute engines through a unified interface (signal, wait, etc.), which allows for synchronization and interoperability that may not be achievable using other scheduling approaches used for scheduling of homogenous systems. Because the fences are understood by all compute engines, using fences allows for avoiding a costly CPU round trip to translate from one engine's sync primitive to another's. Further, the automatic generation of the fences by the compiler 202 to enforce the dependencies may also help improve separation/modularity between compiler and runtime components.

In some embodiments, a frame-sync and/or cross-SoC-sync may be implemented in the generation of the schedule 204 by the post-processor 218. For example, runnables may be required to execute at a specific frequency, which may not be known in advance. In addition, to ensure that if there's any slippage for any reason, runnables executing in other processes/SoCs should not "run ahead" without waiting. To account for this, a frame-sync process for performing synchronization may be implemented. In some embodiments, the frame-sync process may include injecting a frame sync runnable that is injected at the beginning of each frame. As such, at the end of each frame of execution, the timing instructions of the schedule 204 may be such that the frame-sync runnable waits for a certain fence before proceeding with the next frame. Having this separate process for synchronization may allow for more efficient synchronization between multiple processes. By contrast, the alternative may involve the synchronization being done by one of the client processes, which, if it fails, may create a single point of failure in the system. This frame-sync may also simplify implementation since these frame-sync processes behave almost the same as just another client in the system, requiring little to no special handling. The frame-sync process itself unblocks the other clients by signaling them, waits for signals from the clients, and then waits for the precise time needed for executing at the correct frequency before repeating the cycle again. For example, after runnables of an epoch complete, one runnable at the end of epoch may be waiting for the other runnables to complete, and a runnable at the beginning of a next epoch may be waiting for a signal from the frame-sync runnable of the prior epoch before beginning the next epoch.

In some instances, the runtime system may not be able to support an entire schedule as generated—e.g., the compute graph associated with the generated schedule may not be supported all at once by the runtime system. In these or other embodiments, the compiler 202 may be configured to split the corresponding schedule up among steps such that, e.g., every n frames a first runnable is executed, and every n+1 frames of another runnable is executed. This may be supported on a single compute engine, or across multiple compute engines. As such, runnables may be scheduled with different frequency in the same time domain in a static schedule.

Figure 2G:
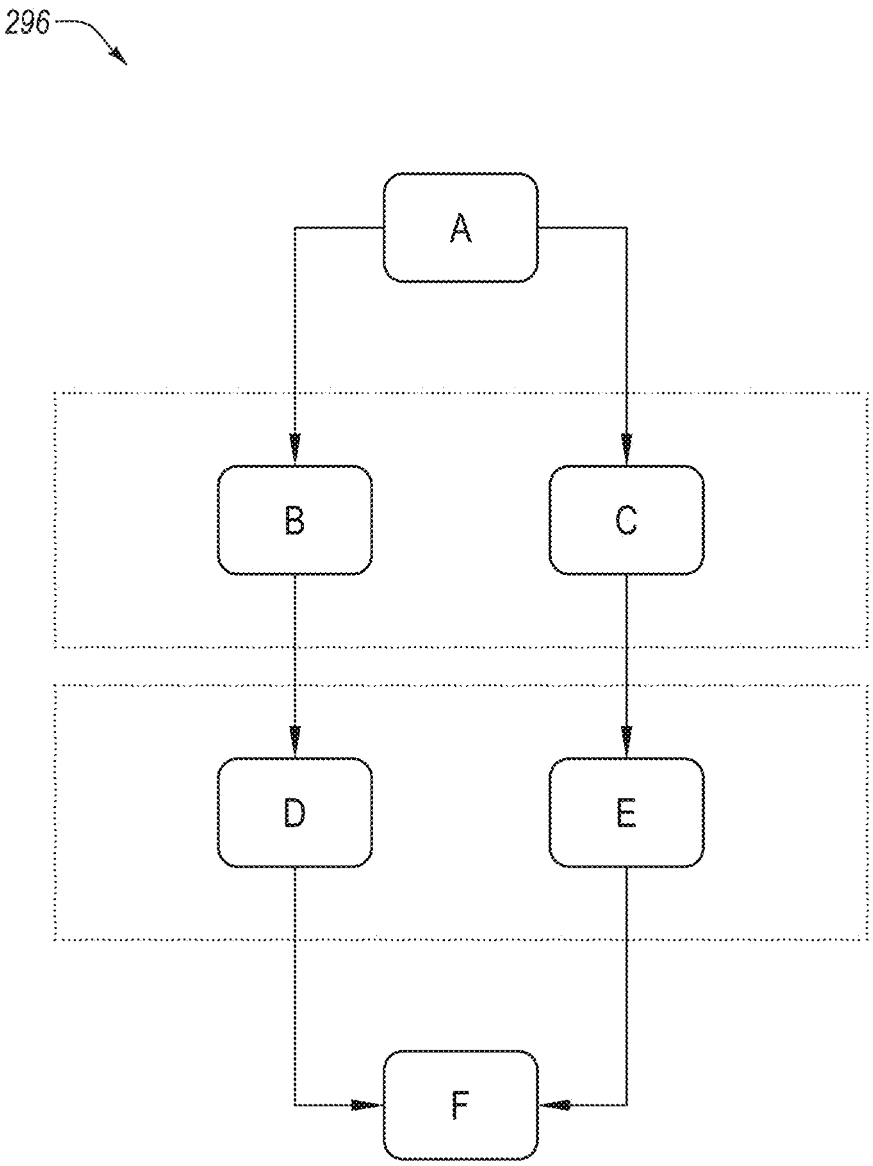
FIG. 2G illustrates an example Directed Acyclic Graph (DAG) in which a corresponding schedule may be split, according to one or more embodiments of the present disclosure.

For example, FIG. 2G illustrates an example DAG 296 in which a corresponding schedule may be split, according to one or more embodiments of the present disclosure. For instance, in FIG. 2G, runnable B may be executed every n frames, and runnable C may be executed every n+1 frames. This same practice may be performed for runnables D and E. As such, even where the resources are not adequate to support each runnable at each time instance or epoch, the compiler 202 may generate a schedule using a round robin approach that still complies with various constraints. This process allows for the ability to deterministically skip certain runnables per frame while still maintaining suitable to maximum engine utilization. The group of runnables with tasks that have a different cadence may be treated as one task in the time domain during resource allocation, and, at compile time, it may be statically determined which runnable to run for a particular frame.

The finalized schedules 204 that may be generated using the instruction set 226 may be obtained and executed by the corresponding runtime system. In some embodiments, the instructions in the schedules 204 may be executed by the runtime system in multiple operating system (OS) threads running simultaneously. Each thread may execute a different portion of the schedules 204 as dictated by the instructions included therein. Each thread may execute runnables (on the thread's respective CPU core) and submit runnables to run on other compute engines. Execution timing (e.g., synchronization) between runnables across compute engines may be achieved by executing the timing (e.g., fence) instructions in the schedules 204. As such, the instruction set 226 may allow the runtime system to be decentralized—e.g., each thread may execute its instructions in isolation and system wide synchronization may be achieved by execution, by the various compute engines of the runtime system, of the commands that may be generated using the instruction set 226 and included in the schedules 204. By way of example, FIGS. 2H and 2I illustrate code of an example schedule 204 that includes commands that control the execution of runnables in which the commands are based on an instruction set such as the instruction set 226.

According to some embodiments of the present disclosure, one or more schedule quality assurance (QA) tools may be used to help ensure that the schedules 204 satisfy corresponding requirements. In some embodiments, the QA tools may include one or more tools that are configured to assess and/or modify the schedules 204. For example, in some embodiments, the QA tools may include one or more of a schedule verification engine configured to verify that one or more of the schedules 204 comply with corresponding constraints, or a schedule testing engine configured to perform one or more tests of one or more of the schedules 204 with respect to runtime operations. Further detail regarding the schedule verification engine and the schedule testing engine are given at least with respect to FIG. 7.

Additionally or alternatively, the QA tools may include one or more tools that are configured to help improve the app data 206 that may correspond to the schedules and/or generation of the schedules. For example, in some embodiments, the schedule QA tools may include one or more of an autotuning engine—such as described in the present disclosure—or a runtime check engine configured to analyze underlying code of the computing applications associated with the app data 206 for elements that may cause difficulties in executing the schedules 204. Further detail regarding the runtime check engine and the tuning engine are also given at least with respect to FIG. 7.

In these or other embodiments, the QA tools may include a deadlock resolving operation that may be performed by the compiler 202. For example, in some embodiments, the compiler 202 (e.g., via the post-processor 218) may be configured to inserting a runnable in the schedules 204 in which the inserted runnable is configured to resolve situations that may result in deadlocks. Such a runnable may be referred to as a "deadlock resolver." In some cases, the deadlock resolver may be used to account for deadlocks where a submit operation takes place for a runnable before the runnable it relies upon has completed. For example, compute engines may have a queue in front of them and may only process runnables in the order in which the tasks are submitted to the hardware queues. Even where there are multiple runnables, if the submitter runnables do not take place in the proper way, deadlocking may occur. For example, where task A has to run before task B, but task B is submitted before task A, a deadlock may occur due to the underlying constraint. As such, when generating the schedules 204, this constraint may be taken into account. For example, even if tasks are split amongst multiple hardware queues, the current hardware setup may not allow for determining what the post-fence values will be at compile time for any of the accelerators. The fences of the accelerators may be semaphores (e.g., an increasing integer), and the integer value from the accelerators may be unknown. As such, in some embodiments, a deadlock resolver may be used as a bridge between controlled integer values and uncontrolled integer values—e.g., by exposing a controlled value that can be reliably waited on while also waiting on one or more uncontrolled values.

Modifications, additions, or omissions may be made to the embodiments and examples described herein with respect to FIGS. 2A-2E without departing from the scope of the present disclosure. For example, it should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1400 of FIGS. 14A-14D, example computing device 1500 of FIG. 15, and/or example data center 1600 of FIG. 16.

In addition, in some embodiments, the operations performed with respect to the system 200 may be performed "offline" in that they may be performed prior to execution of the schedules 204. For example, the app data 206 may be determined offline as well as the schedules 204. By contrast, the runtime system may correspond to processes executed during deployment—e.g., during the deployment of the schedules 204 in a deterministic fashion in real-time or near real-time.

Figure 3A:
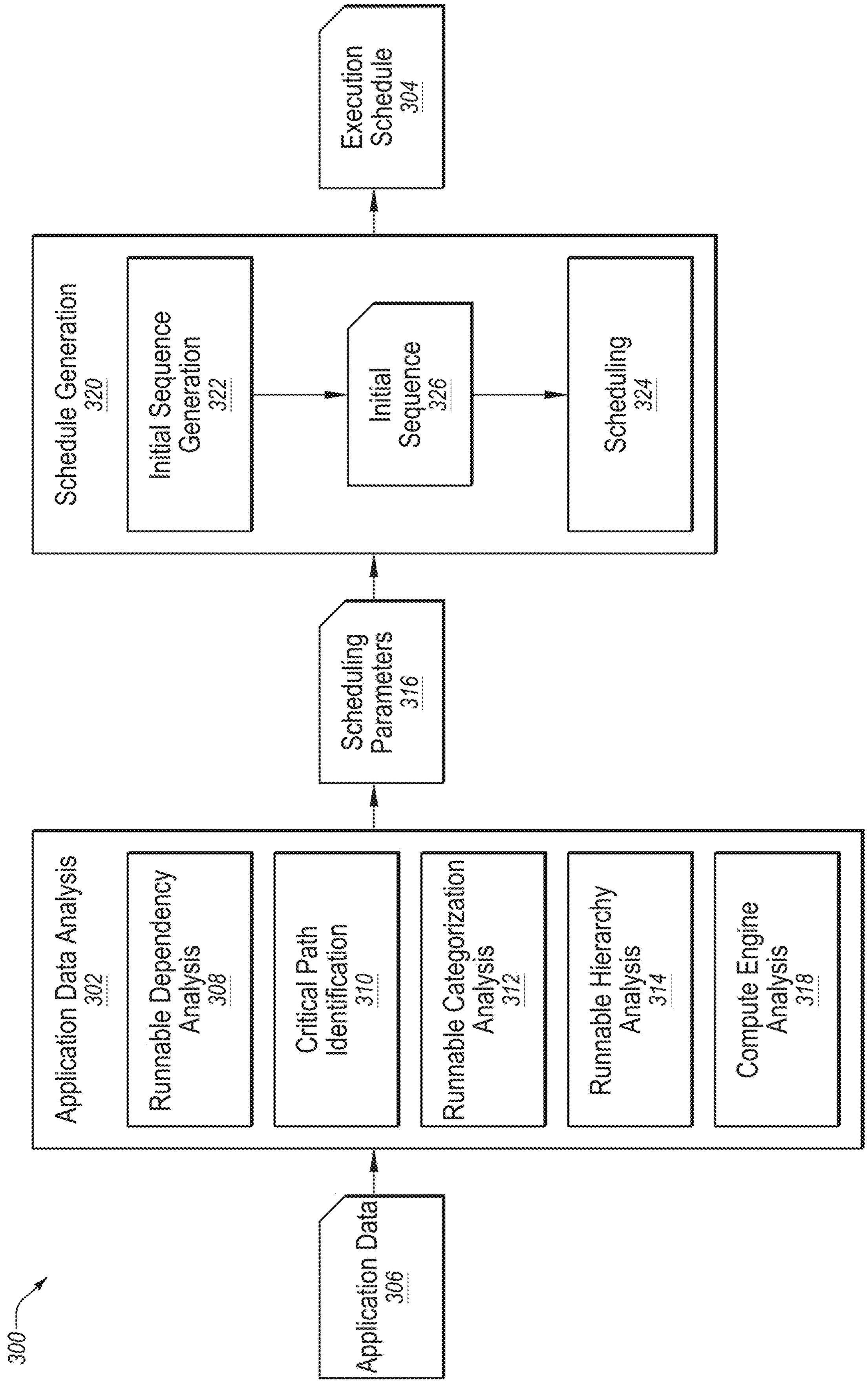
FIG. 3A illustrates an example bubble scheduling process related to performing bubble scheduling, according to one or more embodiments of the present disclosure.

FIG. 3A illustrates an example bubble scheduling process 300 ("process 300") related to performing bubble scheduling, according to one or more embodiments of the present disclosure. The process 300 may be performed by any suitable system, apparatus, or device using any combination of hardware, firmware, and/or software. For instance, various operations may be carried out by one or more processors executing instructions stored in memory. The operations of the process 300 may also be embodied as computer-usable instructions stored on computer storage media. Additionally or alternatively, one or more of the operations of the process 300 may be provided by a standalone application, a service or hosted service (standalone or in combination with another hosted service), or a plug-in to another product, to name a few. By way of example, in some embodiments, one or more operations of the process 300 may be performed by the compiler 202 described with respect to FIG. 2A. In these or other embodiments, one or more operations may be performed by one or more computing devices, such as that described in further detail at least with respect to FIG. 15.

As indicated in the present disclosure, in general, the bubble scheduling may include identifying time slots for the execution of runnables. At each time slot, a determination of the available resources may be made, and the compiler may determine where the corresponding runnables should be executed.

In some embodiments, the process 300 may include an application data analysis operation 302 ("data analysis 302"). In general, the data analysis 302 may include one or more operations that may be performed with respect to application data 306 ("app data 306"). In some embodiments, the app data 206 and/or the unpacked app data 220 of FIG. 2A may be examples of the app data 306. As such, the app data 306 may include computing application or module information such as runnables included therein, runnable dependencies, one or more compute graphs, execution constraints, etc., which may be used to obtain one or more scheduling parameters 316. The scheduling parameters 316 may be used by a schedule generation operation 320 of the process 300 to generate an execution schedule 304 ("schedule 304"). The schedule(s) 204 and/or the intermediate schedule 224 of FIG. 2A may be examples of the schedule 304.

In some embodiments, the data analysis 302 may include a runnable dependency analysis 308 ("dependency analysis 308"). The dependency analysis 308 may analyze the app data 306 to determine dependencies between the runnables of the app data. The dependencies may include ancestor/dependent relationships between runnables. Additionally or alternatively, the dependencies may include submitter/submittee relationships between runnables. In some embodiments, the determined dependencies may be included in the scheduling parameters 316.

Figure 3B:
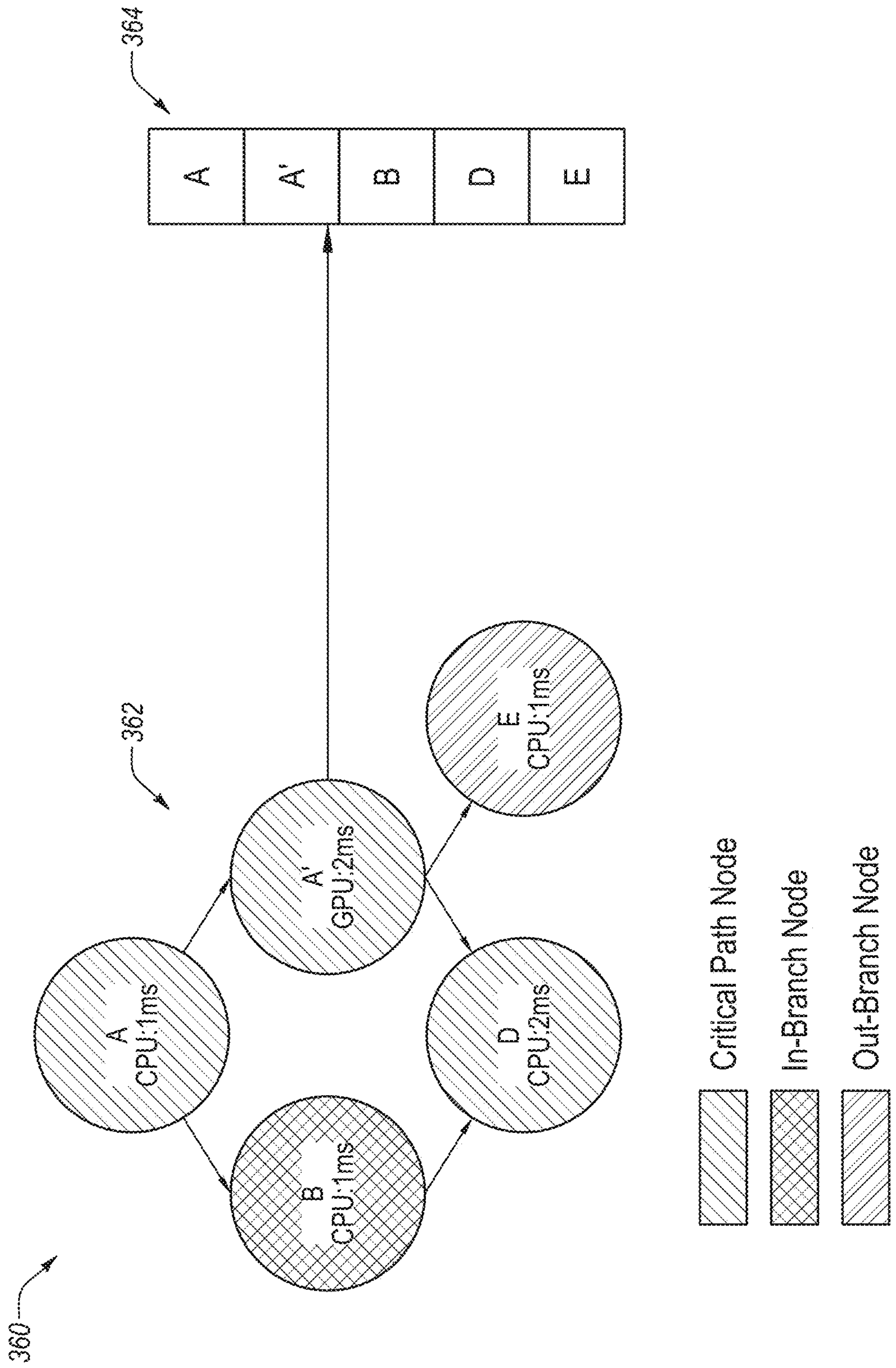
FIG. 3B illustrates example illustrations related to the bubble scheduling process of FIG. 3A, according to one or more embodiments of the present disclosure.

By way of example, FIG. 3B illustrates an example compute graph 360 (which may be the same as the compute graph 260 of FIG. 2C). The dependency analysis 308 may determine—e.g., based on the edges in the compute graph 360—that node A is a parent node of node A' and that node A' is a parent node of node D. The dependency analysis may also accordingly determine—either explicitly or implicitly through the linked parent/child relationships—that node A is an ancestor node of node D. Similar dependencies may be determined with respect to the other nodes of the compute graph 360. Additionally or alternatively, the dependency analysis 308 may identify the submitter/submittee relationship between nodes A and A' based on the node labeling and/or the compute engine designations associated with those nodes.

As indicated in the present disclosure, in the present disclosure, the terms "node" and "runnable" may be used interchangeably with respect to compute graph 360 at times such that reference to a "node" of a compute graph may also refer to the corresponding runnable, or vice versa. For example, reference to "node A" may also refer to runnable A, to which node A corresponds.

Additionally or alternatively, the scheduling parameters 316 associated with the dependency analysis 308 may include respective coupling constraints ("couplings") between corresponding submitter/submittee nodes (submitter/submittee nodes or runnables that correspond to each other may also be referred to as "submitter/submittee pairs" or "submitter/submittee sets"). The couplings may include ensuring that a submittee node is scheduled following its corresponding submitter node. The coupling may also be such that submitter/submittee pairs are moved together such that the submitter is always scheduled before the submittee.

The couplings may also be such that a first processing queue of submitter runnables on a submitter compute engine matches a second processing queue of corresponding submittee runnables on a submittee compute engine. For example, a processing queue of a submitter compute engine may include submitter runnables A, B, and C. Further, a corresponding processing queue of a corresponding submittee compute engine may include submittee runnables A', B', and C' which may respectively correspond to submitter runnables A, B, and C. The coupling may accordingly require that the order of submittee runnables A', B', and C' in the submittee compute engine follow the same order of the submitter runnables A, B, and C in the submitter compute engine. For instance, if the processing queue of the submitter compute engine was ordered "C, B, A"—meaning that C is to be executed before B, which is to be executed before A—the processing queue of the submittee compute engine would need to be "C', B', A'" to satisfy the coupling constraints.

In some embodiments, the data analysis 302 may include a critical path identification 310. The critical path identification 310 may include identifying a critical path of a corresponding compute graph that may be included in or represented by the app data 306. The critical path may be the longest path through the corresponding compute graph from the beginning to the end according to runnable dependencies indicated by the compute graph. As such, the critical path may indicate the minimally longest sequence of runnables that correspond to the compute graph—and consequently its corresponding module(s) or computing applications. In some embodiments, the critical path may be identified based on the dependencies identified during the dependency analysis 308. In some embodiments, the determined critical path may be included in the scheduling parameters 316

By way of example, returning to FIG. 3B, FIG. 3B illustrates an example critical path 362 of the compute graph 360. In the illustrated example, the critical path 362 may include nodes A, A', and D due to the dependencies and WCET's of these nodes indicating that this is the longest path through the compute graph 360. For example, although other paths may include just as many nodes (e.g., a path that includes A, B, and D or a path that includes A, A', and E), these paths may not be the critical path because their collective WCETs may be 4 ms each whereas the collective WCET of the critical path 362 may be 5 ms.

Returning to FIG. 3A, the data analysis 302 may include a runnable categorization analysis 312 ("categorization analysis 312") in some embodiments. The categorization analysis 312 may categorize nodes (and consequently their corresponding runnables) into different categories that may include critical path nodes, in-branch nodes, and out-branch nodes. In some embodiments, the determined categorizations may be included in the scheduling parameters 316.

Nodes that are part of a critical path identified in critical path identification 310 may be categorized as critical path nodes. In these or other embodiments, submittee nodes of submitter nodes that are included in the critical path may be categorized as critical path nodes as well, even in instances where the submittee nodes would not technically be part of the critical path.

In these or other embodiments, nodes that are ancestor nodes of critical path nodes (e.g., nodes from which at least one critical path node may depend) but that are not part of the critical path may be categorized as in-branch nodes. Remaining nodes that are not categorized as critical path nodes or as in-branch nodes may be categorized as out-branch nodes.

By way of example, referring to FIG. 3B, based on the categorization analysis 312, nodes A, A', and D may be categorized as critical path nodes. Further, node B may be categorized as an in-branch node and node E may be categorized as an out-branch node.

Returning to FIG. 3A, in some embodiments, the data analysis may include a runnable hierarchy analysis 314 ("hierarchy analysis 314"). The hierarchy analysis 314 may identify hierarchal levels of nodes (and consequently their respective runnables) in the compute graph. The respective hierarchal levels of the respective nodes may be based on a number of ancestor nodes of the respective nodes. For example, if a root node of the graph structure is given a hierarchal level 0, then all its children may be given a hierarchal level 1, the children nodes of the children nodes (e.g., the grandchild nodes of the root node) would be given a hierarchal level 2, and so on. For example, referring again to FIG. 3B, the hierarchy analysis 314 applied to the compute graph 360 may be such that node A may be given level 0, nodes B and A' may be given level 1, and nodes D and E may be given level 2. In some embodiments, the determined hierarchal levels may be included in the scheduling parameters 316.

In these or other embodiments, the data analysis may include a compute engine analysis 318. The compute engine analysis 318 may be configured to determine, based on the app data 306, one or more compute engine constraints that may be associated with the runnables. For example, the compute engine analysis may determine which types of compute engines may be used to execute which runnables. In these or other embodiments, the scheduling parameters 316 may include one or more of the determined compute engine constraints.

As indicated in the present disclosure, the schedule generation 320 may be configured to generate the schedule 304 based on the scheduling parameters 316 obtained from the data analysis 302. In some embodiments, the schedule generation 320 may include initial sequence generation 322 and scheduling 324.

The initial sequence generation 322 may include generating an initial execution sequence of nodes or runnables ("initial sequence 326"). In some embodiments, the initial sequence 326 may be a serial sequence of all the nodes of the compute graph. Placement of the nodes in the initial sequence 326 may be based on the categories, dependencies, hierarchal levels and/or couplings of the nodes.

For example, in some embodiments, node placement in the initial sequence 326 based on node categories may be based on prioritizations between critical path nodes, in-branch nodes, and out-branch nodes. The prioritization may be such that, in general, critical path nodes may be prioritized higher than in-branch nodes and in-branch nodes may be prioritized higher than out-branch nodes. Accordingly, in some embodiments, the placement of the nodes in the initial sequence 326 may be such that nodes corresponding to a higher priority category may be scheduled sooner in the initial sequence 326 than other nodes that correspond to a lower priority category when possible. The prioritization based on the critical path nodes may be such that the initial sequence 326 is a critical path dominant sequence. Such a prioritization may additionally prioritize the critical path with respect to the bubble scheduling.

Additionally or alternatively, node placement in the initial sequence 326 based on hierarchal levels of the nodes ("node levels") may include scheduling nodes such that nodes that are within a particular level are scheduled within a certain number of timeslots from each other. Such scheduling may help ensure that nodes of similar levels are somewhat grouped together in the initial sequence 326.

In these or other embodiments, node placement in the initial sequence 326 based on node dependencies may include scheduling ancestor nodes sooner than their respective child nodes. Additionally or alternatively, placement of the nodes in the initial sequence 326 based on node couplings may include scheduling submitter/submittee pairs together. In these or other embodiments, the scheduling of submitter/submittee pairs together may include placing a submittee node after—e.g., immediately after—its corresponding submitter node in the initial sequence 326.

By way of example, FIG. 3B illustrates an initial sequence 364. The initial sequence 364 may be a critical path dominant sequence. For example, the initial sequence 364 may be generated based on the critical path 362 of the compute graph 360 such that the critical path 362 is prioritized in the initial sequence 364. As illustrated in FIG. 3B, the initial sequence 364 may be a critical path The scheduling 324 may determine the schedule 304 based on the initial sequence 326 and the scheduling parameters 316. For example, in some embodiments, the scheduling 324 may be based on node order in the initial sequence 326. For instance, the nodes of the initial sequence 326 may be numbered (e.g., ranked) in sequential order starting from the first node (e.g., earliest scheduled) to the last node (e.g., latest scheduled) in the initial sequence 326.

The scheduling 324 may begin by iteratively scheduling the nodes across multiple compute engines starting with the first node (e.g., highest ranked node) in the initial sequence 326. In some embodiments, the scheduling 324 may continue to move through the nodes of the initial sequence 326 to schedule the runnables of the subsequent nodes in a similar manner to determine an initially generated interim schedule.

For example, referring to FIG. 3B, the scheduling 324 may be configured to first determine which compute engine may execute node A of the compute graph A due to node A being the first node in the initial sequence 364. In some embodiments, the scheduling 324 may make this decision based on which compatible compute engine may be earliest available. For instance, node A is indicated as having a resource constraint of being executed by a CPU. As such, the scheduling of node A may be based on the earliest available CPU.

In these or other embodiments, the scheduling 324 may be configured to determine one or more permutations or combinations of resources that may be available, required, or eligible to execute node A. Additionally or alternatively, the scheduling 324 may be configured to select the permutation or combination that may be earliest available.

For example, the resource constraints of node A may be such that node A may need a CPU and a CUDA stream for execution. Further, a list of available compute engines may indicate that a CPU4 and a CPU5 are available at time T=5 and that a CPU3 is available at time T=3 and that a CUDA-STREAM0 is available at those times as well. In such an example, some example combinations may include (CPU3, CUDA_STREAM0, T=3), (CPU4, CUDA_STREAM0, T=5), (CPU5, CUDA_STREAM0, T=5). In this example, node A may be scheduled to be executed by CPU3 using CUDA_STREAM0 based on this being the earliest available permutation.

In these or other embodiments, the scheduling 324 may be configured to weigh different permutations based on one or more additional or alternative factors. For example, current utilization of resources and/or resource fragmentation may be used to weigh the permutations. For instance, a first permutation that includes a heavily used resource in general but that has an earlier available time than a second permutation that includes a less used resource may be weighted lower than the second permutation. In such an example, the second permutation may be selected over the first permutation in some instances even though the first permutation may be available first.

Returning to FIG. 3A, in some embodiments, the scheduling 324 may be configured to identify "bubbles" in the interim schedule. A bubble may be a period of time within the interim schedule in which one or more compute engines may be available to execute a runnable (e.g., a period of time during which the one or more compute engines would be idle). In these or other embodiments, the scheduling 324 may be configured to modify the interim schedule by attempting to remove as many bubbles as possible by determining whether one or more runnables may be scheduled within a bubble that is earlier than where the runnables may currently be scheduled.

In these or other embodiments, the moving of runnables to populate bubbles may be subject to one or more moving constraints. In some embodiments, the moving constraints may be based on one or more of the scheduling parameters 316.

For example, the moving constraints may include one or more dependency constraints. The dependency constraints may require that child nodes are not moved in a manner in which they begin execution before their corresponding parent nodes have finished execution in some embodiments. In these or other embodiments, the dependency constraints may include one or more common resource constraints associated with child and parent nodes. For example, there may be communication context switching overhead (e.g., communication delays) associated with child nodes executing on compute engines different from their parent nodes. As such, in some embodiments, the dependency constraints may indicate that child runnables be scheduled on the same compute engine as their corresponding parent runnables if possible.

Additionally or alternatively, the moving constraints may include a submitter/submitee constraint. The submitter/submittee constraint may require that submitter/submitee pairs be moved together in a manner that satisfies the coupling constraints. For instance, submitter/submittee pairs may be moved together such that the processing queues of submitter runnables on a submitter compute engine match the processing queues of corresponding submittee runnables on a corresponding submittee compute engine, such as described in the present disclosure.

Additionally or alternatively, the moving constraints may include a level constraint. For example, in some embodiments, the scheduling 324 may be configured to not move respective runnables in a manner that would place them with other runnables that have hierarchal levels further than a threshold amount away from that of the respective runnables. For instance, in some embodiments, the level constraints of respective runnables may be based on the number of runnables having the same hierarchal level as the respective runnables. For instance, "x" number of runnables may have a hierarchal level "y." A particular runnable having hierarchal level "y" may have a corresponding level constraint that restrains movement of the particular runnable beyond "x" number of time slots from its current location.

In some embodiments, the scheduling 324 may be configured to continue to modify the interim schedule until all the execution constraints included in the app data 306 are satisfied. Additionally or alternatively, the scheduling 324 may continue to make modifications until the improvements no longer satisfy an improvement threshold. In these or other embodiments, the scheduling 324 may continue to make modifications until a certain amount of time has passed. Upon finishing making modifications, the scheduling 324 may output the settled upon schedule as the schedule 304. In some embodiments, the schedule 304 may accordingly be optimized using the process 300. It is noted that reference to an "optimized schedule" or to optimizing a schedule in the present disclosure does not necessarily mean the absolute best schedule possible, but instead refers to a schedule that is generated using an optimization process configured to improve a schedule to reach at least a suitable schedule—e.g., a schedule that satisfies various constraints of the system.

The bubble scheduling process 300 implemented as described in the present disclosure may include the ability to schedule a runnable across multiple hardware engines and/or software resources concurrently. The bubble scheduling process 300 further support scheduling a runnable while obeying queuing constraints exposed by programming models of GPUs, DLAs, PVAs, etc.

Modifications, additions, or omissions may be made to the bubble scheduling process 300 without departing from the scope of the present disclosure. For example, the order of one or more of the operations described may vary than the order in which they were described or are illustrated. Further, each operation may include more or fewer operations than those described. In addition, the delineation of the operations and elements is meant for explanatory purposes and is not meant to be limiting with respect to actual implementations.

Figure 4A:
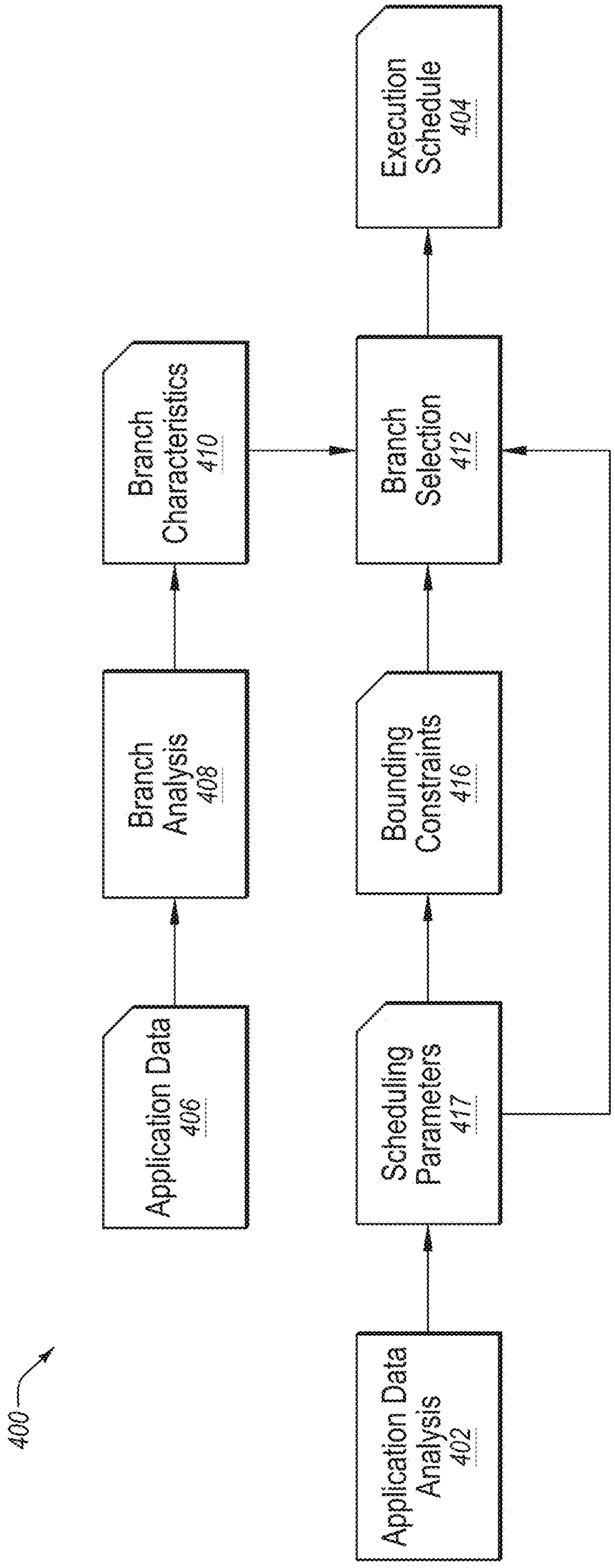
FIG. 4A illustrates an example branch and bound (BNB) scheduling process related to performing BNB scheduling, according to one or more embodiments of the present disclosure.

FIG. 4A illustrates an example branch and bound (BNB) scheduling process 400 ("BNB process 400") related to performing BNB scheduling, according to one or more embodiments of the present disclosure. The BNB process 400 may be performed by any suitable system, apparatus, or device using any combination of hardware, firmware, and/or software. For instance, various operations may be carried out by one or more processors executing instructions stored in memory. The operations of the BNB process 400 may also be embodied as computer-usable instructions stored on computer storage media. Additionally or alternatively, one or more of the operations of the BNB process 400 may be provided by a standalone application, a service or hosted service (standalone or in combination with another hosted service), or a plug-in to another product, to name a few. By way of example, in some embodiments, one or more operations of the BNB process 400 may be performed by the compiler 202 (e.g., by the scheduling engine 216 of the compiler 202) described with respect to FIG. 2A. In these or other embodiments, one or more operations may be performed by one or more computing devices, such as that described in further detail at least with respect to FIG. 15.

In general, the BNB process 400 may include one or more operations that may be performed with respect to application data 406 ("app data 406"). In some embodiments, the app data 206 and/or the unpacked app data 220 of FIG. 2A may be examples of the app data 406. As such, the app data 406 may include computing application or module information such as runnables included therein, runnable dependencies, one or more compute graphs, execution constraints, etc., which may be used to generate an execution schedule 404 ("schedule 404"). The schedule(s) 204 and/or the intermediate schedule 224 of FIG. 2A may be examples of the schedule 404.

As indicated in the present disclosure, in general, the BNB process 400 may include identifying different possible scheduling options for computing applications or modules that may occur due to branches in their corresponding compute graphs. For example, in some embodiments, the BNB process 400 may generally incrementally move through a compute graph of the app data 406 (e.g., starting at a root node of the compute graph) and scheduling nodes as they are encountered. However, in some instances, one or more nodes in the compute graph may be branching nodes that may correspond to branches in the compute graph may be such that more than one scheduling option may be possible. Such options may be referred to as "scheduling branches." In some embodiments, the branching may be from the perspective of the current timing location within the schedule generation.

Figure 4B:
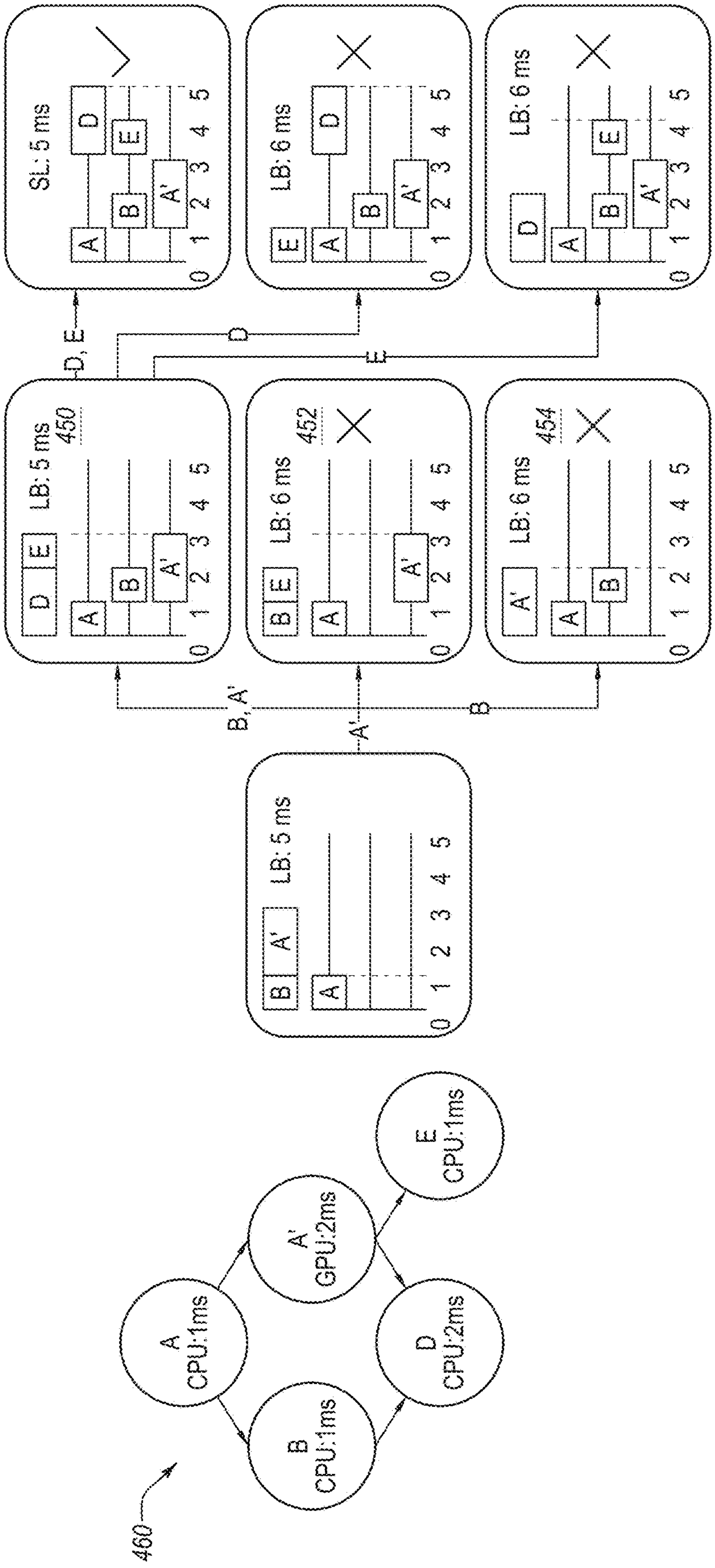
FIG. 4B illustrates example illustrations related to the bubble scheduling process of FIG. 4A, according to one or more embodiments of the present disclosure.

By way of example, FIG. 4B illustrates an example compute graph 460 (which may be the same as the compute graph 260 of FIG. 2C or the compute graph 360 of FIG. 3B). As illustrated, the compute graph 460 may include a node A that is a branching node that has a child node B and a child node A' that both depend from node A but not from each other such that the compute graph 460 may branch out from the node A to both nodes B and A'. In such an example, after scheduling node A the current timing location within the schedule may be 1 ms. In such an example, possible scheduling branches may include 1) a first permutation in which both nodes B and A' are scheduled to begin execution at the 1 ms point in time, 2) a second permutation in which node A' is scheduled to begin execution at the 1 ms point in time and in which node B begins execution later than the 1 ms point in time, and 3) a third permutation in which node B is scheduled to begin execution at the 1 ms point in time and in which node A begins execution later than the 1 ms point in time. FIG. 4B illustrates these different scheduling branches with a scheduling branch 450 representing the first permutation, a scheduling branch 452 representing the second permutation, and a scheduling branch 454 representing the third permutation.

Returning to FIG. 4A, in some embodiments, the BNB process 400 include a branch analysis 408. The branch analysis 408 may include identification of potential scheduling branches with respect to the branching node most recently scheduled during the BNB process 400. In these or other embodiments, the scheduling branch identification may include identifying as respective scheduling branches, different permutations of schedules that may be possible from the branching node. In some embodiments, the permutations may only include a certain number of levels below the branching node. For example, the permutations may only include nodes one level below the branching node (e.g., child nodes of the branching node) or nodes within two levels below the branching node (e.g., child nodes and grandchild nodes of the branching node).

In these or other embodiments, the branch analysis 408 may include determining or identifying one or more branch characteristics 410 of each of one or more of the identified scheduling branches. In some embodiments, the one or more branch characteristics 410 may include respective total execution times of the scheduling branches. Additionally or alternatively, the one or more branch characteristics may include runnable placement. For example, in some embodiments, certain runnables (e.g., critical path runnables) may have a higher scheduling prioritization than other runnables. In some embodiments, the branch characteristics may be used to identify where such runnables are located in the scheduling order associated with the different branches. In these or other embodiments, the branch characteristics may include weighting of the different scheduling branches based on the runnable placements in which scheduling branches that schedule higher prioritized runnables may be weighted higher than scheduling branches that schedule higher prioritized runnables later.

In some embodiments, a respective total execution time of a respective scheduling branch may be determined by identifying a minimum possible amount of time that it may take to execute all the runnables if the respective scheduling branch were to be selected. In these or other embodiments, the total execution time may be determined by relaxing one or more execution constraints of the remaining unscheduled runnables. For example, in some embodiments, dependency constraints may be relaxed such that the total execution times may be determined by adding all the execution times of the remaining unscheduled runnables. Additionally or alternatively, in determining the total execution times, it may be assumed that all child runnables that immediately depend from a same parent runnable may be executed at the same time, even if other execution constraints may limit such implementations. Note that the term "minimum" with respect to the total execution times may not refer to the absolute or actual minimum amount of time for execution, but instead a determined minimum execution time according to certain calculation parameters that may be used.

Relaxing the constraints as indicated in the present disclosure may allow for a quick analysis regarding which total execution times may be longest. For example, upon relaxing dependency constraints and packing all GPU work back to back on a particular GPU, it may be determined that the total schedule cannot be smaller than 60 ms. But, in a same setup, if all DLA work is packed back to back on a DLA it may be determined that the total schedule length cannot be smaller than 65 ms. As indicated and discussed in further detail in the present disclosure, the largest of such determinations may be selected to prune out branches.

By way of example, referring again to FIG. 4B, a total execution time of the scheduling branch 450 may be determined as being 5 ms by adding up the longest possible execution time through the compute graph 460 from node A to the end of the compute graph if the scheduling branch 450 were used. In particular, the longest execution time for the scheduling branch 450 is the sum of the execution times of nodes A, A', and D. The execution time of node B may be ignored because it is shorter than that of A' and in the scheduling branch 450, nodes B and A' are scheduled concurrently. Further, the assumption may be made that nodes E and D are executed at the same time such that the execution time of node E may be ignored since it is shorter than that of node D. As other examples, the total execution times of the scheduling branches 452 and 454 may each be 6 ms due to nodes A' and B being scheduled serially instead of concurrently in those scheduling branches.

Returning to FIG. 4A, in some embodiments, the branch characteristics 410 may additionally or alternatively include execution constraint compliance. For example, it may be determined whether the respective branches violate dependency constraints and/or submitter/submittee constraints.

In some embodiments, the BNB process 400 may include an application data analysis 402 that may be similar or analogous to the application data analysis 302 of FIG. 3A. For example, the application data analysis 402 may include one or more of a runnable dependency analysis, critical path identification, a runnable categorization analysis, a runnable hierarchy analysis, and/or a compute engine analysis such as described at least with respect to FIGS. 3A and 3B. In these or other embodiments, the application data analysis 402 may be used to determine one or more scheduling parameters 417, which may be similar or analogous to the scheduling parameters 316 of FIG. 3A.

In general, the BNB process 400 may be configured to build the schedule 404 by selecting scheduling branches based on a branch selection 412. The branch selection 412 may include eliminating one or more of the identified scheduling branches from consideration according to one or more bounding constraints 416 that may be applied with respect to the respective scheduling branches. In the present disclosure reference to "elimination" of a scheduling branch from consideration may include identifying a scheduling branch and then removing the scheduling branch from consideration. Additionally or alternatively, reference to "elimination" of a scheduling branch from consideration may include ignoring the possibility of the scheduling branch even existing.

In some embodiments, the bounding constraints 416 may be based on certain heuristics that may accordingly help avoid searching spaces with less likelihood of optimality. In these or other embodiments, the bounding constraints 416 may include one or more of a total time constraint, a runtime constraint, a bubble avoidance constraint, a dependency constraint, and/or a submitter/submittee constraint. Further, although the bounding constraints 416 are depicted as being separate from the branch characteristics 410 in FIG. 4A, as indicated in the present disclosure, in one or more instances, one or more of the bounding constraints 416 may be determined based on one or more of the branch characteristics 410. In addition, in some embodiments, one or more of the bounding constraints 416 may be based on one or more of the scheduling parameters 417, such as described in the present disclosure.

In some embodiments, the total time constraint may be such that any scheduling branches that have a respective total execution time (such as determined in the branch analysis 408) that is greater than the total time constraint are removed from consideration. In some embodiments, the total time constraint may be determined based on the respective total execution times of the scheduling branches. For example, the total time constraint may be the lowest total execution time of the total execution times of the scheduling branches. Additionally or alternatively, the BNB process 400 may be an iterative process and the total time constraint may be the lower of the total execution time of a previously determined interim schedule or the lowest total execution time of the total execution times of the scheduling branches currently being analyzed.

By way of example, referring again to FIG. 4B, in this example, the total time constraint with respect to the branching at node A (and consequently with respect to the scheduling branches 450, 452, and 454) may be 5 ms (which may be determined based on a previous scheduling iteration as discussed in further detail in the present disclosure). Accordingly, the scheduling branches 452 and 454 may be eliminated from consideration because they have total execution times greater than 5 ms. Additionally, at this juncture the scheduling branch 450 may not be eliminated because it is currently determined that its total execution time may be less than or equal to 5 ms. As also illustrated in FIG. 4B, similar types of elimination may be performed with respect to other scheduling branches.

In some embodiments, the runtime constraint may include a minimum execution time of runnables to trigger the generation of a scheduling branch. For example, if two child runnables of a parent runnable (e.g., as indicated by dependency information included in the scheduling parameters 417) each have execution times that are less than the minimum execution time, rather than identifying multiple corresponding scheduling branches from their corresponding parent runnable, one of the potential scheduling branches may be used and the others may be ignored. By way of illustration, referring to FIG. 4B, if the runtime constraint was 3 ms, then rather than identifying and choosing between the scheduling branches 450, 452, and 454, one of those branches would merely be scheduled. In some embodiments, the one that would be scheduled may just be based on the order that the nodes A' and B are encountered during the BNB process 400.

As another example regarding the runtime constraints, if a parent runnable has three child runnables and two of the three child runnables have execution times that are less than the minimum execution time, the scheduling branches that may be analyzed and/or identified may all have the same execution scheduling with respect to the two child runnables that have execution times that are smaller than the minimum execution time. As such, scheduling branches that correspond to different permutations of these two child runnables may be dismissed.

In some embodiments, the runtime constraint may be determined based on a runtime percentile of the runnables. For example, in some instances, the runtime constraint may be set at the $90^{th}$ percentile (as a non-limiting example) runtime such that branching may only occur with respect to the top 10% longest running runnables. In some embodiments, the BNB process 400 may be an iterative process and the runtime constraint may be adjusted during different iterations. Further, the results of previous iterations may be used to inform the decisions of current iterations For example, during a first iteration, a first interim schedule may be determined using a first runtime constraint that corresponds to the $90^{th}$ percentile runtime. The first interim schedule may also include a first total runtime associated therewith. Additionally, the first total runtime may be used as an initial total time constraint for a second iteration of the BNB process 400, which may eliminate one or more scheduling branches more quickly. Further, the second iteration may use a lower percentile runtime (e.g., $80^{th}$ percentile) as the runtime constraint. In some embodiments, the BNB process 400 may continue such a process by lowering the percentile runtime for each subsequent iteration. The process of starting with a relatively high runtime constraint and moving toward lower runtime constraints (e.g., by moving from higher to lower percentile runtimes) may help improve the efficiency of the BNB process 400. For instance, in the example above, the first iteration may be performed relatively quickly because the high runtime constraint may result in relatively little scheduling branches to analyze. Further, by using the first total runtime as the initial total time constraint of the second iteration, branches that may have not been eliminated otherwise during the second iteration had the first iteration not been run first may be eliminated, which may decrease the amount of time to perform the second iteration.

In some embodiments, the bubble avoidance constraint may include avoiding analyzing scheduling branches that may include avoidable scheduling bubbles. As indicated in the present disclosure with respect to the bubble scheduling, a "bubble" may be a period of time within the intermediate schedule in which one or more compute engines may be available to execute a runnable (e.g., a period of time during which the one or more compute engines would be idle). Reference to an "avoidable" scheduling bubble may refer to bubbles at which a runnable is not scheduled but could be scheduled while still satisfying certain execution constraints (e.g., dependency constraints). Conversely, what would be considered an "unavoidable" bubble may include bubbles at which no runnables may be scheduled because doing so would violate one or more execution constraints. The bubble avoidance constraint may improve the efficiency of the BNB scheduling 400 by reducing the number of scheduling branches that may be analyzed or explored.

In some embodiments, the dependency constraint may include eliminating scheduling branches that may violate dependency restrictions (in which the dependencies may be indicated in the scheduling parameters 417). For example, the dependency constraint may be such that descendent nodes may not be scheduled before corresponding ancestor nodes due to the dependency of the descendent nodes on the ancestor nodes.

Additionally or alternatively, the submitter/submittee constraint may be such that coupling constraints associated with submitter/submittee runnable sets are met, such as described in the present disclosure with respect to the bubble scheduling. For example, the compute graph may include a submitter node A, a submitter node B, and a submitter node C. The submitter node A may have a corresponding submittee node A', the submitter node B may have a corresponding submittee node B', and the submitter node C may have a corresponding submittee node C'. The submitter/submittee constraint may be such that only scheduling branches in which the order of submittee nodes A', B', and C' in a submittee queue is the same as the order of the corresponding submitter nodes A, B, and C in a corresponding submitter queue. For instance, a scheduling branch with a submitter queue "ABC" and a submittee queue "A'C'B'" would violate the submitter/submittee constraint and accordingly would be eliminated from consideration.

In these or other embodiments, the branch selection 412 may be based on one or more of the scheduling parameters 417 related to a critical path associated with the app data 406. For example, branches that are more critical path dominant may have a higher selection weight than branches in which the critical path is less dominant. For instance, branches in which the scheduling of critical path nodes is such that they are prioritized higher than in-branch nodes or out-branch nodes may have a higher priority than other branches in which this is not as much the case. Similarly, branches in which the scheduling of in-branch nodes is such that they are prioritized higher than out-branch nodes may have a higher priority than other branches in which this is not as much the case.

In some embodiments, as indicated in the present disclosure the BNB process 400 may be configured to perform multiple scheduling iterations to improve the interim schedule until all the execution constraints included in the app data 406 are satisfied. Additionally or alternatively, the BNB process 400 may continue to perform the iterations until the improvements no longer satisfy an improvement threshold. In these or other embodiments, the BNB process 400 may continue to iterate until a certain amount of time has passed. Upon finishing the iterations, the BNB process 400 may output the settled upon schedule as the schedule 404. In some embodiments, the schedule 404 may accordingly be optimized using the BNB process 400.

For example, in some embodiments, the BNB process 400 may follow a depth-first search technique. In such embodiments, the BNB process 400 may start scheduling at the root node of the compute graph and may generate an initial schedule by applying the branch analysis 408 to identify potential scheduling branches at branching nodes as they are encountered. In these or other embodiments, the initial schedule generation may include selecting one schedule branch at each encountered branching node moving from the root node—e.g., based on one or more of the bounding constraints 416—and so on until reaching the end of the compute graph. At this point, the initial schedule may be a valid schedule and may be one large scheduling branch. In some embodiments, the branch analysis 408 may be applied to the initial schedule to determine a total execution time associated therewith, which may be used as the total time constraint, which may not have had a value prior to the initial schedule generation.

In these or other embodiments, the BNB process 400 may then backtrack up one level (e.g., to a branching node) and apply the branch analysis 408 at that branching node to identify potential scheduling branches from the now encountered branching node. In some embodiments, the backtracking may also be based on the critical path in that backtracking to critical path nodes may be prioritized higher than to in-branch nodes or out-branch nodes. Similarly, backtracking to in-branch nodes may be prioritized higher than to out-branch nodes.

The BNB process 400 may then apply the branch selection 412 to the scheduling branches that correspond to the backtracked to node to determine whether one of those branches may yield a better (e.g., faster) schedule than the initial schedule. If so, the branch selection 412 may select a branch that does yield a better schedule. Alternatively, the BNB process 400 may backtrack to another node and make the same determination. The BNB process 400 may perform or repeat this type of process to continually attempt to identify a better schedule. In response to identifying a better schedule, the BNB process 400 may then obtain a new schedule that may be an interim schedule. In some embodiments, the BNB process 400 may continue to attempt to identify a better schedule until the improvements no longer satisfy an improvement threshold. In these or other embodiments, the BNB process 400 may continue to attempt to identify a better schedule until a certain amount of time has passed. Upon finishing searching for a better schedule, the BNB process 400 may output the settled upon schedule as the schedule 404.

The BNB process 400 as described in the present disclosure may accordingly employ a branch and bound scheduling approach while accounting for challenges associated with static scheduling for heterogenous runtime systems. For example, the bounding constraints may help account for serialization constraints of certain compute engines, such as GPUs and accelerators through the use of the submitter/submittee constraints. Further, the greedy scheduling based on the runtime constraints may help reduce the amount of processing and/or time used to perform the scheduling.

Modifications, additions, or omissions may be made to the BNB process 400 without departing from the scope of the present disclosure. For example, the order of one or more of the operations described may vary than the order in which they were described or are illustrated. Further, each operation may include more or fewer operations than those described. In addition, the delineation of the operations and elements is meant for explanatory purposes and is not meant to be limiting with respect to actual implementations.

Figure 5:
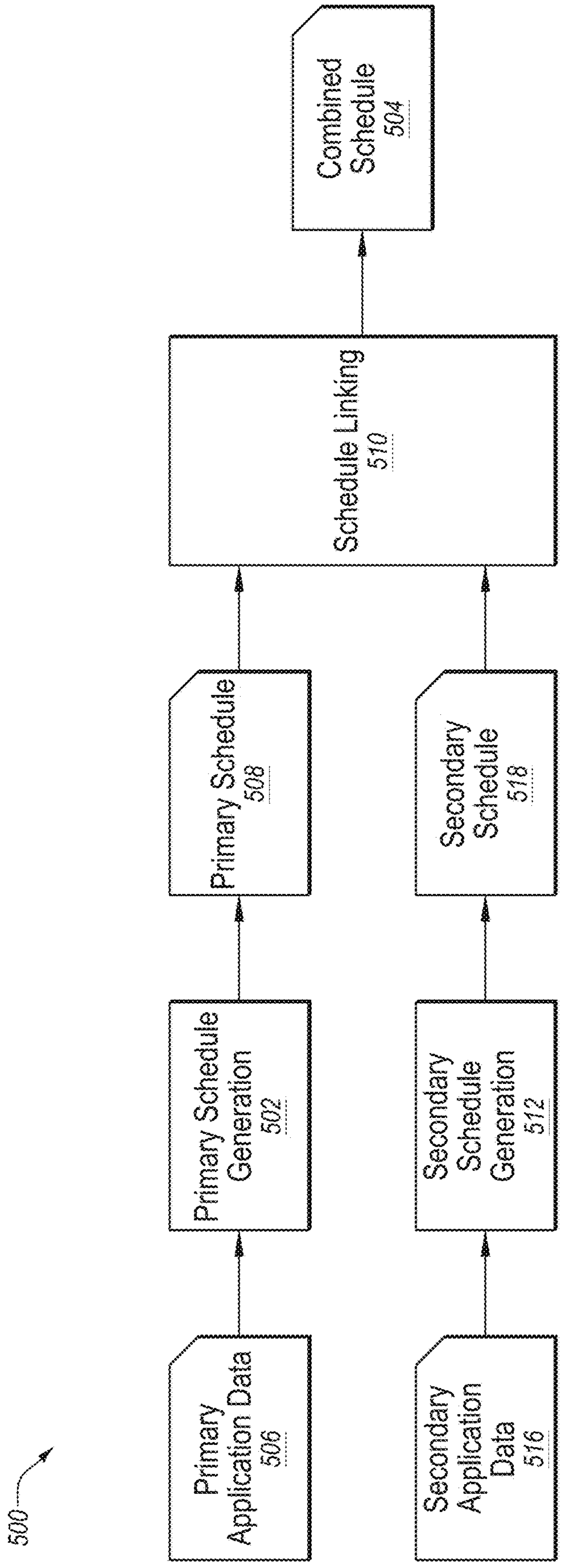
FIG. 5 illustrates an example partitioning process related to scheduling one or more secondary applications, according to one or more embodiments of the present disclosure.

FIG. 5 illustrates an example partitioning scheduling process 500 ("partitioning process 500") related to scheduling one or more secondary computing applications with respect to a primary computing application, according to one or more embodiments of the present disclosure. The partitioning process 500 may be performed by any suitable system, apparatus, or device using any combination of hardware, firmware, and/or software. For instance, various operations may be carried out by one or more processors executing instructions stored in memory. The operations of the partitioning process 500 may also be embodied as computer-usable instructions stored on computer storage media. Additionally or alternatively, one or more of the operations of the partitioning process 500 may be provided by a standalone application, a service or hosted service (standalone or in combination with another hosted service), or a plug-in to another product, to name a few. By way of example, in some embodiments, one or more operations of the partitioning process 500 may be performed by the compiler 202 (e.g., by the scheduling engine 216 of the compiler 202) described with respect to FIG. 2A. In these or other embodiments, one or more operations may be performed by one or more computing devices, such as that described in further detail at least with respect to FIG. 15.

In general, reference to a "primary computing application" may refer to a computing application for which an execution schedule is being generated and in which schedules of one or more other computing applications that are generally smaller than the primary computing application are being injected in one or more portions of the execution schedule of the primary computing application. Similarly, reference to a "secondary computing application" may be with respect to computing applications whose schedules are being injected in that of the primary computing application.

Examples of secondary computing applications may include applications that belong to different safety levels as the primary computing application. Additionally or alternatively, the secondary applications may include one or more QM applications. The QM applications may include computing processes that may be configured to verify that one or more of the computing applications that are also scheduled are operating in a certain manner. Such inclusion of such processes may be based on certain quality control requirements—e.g., safety requirements for certain ego-machine operations. The partitioning process 500 is configured to provide a mechanism for scheduling secondary applications with primary applications in a manner that allows for computing resources to be shared between the two, while also satisfying requirements that may be associated with the secondary applications—e.g., while satisfying different robustness requirements between the primary application and the secondary applications. The partitioning process 500 may accordingly help improve the efficiency of processing secondary applications.

For example, other techniques may include a complete resource separation between execution of secondary applications and primary applications. However, such a technique may result in the secondary application designated resources being underutilized. Another technique is to completely separate the execution (and consequently the scheduling) of the secondary applications and the primary applications. However, such a technique may cause resource downtime as execution is switched and may limit the ability to execute the primary applications as often as desired or required.

In some embodiments, the partitioning process 500 may include secondary schedule generation 512. The secondary schedule generation 512 may include generating a secondary schedule 518 based on secondary application data 516 ("secondary app data 516"). The secondary app data 516 may be similar or analogous to the other app data discussed herein (e.g., the app data 206, 306, and/or 406 described with respect to FIGS. 2A, 3A, and 4A). Similarly, the secondary schedule 518 may be similar or analogous to other execution schedules described herein (e.g., the schedules 204, 224, 304 and/or 404 described with respect to FIGS. 2A, 3A, and 4A), but may relate directly to a corresponding secondary application.

In some embodiments, the secondary schedule generation 512 may include generating the secondary schedule 518 according to any applicable technique. For example, in some embodiments, the secondary schedule generation 512 may include the bubble process 300 described with respect to FIGS. 3A and 3B. Additionally or alternatively, the secondary schedule generation 512 may include the BNB process 400 described with respect to FIGS. 4A and 4B.

The partitioning process 500 may also include primary schedule generation 502. The primary schedule generation 502 may include generating a primary schedule 508 based on primary application data 506 ("primary app data 506"). The primary app data 506 may be similar or analogous to the other app data discussed herein (e.g., the app data 206, 306, and/or 406 described with respect to FIGS. 2A, 3A, and 4A) and may relate to one or more primary computing applications.

In some embodiments, the primary schedule generation 502 may include generating the primary schedule 508 according to any applicable technique. For example, in some embodiments, the primary schedule generation 502 may include the bubble process 300 described with respect to FIGS. 3A and 3B. Additionally or alternatively, the primary schedule generation 502 may include the BNB process 400 described with respect to FIGS. 4A and 4B.

In these or other embodiments, the primary schedule generation 502 may also include inserting a bubble into the primary schedule 508 (referred to herein as a "secondary bubble"). As described further in the present disclosure, the secondary bubble may be inserted to allow for insertion of the secondary schedule 518 into the primary schedule 508. As such, in some embodiments, the size of the secondary bubble may be based on the length of the secondary schedule 518 in some embodiments. For instance, the secondary bubble may correspond to the same amount of time as the secondary schedule 518.

Additionally or alternatively, the secondary bubble may be sized to allow for modifications to the secondary application that may be associated with the secondary schedule 518 (which may result in changes to the secondary schedule 518). For example, the secondary bubble may be sized to be a certain percentage longer than the total execution time of the secondary schedule 518.

In these or other embodiments, the secondary bubble may be sized based on a heuristic that relates to secondary schedule lengths in general. For instance, a heuristic may be determined for a maximum possible length of execution frames of QM applications by analyzing multiple QM applications (e.g., a library of QM applications) and the secondary bubble may be sized according to the determined maximum size in instances in which the secondary application may include a QM application. In these or other embodiments, the secondary bubble may be scheduled like a runnable in a corresponding frame during the generation of the primary schedule 508. It is noted that reference to and use of the term an "maximum" in the present disclosure does not necessarily mean an absolute maximum that may be possible, but instead refers to a value that may be determined using some sort of process configured to obtain a value that may be used as a "maximum" value for certain calculations or determinations.

The partitioning process 500 may include schedule linking 510 in some embodiments. The schedule linking 510 may include combining the primary schedule 508 with the secondary schedule 518 to generate a combined schedule 504. The combined schedule 504 may be similar or analogous to other execution schedules described herein with respect to its structure and configuration (e.g., the schedules 204, 224, 304 and/or 404 described with respect to FIGS. 2A, 3A, and 4A). In some embodiments, the combining of the primary schedule 508 and the secondary schedule 518 may include injecting the secondary schedule 518 into the secondary bubble of the primary schedule 508 that is generated for the secondary schedule 518.

Modifications, additions, or omissions may be made to the partitioning process 500 without departing from the scope of the present disclosure. For example, the number of secondary schedules that may injected into the primary schedule and/or the number of times that a respective secondary schedule may be injected into the primary schedule may vary. Additionally or alternatively, the number of secondary bubbles that may be included in the primary schedule may accordingly vary.

In addition, the order of one or more of the operations described may vary than the order in which they were described or are illustrated. Further, each operation may include more or fewer operations than those described. In addition, the delineation of the operations and elements is meant for explanatory purposes and is not meant to be limiting with respect to actual implementations.

Figure 6A:
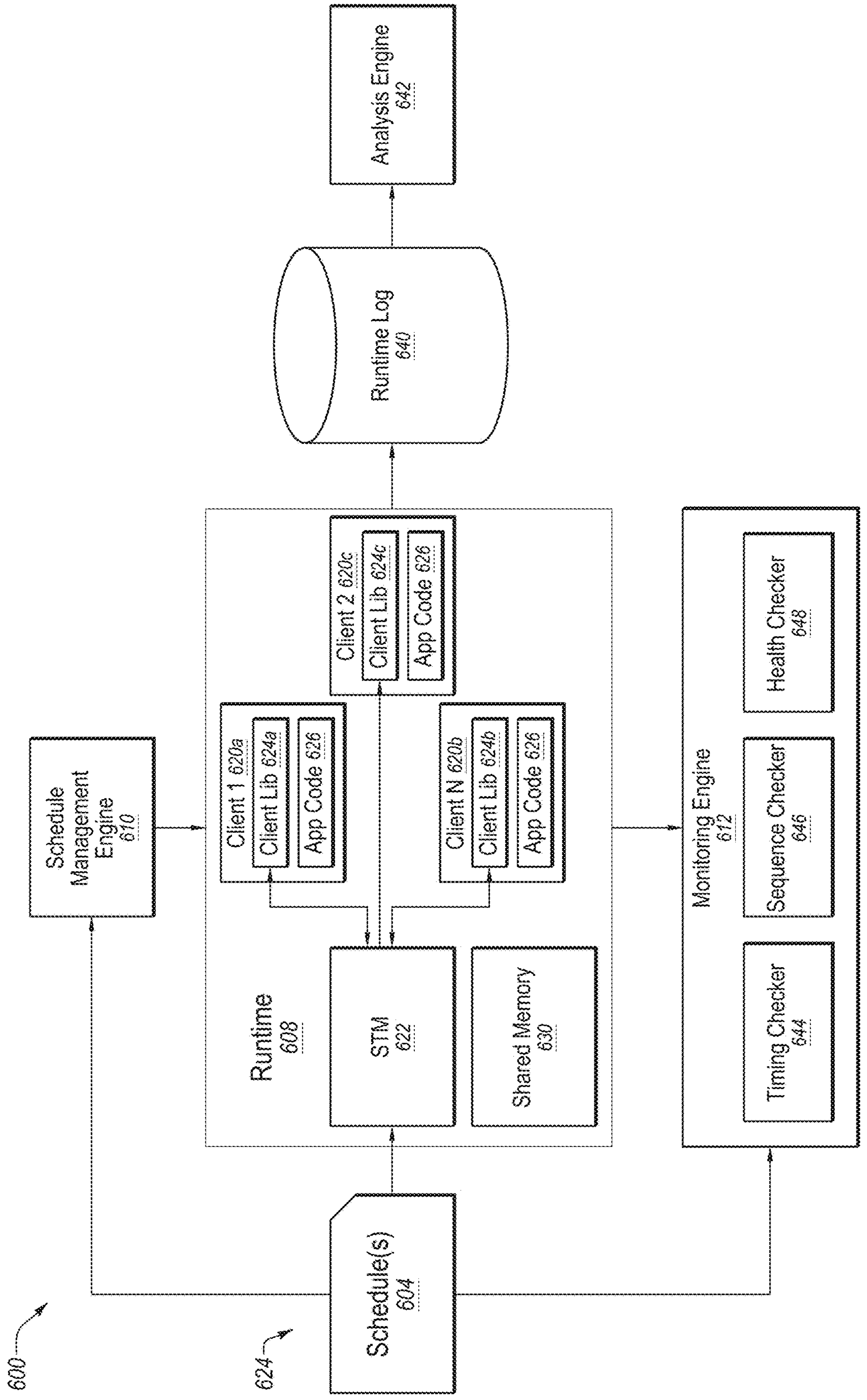
FIG. 6A illustrates an example system associated with executing execution schedules associated with one or more computing applications, according to one or more embodiments of the present disclosure.

FIG. 6A illustrates an example system 600 associated with executing execution schedules associated with one or more computing applications, according to one or more embodiments of the present disclosure. The system 600 may include a runtime system 608, a monitoring engine 612, and a schedule management engine 610 ("schedule manager 610"), in some embodiments. In general, the system 600 may relate to the execution of one or more schedules, such as a schedule 604, which may be analogous or similar to the schedules 204 described in the present disclosure. In some embodiments, the monitoring engine 612, the schedule manager 610, and/or the runtime system 608 may be configured to access the schedule 604 via a shared memory that may store the schedule 604. Additionally or alternatively, the schedule 604 may be provided to the monitoring engine 612, the schedule manager 610, and/or the runtime system 608.

In general, the runtime system 608 may be configured as a user-space scheduler that operates above the OS—thus alleviating the scheduling burden from the separate controls of the OS and the hardware engines. In addition, in these or other embodiments, the runtime system 608 may be non-preemptive, such that all runnables may be completed atomically and downstream runnables may not be called or executed until all prior runnables—e.g., runnables having associated dependencies—are executed.

The runtime system 608 being configured as indicated in the present disclosure may help overcome some issues associated with traditional systems. For example, an issue with traditional systems is that each compute engine may require its own scheduler, with an operating system (OS) scheduler on top of that, which each expose different scheduling controls and/or are not configured for control. In such systems, determinism may not be achievable through dynamic scheduling methods, and thus safety and efficacy constraints are not able to be met with enough validation to comply with strict safety requirements associated with autonomous or semi-autonomous machines.

In some embodiments, the runtime system 608 may be configured as and/or included in a heterogenous computing system that includes multiple hardware and/or software resources and corresponding compute engines, such as described in the present disclosure. In some embodiments, the computing system that corresponds to the runtime system may be referred to as an "execution computing system" or "an execution system." Additionally, the runtime system 608 may be configured to execute the schedule 604. As indicated in the present disclosure, the schedule 604 may be in the form of a set of commands ("command set") generated based on an instruction set such that the schedule 604 is extensible and may be executed by multiple clients 620 of the runtime (illustrated in FIG. 6A as clients 620*a*, 620*b*, and 620*c*).

Figure 6B:
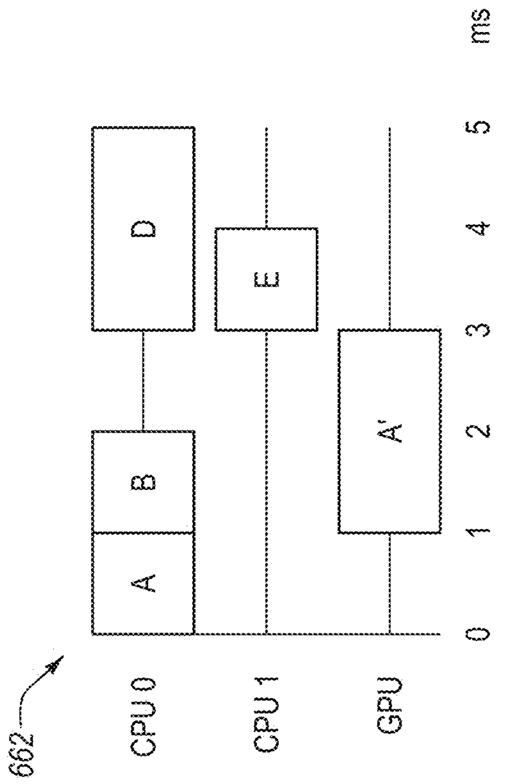
FIG. 6B illustrates an example representation of an execution schedule, according to one or more embodiments of the present disclosure.

The clients 620 may correspond to operating system processes that may include one or more runnables that are included in the schedule 604. Each runnable within a client may run on any compute engine. By way of example and not limitation, referring to a schedule 662 of FIG. 6B—which is analogous to the schedule representation 262 of FIG. 2C—runnables A, A', and E may correspond to client 620*a* executing in one operating system process. Further, runnable B of the schedule 662 may correspond to the client 620*b*. In addition, runnable E of the schedule 662 may correspond to the client 620*c*.

Returning to FIG. 6A, the runtime system 608 may include a system task management module (STM) 622, which may implement a master process related to executing the schedule 604 and/or one or more other schedules as described in further detail in the present disclosure. The STM 622 may receive the schedule 604 and its corresponding command set. The STM 622 may be configured to dispatch the portions of the command set to the clients 620 that respectively pertain to the clients 620 to respective runtime libraries 624 of the clients 620 (e.g., a runtime library 624*a* of client 620*a*, a runtime library 624*b* of the client 620*b*, and a runtime library 624*c* of the client 620*c*). For example, referring back to FIG. 6B, a first subset of the command set that corresponds to runnables A, A', and E may be dispatched to the runtime library 624*a*, a second subset of the command set that corresponds to runnable B may be dispatched to the runtime library 624*b*, and a third subset of the command set that corresponds to runnable D may be dispatched to the library 624*c*.

Application code 626 that respectively corresponds to the computing application associated with the schedule 604 may also be provided to the clients 620 and may be used by the clients 620 to register the runnables with the corresponding runtime libraries 624. In these or other embodiments, the clients 620 may then execute its own schedule of its assigned runnables based on the instructions and registration in its corresponding runtime library 624, which may handle the execution of the corresponding runnables.

As indicated in the present disclosure, the instructions may be simple, in embodiments, and may indicate the synchronization primitives—such as to "wait on Fence A," "trigger Fence B," "call function C," "call submitter D," "signal Fence E," etc. In some embodiments, the fences may be stored and managed in a shared memory 630. The shared memory 630 may be accessible by all of the clients and the STM 622 and may include the memory locations of the synchronization primitives (and corresponding fences) included in the schedule 604. Such a shared memory may allow for cross-engine, cross chip, and/or cross-process synchronization between the different clients without involvement from an overseeing engine or process, such as the STM 622 being executed on a CPU. This ability of a user-level scheduler to work across multiple processes improves isolation, which may improve for safety.

Once each client 620 receives a corresponding command set, the runtime system 608 may spawn, and the runtime system 608 may call back runnables based on how the schedule 604 is provided. Each runnable may correspond to one or more events (e.g., a start time and an end time), and each event may be logged in a runtime log 640 in some embodiments. In these or other embodiments, frame start and frame end for hyper epochs and epochs may be logged in the runtime log 640. Additionally or alternatively, other operations or events may be logged in the runtime log 640, such as special events and clock timestamps and profiling markers. Examples of the special events may include a critical failure in the scheduling system itself (e.g. for black box recording) certain points in the execution that may be marked (e.g., by a user) for tracing the computing application's execution. Clock timestamps may be used to do offline clock conversions (e.g., similar to clock mappings described in the present disclosure) for analytics—e.g., dGPU timestamps may be based on a different clock and accordingly in a different time domain than CPU timestamps. The conversions may be used for normalizing the timestamps to generate a single timeline. Profiling markers may be used for measuring performance of the execution—e.g., how long did it take to initialize, how much memory does the operations of the STM 622 take, how long do different sections of the schedule manager 610 take to execute, etc.

The runtime log 640 may be passed through to the analysis engine 642, which may analyze execution of the computing application associated with the schedule 604. Further discussion is given in the present disclosure with respect to the analysis engine 642.

In some implementations, each client 620 may be in a cooperative mode, such that if one client 620 makes a mistake it may have a downstream effect on other clients 620 depending on the safety rating. As such, ASIL clients may be required to be in sync, which is possible using the systems and methods of the present disclosure—e.g., the use of fences and the command sets may allow for such synchronization. However, for non-ASIL clients, such as quality management clients, overrun or misbehavior may not be acceptable due to different safety requirements.

In some embodiments, the schedule manager 610 may include code and routines configured to allow a computing system to perform one or more operations. Additionally or alternatively, the schedule manager 610 may be implemented using hardware including one or more processors, central processing units (CPUs) graphics processing units (GPUs), data processing units (DPUs), parallel processing units (PPUs), microprocessors (e.g., to perform or control performance of one or more operations), field-programmable gate arrays (FPGA), application-specific integrated circuits (ASICs), and/or other processor types. In some other instances, the schedule manager 610 may be implemented using a combination of hardware and software. As such, the schedule manager 610 and/or the computing system on which the schedule manager 610 may be implemented may be referred to as a managing system in some embodiments. In the present disclosure, operations described as being performed by the schedule manager 610 may include operations that the schedule manager 610 may direct a corresponding computing system to perform.

The schedule manager 610 may be configured to manage the execution of the schedule 604 by the runtime system 608. For example, the schedule manager 610 may be configured to direct the runtime system 608 to execute the schedule 604.

In these or other embodiments, the schedule manager 610 may be configured to select the schedule 604 for execution among one or more other schedules. In these or other embodiments, the schedule manager 610 may be configured to direct switching between schedules that may be executed by the runtime system 608. Such a feature may help allow for switching execution of different computing applications by switching corresponding schedules For example, in the context of autonomous operations performed by an ego-machine—such as the autonomous vehicle 1400 of FIGS. 14A-14D—different schedules may be generated that correspond to different driving functions, modes, or autonomy levels (e.g., L1, L2, L3, etc.). In such an example, a driving mode may include a parking mode, an unparking mode, a driving mode, a highway driving mode, an urban driving mode, etc. As such, rather than having a single schedule generated for all different driving modes, different schedules may be generated to optimize the schedule for the particular modules and/or computing applications that are used and/or are most important for each different driving mode. As such, a parking mode schedule may be generated, an unparking mode schedule may be generated, and so on.

These schedule switches (which may be mapped to modality switches) may occur at any time, such as based on user input (e.g., user selecting "drive," user selecting "drive" and the current location is on a highway, user selecting "drive" and the current location is in an urban environment, user selecting to "park" or "unpark," robot entering "inventor picking mode," robot entering "cleaning mode," etc.). In operation, the runtime system 608 may switch between different schedules in real-time or near real-time, to execute one schedule at a time, to have each schedule available at initialization, to have the application exist in the same or in different VMs, and/or to allow switching across different SoCs of a multi-SoC configuration.

In some embodiments, the schedule manager 610 may be configured to account for such changes. The schedule manager 610 may accordingly allow a compiler (e.g., the compiler 202 of FIG. 2A) to compile the application data associated with different computing applications separately to generate the different schedules. In these or other embodiments, each schedule may have a unique ID to be able to differentiate between and identify the different schedules.

In some embodiments, the STM 622 may accept multiple schedules during initialization and execute schedules one at a time chosen by the schedule manager 610, which may be instructed by an external application using switch API's, in some embodiments. When it is determined that a schedule change is desired—e.g., based on a received input—the schedule manager 610 may talk with the STM 622 to execute the schedule changes using, by way of example, scheduler switch APIs. The functioning phases may include a full or partial initialization, a complete swap, a partial swap, and/or an exit, as illustrated in TABLE 2.

TABLE 2

| PHASE | FEATURE | DESCRIPTION |
|---|---|---|
| 1 | Full/Partial Init | System Initialization procedure |
| 2 | Complete Swap | Schedule execution comes to a complete stop. After that, execution can restart with any different schedule. |
| 3 | Partial Swap | Schedule execution of some entity does not stop. Only the rest of the entities are disabled/enalbed during execution. |
| 4 | Exit | System exit procedure |

Figure 6C:
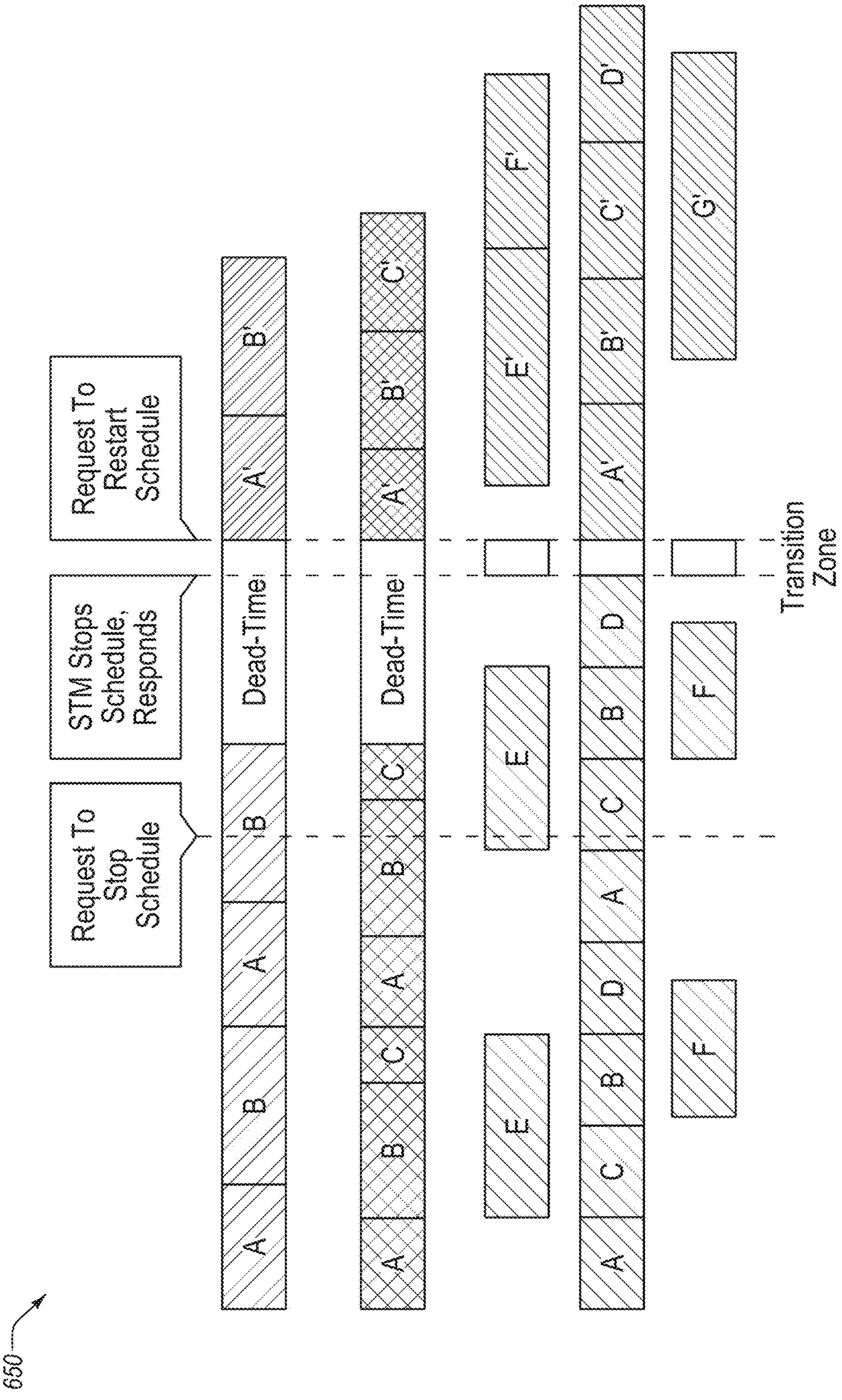
FIG. 6C illustrates an example process of a schedule switch, according to one or more embodiments of the present disclosure.

During a schedule switch, the schedule manager 610 (or another entity) may request to stop execution of the current schedule and the STM 622 may stop the schedule and respond back to the schedule manager 610. The schedule manager 610 may then request to restart the STM 622 with a new schedule. FIG. 6C illustrates an example process 650 of a schedule switch, according to one or more embodiments of the present disclosure.

Returning to FIG. 6A, during a full or partial initialization, the schedules may be initialized and registered (e.g., the processes that are to be spawned, the runnables to be registered, etc. may be initialized). Further, in instances in which more than one schedule is to be executed or in which a schedule includes one or more sub-schedules, once a schedule or sub-schedules is registered, the schedule manager 610 may direct that such registered schedules begin execution while waiting for the remaining schedules to begin or finish initialization and registration.

During a partial swap, the schedule manager 610 may direct that a portion of the schedule be stopped (e.g., one or more hyper-epochs of the schedule), while keeping the rest of the schedule (e.g., the other hyper-epochs) active. Once the portion of schedule is stopped, another subset of the schedule may be swapped in and started, all while the rest of the schedule continues operating with little to no interference.

Such a partial stop may be used in instances in which certain parameters may be met. For example, the partial swap may be invoked with respect to keeping certain safety functions executing—e.g., at all times according to some regulations—or to reduce latency for such functions, or in instances in which deadtime may not be tolerated.

For a complete swap, the schedule manager 610 may direct that the entire schedule be brought to a halt and an entire new schedule may be swapped in and started. In these or other embodiments, the complete swap may include waiting for the hyper-epochs of the schedule being stopped to complete by running to completion or No-Oping all future runnables after the reception of the schedule stop signal. This may result in some dead time in some instances. A complete swap may allow for completely different execution configurations for the previous and next schedules (e.g., hyper-epoch configurations can be different (resource assignment/period of hyper-epochs/epochs can change, runnables can be different, etc.).

During an exit, the schedule manager 610 may inform the STM 622 to stop the currently executing schedule, and the STM 622 may stop the schedule—e.g., after all hyper-epochs have finished running for a current frame—then the STM 622 may inform the schedule manager 610 that the schedule stop is complete. At this time, the schedule manager 610 may receive an indication that the runtime system 608 is ready to exit the corresponding schedule, and the runtime system 608, the STM 622, and the schedule manager 610 may exit.

In some embodiments, the monitoring engine 612 may include code and routines configured to allow a computing system to perform one or more operations. Additionally or alternatively, the monitoring engine 612 may be implemented using hardware including one or more processors, central processing units (CPUs) graphics processing units (GPUs), data processing units (DPUs), parallel processing units (PPUs), microprocessors (e.g., to perform or control performance of one or more operations), field-programmable gate arrays (FPGA), application-specific integrated circuits (ASICs), and/or other processor types. In some other instances, the monitoring engine 612 may be implemented using a combination of hardware and software. As such, the monitoring engine 612 and/or the computing system on which the monitoring engine 612 may be implemented may be referred to as a monitoring system in some embodiments. In the present disclosure, operations described as being performed by the monitoring engine 612 may include operations that the monitoring engine 612 may direct a corresponding computing system to perform.

In some embodiments, the monitoring engine 612 may be configured as a program flow monitor (PFM) configured to monitor one or more operations related to execution of the schedule 604 by the runtime system 608. In some embodiments, the monitoring may be performed during runtime while the runnables corresponding to the execution schedule are being executed.

In some embodiments the monitoring engine 612 may include a timing checker 644 that may be configured to determine whether one or more timing constraints of the runnables are being met. In these or other embodiments, the monitoring engine 612 may include a sequence checker 646 configured to determine whether the runnables are being executed in the sequence dictated by the schedule 604. Additionally or alternatively, the monitoring engine 612 may include an STM health checker 648 that may be configured to monitor health of the STM 622.

In some embodiments, the monitoring engine 612 may be implemented on a monitoring computing system that may be at least partially separate from the computing system that corresponds to the runtime system 608. Additionally or alternatively, the monitoring computing system may be part of the execution system that corresponds to the runtime system 608.

In some embodiments, the timing checker 644 may be configured to determine whether one or more of the timing constraints of the runnables are being met based on the schedule 604. For example, the timing checker 644 may be configured to compare a scheduled runtime, a scheduled start time, and/or a scheduled finish time of a particular runnable, as indicated in the schedule 604, against an actual runtime, an actual start time, and/or an actual finish time of the particular runnable. For instance, in some embodiments, determining whether the execution of the particular runnable satisfies the corresponding particular timing constraint includes determining one or more of: whether completion of the particular runnable occurred after a scheduled finish time of the particular runnable as indicated by the schedule 604; whether initialization of the particular runnable occurred before a scheduled start time of the particular runnable as indicated by the schedule 604; whether a duration of execution of the particular runnable was greater than a scheduled runtime of the particular runnable of the particular runnable as indicated by the schedule 604; whether the duration of execution of the particular runnable was less than the scheduled runtime of the particular runnable of the particular runnable as indicated by the schedule 604; whether the duration of execution of the particular runnable was equal to the scheduled runtime of the particular runnable as indicated by the schedule 604, and/or whether a runnable has been skipped (e.g., based on not receiving a timestamp associated with the runnable after a threshold amount of time after the runnable is expected to be finished). In some embodiments, one or more of the above-recited determinations may be made with respect to each of one or more frames associated with the schedule 604—e.g., after one or more epochs and/or hyper-epochs associated with frames or sub-frames of the schedule 604. In these or other embodiments, it may be determined whether the frames and/or sub-frames begin or end on time.

In these or other embodiments, the timing checker 644 may be configured to determine whether the respective runnables satisfy their respective timing constraints based on one or more timestamps that correspond to completion of the respective runnables. The timestamps may indicate times associated with execution of the runnables such as runnable start times and/or runnable finish times. In some embodiments, the timestamps may be communicated by the STM 622 to the timing checker 644. In some embodiments, the timestamps may be generated with the triggering of post-fences that correspond to the respective runnables. In these or other embodiments, the fences and corresponding memory locations accordingly may include the timestamps that correspond to the executed runnables. In these or other embodiments, the STM 622 may be configured to monitor the fences included in the shared memory and the corresponding timestamps and may communicate the timestamps to the timing checker 644.

In some embodiments, the timestamps may correspond to frames of the schedule 604. For example, a timestamp that corresponds to a start of a particular frame may be considered as a reference time or time zero "t0" with respect to the particular frame and subsequent timestamps that correspond to runnables executed during the particular frame may be considered subsequent times "t1 . . . tn" associated with the particular frame. Once the particular frame has completed, in some embodiments, the reference time may reset. In some embodiments, one or more frame timestamps may be used to determine whether the corresponding frames start or end on time.

In some embodiments, the monitoring engine 612 may operate based on a different clock than the STM 622. Additionally or alternatively, in some embodiments (e.g., given the heterogenous nature of the runtime system 608), the clock used by the STM 622 may be different from the clock used by one or more of the clients 620. According to one or more embodiments of the present disclosure, the timing checker 644 may be configured to normalize timestamps given with respect to execution of the runnables based on one or more mappings between clocks that are associated with the STM 622, the monitoring engine 612, and/or the clients 620.

In these or other embodiments, the mappings may be determined by comparing clock counts of the different engines at one or more different points in time and mapping the counts to each other. Such a mapping may allow for use of a normalized clock that is normalized with respect to all of the compute engines. In some embodiments, the STM 622 and/or the monitoring engine 612 may be configured to perform the mappings.

Additionally or alternatively, in some embodiments, the mappings may be performed periodically during execution by the runtime system 608 to help ensure accuracy of the mappings. For example, in some embodiments, the mappings may be performed after a certain number of frames. Additionally or alternatively, the mappings may be performed after every frame.

The mappings of the clocks may allow for ensuring that runnables are satisfying timing constraints in a heterogenous computing system by providing a manner to normalize the different clocks of the different compute engines. Additionally or alternatively, the mappings may allow for the monitoring engine 612 to correspond to a different system than the execution system that corresponds to the runtime system 608. Such separation may help maintain the integrity of the monitoring engine 612 in that the monitoring engine 612 may be able to detect problems associated with the execution system while also being insulated from such problems.

An example of using the mappings and timestamps to determine whether the runnables satisfy their respective timing constraints is given as follows. For example, during execution of the schedule 604, a first timestamp may be obtained by the timing checker 644. In some embodiments, the first timestamp may be communicated to the timing checker 644 by the STM 622. The first timestamp may correspond to execution of a particular runnable. For example, the first timestamp may correspond to a beginning time or an ending time of execution of the particular runnable. In addition, the first timestamp may be based on a first clock that corresponds to a particular client 620—and corresponding compute engine—of the runtime system 608 that executes the particular runnable. In some embodiments, the particular compute engine may correspond to the STM 622 and accordingly the first clock may be the same clock used by the STM 622. Additionally or alternatively, the particular compute engine may be different from that which corresponds to the STM 622 such that the first clock may be different from that used by the STM 622.

In some embodiments, the first timestamp may be “based on” the first clock in that the first timestamp may be in the same time domain as the first clock—e.g., the first timestamp value may correspond to the time domain used by the first clock—for example, in instances in which the STM 622 may use the first clock. Additionally or alternatively, the first timestamp may be “based on” the first clock in that the first timestamp may be determined based on a mapping between the first clock and another clock. For example, the STM 622 may be running on a different clock than the first clock and may obtain an intermediate timestamp that corresponds to the first clock. In some embodiments, the first timestamp may be obtained based on an intermediate mapping between the first clock and the clock of the STM 622 by mapping the intermediate timestamp to the clock of the STM 622.

In these or other embodiments, the timing checker 644 may be configured to determine a second timestamp that corresponds to a second clock of the monitoring engine 612. In these or other embodiments, the determining of the second timestamp may be based on the first timestamp and a mapping between the first clock and the second clock. For example, in instances in which the first clock corresponds to the STM 622, the determining of the second timestamp may be obtained by mapping the first timestamp to the second clock based on a direct mapping between the first clock and the second clock. Additionally or alternatively, in instances in which the first clock does not correspond to the STM 622, the second timestamp may be obtained by mapping the first timestamp to the second clock based on a mapping between the first clock and the clock of the STM 622. In such instances, the first timestamp may be determined based on the intermediate mapping between the first clock and the clock of the STM 622 such that the mapping between the first clock and the second clock in such instances may include the intermediate mapping between the first clock and the clock of STM 622 and the mapping between the clock of the STM 622 and the second clock.

In the present disclosure, the mappings are described with respect to being from the perspective of the STM 622 and/or the monitoring engine 612. However, the present disclosure is not limited to only such implementations. For example, in some embodiments, a separate engine (e.g., separate hardware module) may be configured to determine mappings between its clock and the other clocks. In these or other embodiments, the separate engine may be configured to obtain and/or normalize all of the timestamps based on such mappings. Additionally or alternatively, the separate engine may provide the normalized timestamps to the monitoring engine 612 such that the timing checker 644 may use the normalized timestamps in the timing compliance determinations.

In these or other embodiments, the timing checker 644 may be configured to determine whether execution of the particular runnable satisfies a corresponding timing constraint based on the second timestamp and the schedule 604. For example, the second timestamp may correspond to when the particular runnable ended execution. In some embodiments, the timing checker 644 may be configured to compare the second timestamp to a determined start time of the frame of the particular runnable—which may correspond to the second clock as well and in some embodiments may be based on a timestamp associated with execution of a frame-sync runnable such as described in the present disclosure. Based on the comparison, the timing checker 644 may be able to determine an amount of time that has passed from when the frame began to when the particular runnable ended. Further, the determined amount of time may be compared against an expected amount of time included in the schedule 604 corresponding to when in the frame the particular runnable is scheduled to end to determine whether the particular runnable finished before its scheduled time, after its scheduled time or at its scheduled time.

As another example with the second timestamp corresponding to when the particular runnable ended execution, the second timestamp may be compared against a timestamp associated with the particular runnable beginning execution—which may also correspond to the second clock via the mappings—to determine an execution duration of the particular runnable. The determined execution duration of the particular runnable may be compared against that scheduled in the schedule 604 to determine whether the particular runnable overran, completed early, or completed at the scheduled time.

As another example, the second timestamp may correspond to when the particular runnable started execution. In some embodiments, the timing checker 644 may be configured to determine whether the particular runnable started early, late, or on time based on a comparison between the second timestamp and the frame start time and the scheduled start time in the schedule 604.

In some instances, one or more runnables may not satisfy their respective timing constraints, but the overall frame may still be within the timing constraints. For example, in some instances a first runnable may have a shorter execution duration than scheduled and may finish earlier than scheduled. Further, a second runnable that is subsequent to the first runnable may have a longer execution duration than scheduled but may still finish on time due to the first runnable finishing early. Therefore, even though the second runnable technically violated an individual timing constraint, the overall frame did not violate its corresponding timing constraints. In some embodiments, the timing checker 644 may accordingly be configured to differentiate between frame timing violations and individual runnable timing violations. As discussed in further detail in the present disclosure, the monitoring engine 612 may be configured to perform one or more remedial operations in response to a timing violation. In some of these embodiments, the remedial operations may not be performed in response to one or more individual runnable timing violations in response to the corresponding frame still satisfying its timing constraints.

The sequence checker 646 may be configured to determine whether the execution of the runnables satisfies the execution order of the runnables included in the schedule 604. In some embodiments, the sequence checker 646 may be configured to determine whether the execution order is satisfied based on hash values that correspond to execution of the runnables. For example, a particular hash value may be calculated upon completion of a particular runnable.

In some embodiments, the particular hash value may be determined based on hash values that correspond to previously executed runnables as well as a unique value for the particular runnable. In these or other embodiments, the hash value may be based on a frame number of a frame that corresponds to the particular runnable.

By way of example, in some embodiments, a hash value that corresponds to all of a particular runnable's parent runnables may be used as a hash seed value for the particular runnable. Additionally or alternatively, the hash value that corresponds to the previous runnable that was executed on the same compute engine may be used as another hash seed value of the particular runnable. In some embodiments, the hash seed values may be combined into a single hash seed value. In these or other embodiments, the hash for the particular runnable may be determined using the hash values corresponding therewith and based on additional information corresponding to the particular runnable. In some embodiments, the hash values of respective runnables may be calculated by the corresponding runnables and communicated as seed values to the next applicable runnable.

The sequence checker 644 may be configured to compare the calculated hash value against an expected hash value that may be what the expected value of the hash would be if the particular runnable and its previously executed runnables executed in the order dictated by the execution schedule. The comparison may accordingly allow the sequence checker 644 to determine whether the execution order has been followed. In some embodiments, the STM 622 may be configured to communicate the expected hash values to the sequence checker 644.

Additionally or alternatively, the sequence checker 644 may be configured to determine types of sequence violations based on the hash value. For example, the hash value may be used to determine whether a dependency constraint has been met. For instance, if one or more parent runnables of a particular runnable did not finish executing prior to initiation of execution of the particular runnable, the hash seed value associated with the parent runnables of the particular runnable would be incorrect or incomplete. Therefore, in instances in which the hash for the particular runnable is incorrect, the expected hash seed may be compared against the actual hash seed to determine whether the sequence violation was a dependency violation.

As another example, another sequence violation may be that a particular runnable was executed out of order on its corresponding compute engine. In such an instance, since the previous runnable on the same compute engine would provide a hash seed value to the particular runnable, the hash associated with the particular runnable would be incorrect. Similar to that described in the present disclosure, the expected hash seed values and actual hash seed values may be compared to determine whether the sequence violation was an out of order violation. Such comparisons of hash values and/or hash seed values may also indicate that a runnable was skipped.

In these or other embodiments, the sequence checker 644 may be configured to perform sequence checking at the beginning or ending of each runnable. Additionally or alternatively, the sequence checker 644 may be configured to perform the sequence checking at the beginning or ending of frames and/or sub-frames. In these or other embodiments, the sequence checker 644 may perform the sequence checking after a particular threshold overrun time period has occurred after the runnables, frames, and/or sub-frames.

In some embodiments, in addition or alternatively to, the sequence checker 644 may be configured to determine whether one or more of the runnables violated sequence constraints based on timestamps associated with the runnables. In some embodiments, the timestamps may be similar to those described in the present disclosure. In these or other embodiments, the timestamps may be subject to one or more mapping operations such as described in the present disclosure.

In some embodiments, the sequence checker 644 may be configured to determine one or more sequence violations by comparing timestamps of runnables. For example, a first runnable may depend on a second runnable such that the second runnable should finish before the first runnable begins. Accordingly, a start time timestamp of the first runnable may be compared against an end time timestamp of the second runnable to determine whether the second runnable in fact started after the first runnable finished. Similar types of timestamp comparisons may be made to determine whether one or more runnables were skipped, or executed out of order.

The health checker 648 may be configured to determine whether the runtime system 608 has an execution issue via a heartbeat mechanism. For example, the health checker 648 may be configured to determine whether the runtime system 608 has an execution issue based on monitoring communications received from the STM 622. For example, the STM 622 may be configured to communicate information to the monitoring engine 612 on a regular basis, such as timestamps and/or hash values. The health checker 648 may be configured to monitor the amount of time since a most recent communication was received. In these or other embodiments, the health checker may be configured to determine whether an execution issue is present based on whether the amount of time since a most recent communication was received and before a subsequent communication has been received exceeds a duration threshold.

For example, the health checker 648 may be configured to compare a current time against a timestamp that corresponds to when the most recent communication was received—e.g., based on a timestamp associated with the most recent communication—to determine the amount of time that has passed since the most recent communication was received ("passage time"). The health checker 648 may be configured to determine if the passage time is greater than a threshold amount. In response to determining that the passage time is greater than the threshold amount, the health checker 648 may determine that the STM 622 and/or another component of the runtime system 608 has experienced an error, such as hanging out or erroring out. In some embodiments, the threshold may be based on an amount of propagation time between the STM 622 and the health checker 648 and/or a certain amount of time that would be expected between STM communications. In these or other embodiments, the threshold may be based on determined maximum propagation times of STM communications from the STM 622 to the monitoring engine 612 and/or a maximum acceptable amount of time between STM communications. The maximum acceptable amount of time may include an expected duration between STM communications plus a certain margin and/or plus the maximum propagation times of STM communications.

In some embodiments, the expected duration between STM communications may be based on the schedule 604. For example, as indicated in the present disclosure, the STM 622 may communicate timestamps to the monitoring engine 612 in response to completion of runnables. As such, the duration between STM communications may correspond to scheduled runnable execution times included in the schedule 604. Further, the expected duration may also change depending on the scheduled execution time of the currently executing or expected to be executing runnable—e.g., as indicated by the schedule 604. Additionally or alternatively, the expected duration may be based on timing frames of the schedule 604. For instance, the expected duration may be the total amount of time scheduled in the schedule 604 for a particular frame that is currently being executed.

In some embodiments, the monitoring engine 612 may be configured to monitor one or more other processes that may correspond to the runtime system 608. For example, in some embodiments, the monitoring engine 612 may be in communication with the schedule manager 610 (not expressly illustrated in FIG. 6A) and may be informed of schedule switches that may be initiated by the schedule manager 610. In these or other embodiments, the monitoring engine 612 may be configured to determine whether the STM 622 has properly executed the schedule switch.

Figure 6D:
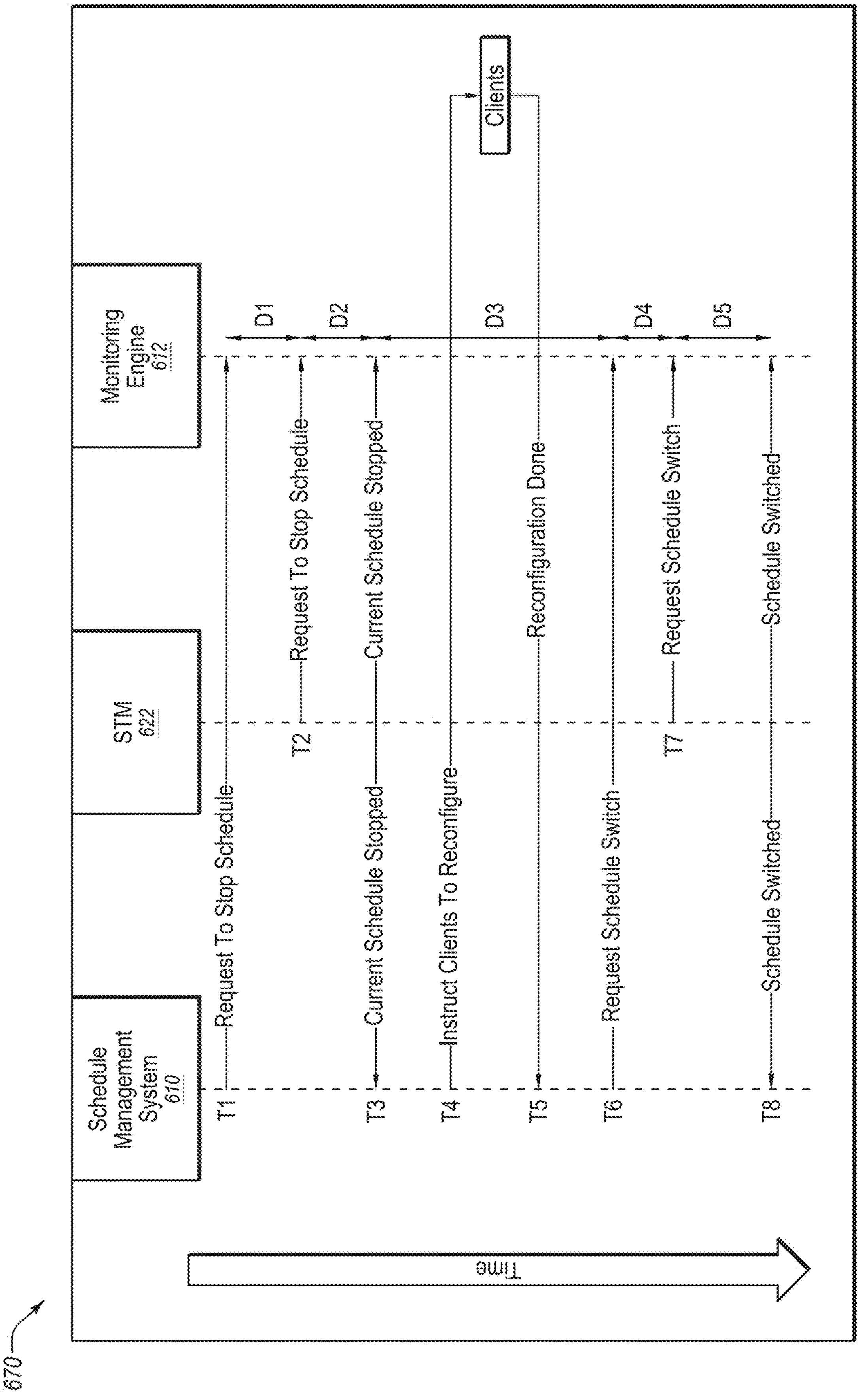
FIG. 6D illustrates an example communication process related to schedule switching, according to one or more embodiments of the present disclosure.
Figure 6E:
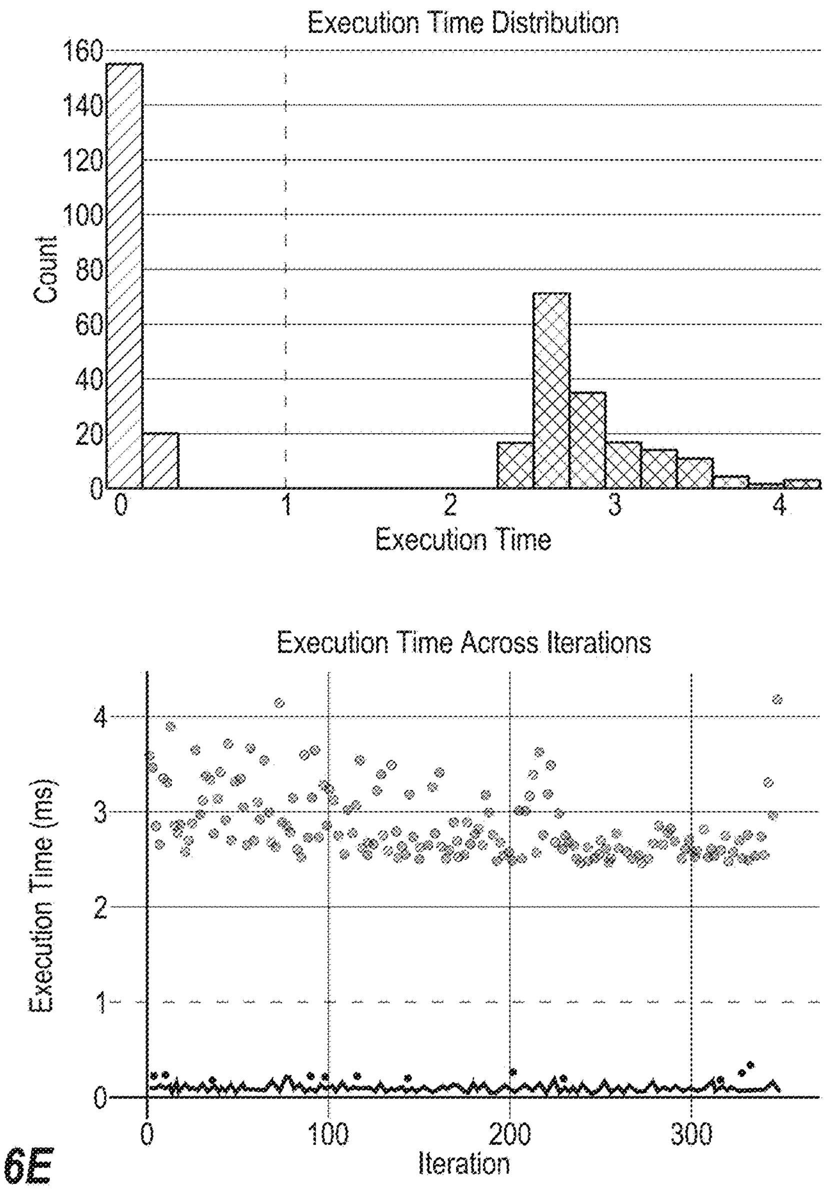
Figure 6F:
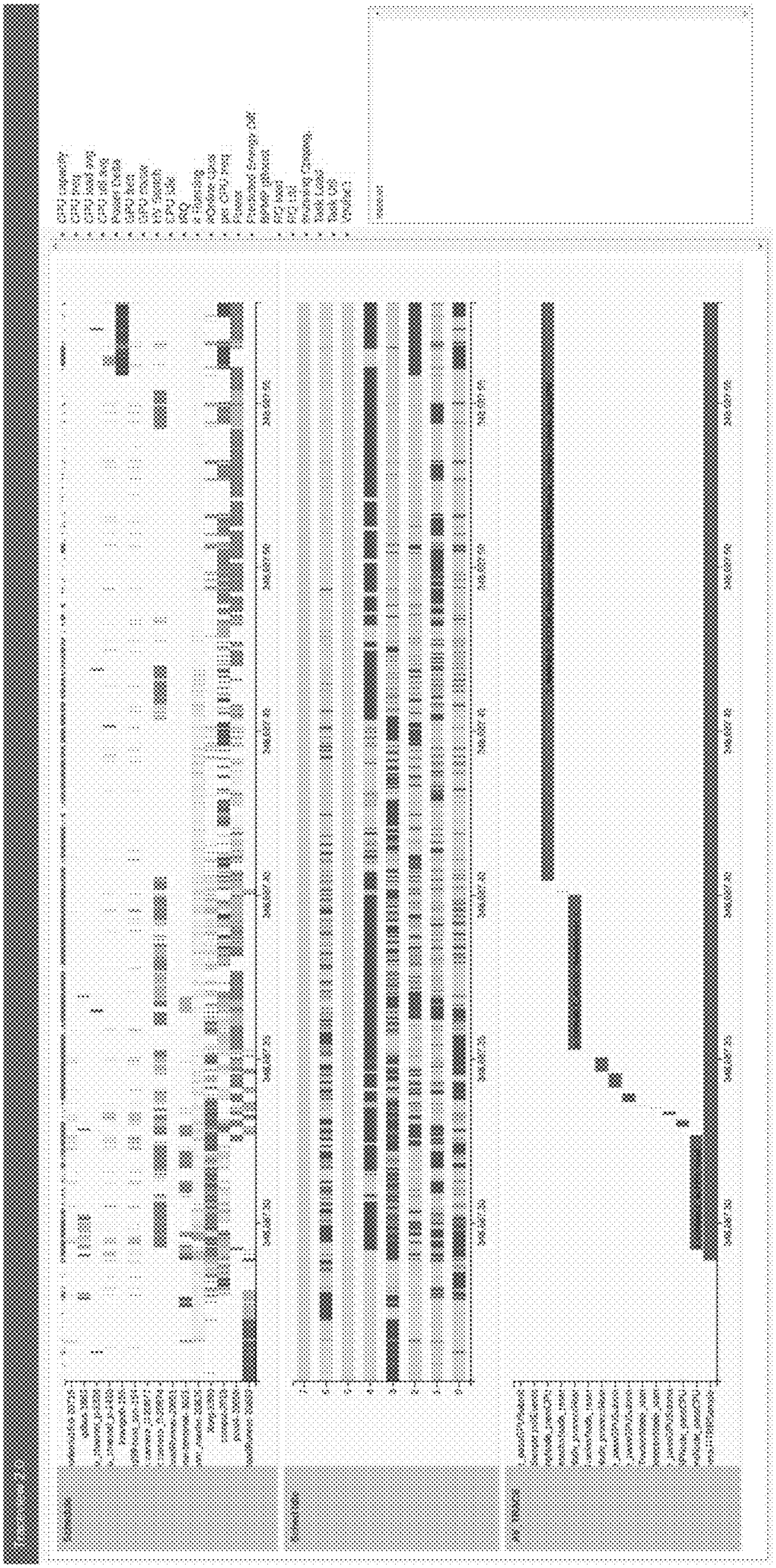
Figure 6H:
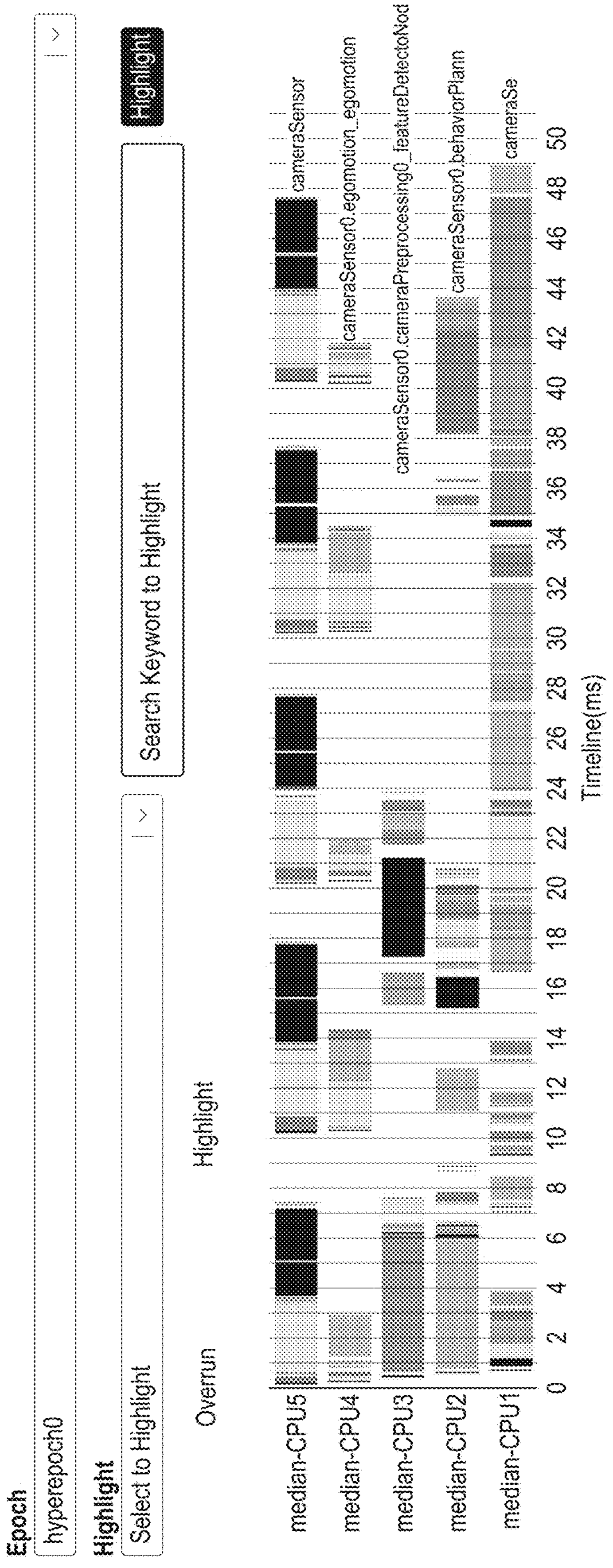

For example, FIG. 6D illustrates an example communication process 670 ("process 670") that may be performed between the schedule manager 610, the STM 622, and the monitoring engine 612 related to schedule switching, according to one or more embodiments of the present disclosure. The process 670 may begin at time T1 at which the schedule manager 610 sends a request to stop the current schedule to the STM 622 and the monitoring engine 612. At time T2, the STM 622 may forward, to the monitoring engine 612, the request received from the schedule manager 610 to stop execution of the current schedule. The monitoring engine 612 may accordingly verify at time T2 that the STM 622 received the request to stop the current schedule as the monitoring engine 612 has received the request from both the STM 622 and the schedule manager 610.

At time T3, the STM 622 may send a notification to the monitoring engine 612 and to the schedule manager 610 indicating that the STM 622 has stopped the current schedule. The monitoring engine 612 may accordingly verify at time T3 that the STM 622 in fact stopped executing the current schedule.

At time T4, the schedule manager 610 may instruct the clients 620 (or application) to reconfigure for the schedule switch. At time T5, the clients 620 may confirm reconfiguration.

At time T6 the schedule manager 610 sends a request to execute the schedule switch to the STM 622 and the monitoring engine 612. At time T7, the STM 622 may forward, to the monitoring engine 612, the request received from the schedule manager 610 to execute the schedule switch. The monitoring engine 612 may accordingly verify at time T7 that the STM 622 received the request to execute the schedule switch.

At time T8, the STM 622 may send a notification to the monitoring engine 612 and to the schedule manager 610 indicating that the STM 622 has executed the schedule switch. The monitoring engine 612 may accordingly verify at time T8 that the STM 622 in fact executed the schedule switch.

The monitoring engine 612 may determine that the STM 622 did not successfully execute the schedule switch in response to not receiving one or more of the expected communications from the STM 622. As such, the process 670 may be used to determine whether the STM 622 successfully executes schedule switches.

Returning to FIG. 6A, in some embodiments, the monitoring engine 612 may be configured to ensure that secondary applications (e.g., QM applications) are being executed properly by the runtime system 608. For example, the monitoring engine 612 may be configured to determine—e.g., based on one or more secondary frames included in the schedule 604—a time at which one or more secondary applications should be run. In these or other embodiments, the STM 622 may report to the monitoring engine 612 when a secondary application has started. The monitoring engine 612 may accordingly verify that the secondary application began at its scheduled time. In these or other embodiments, the STM 622 may report to the monitoring engine 612 when the secondary application has finished. The monitoring engine 612 may accordingly verify that the secondary application end at its scheduled time using the schedule 604. Additionally or alternatively, the STM 622 may report to the monitoring engine 612 when the STM 622 has begun disabling the secondary application following completion of the secondary application. The monitoring engine 612 may accordingly verify that the secondary application began being disabled. In these or other embodiments, the STM 622 may report to the monitoring engine 612 when the STM 622 has finished disabling the secondary application following completion of the secondary application. The monitoring engine 612 may accordingly verify that the secondary application finished being disabled.

Similar to with the process 670, the monitoring engine 612 may determine that the STM 622 did not successfully and/or properly execute the secondary application in response to not receiving one or more of the corresponding expected communications from the STM 622. As such, in some embodiments, the above process described with respect to secondary execution may be used to determine whether the STM 622 successfully executes secondary applications.

The monitoring engine 612 may be configured to cause performance of one or more remedial operations in response to identifying one or more problems associated with execution of the schedule 604—e.g., in response to identifying one or more timing violations, sequence violations, STM health issues, schedule switching problems, and/or secondary application execution problems. In some embodiments, the monitoring engine 612 may cause performance of one or more of the remedial operations by directly performing or directing performance of the remedial operations. In these or other embodiments, the monitoring engine 612 may cause performance of the remedial operations by reporting the identified one or more problems to an error handler, which may then cause or direct performance of one or more of the remedial operations. Additionally or alternatively, reporting of the one or more problems to the error handler may be considered a remedial operation.

In some embodiments, the remedial operations may include causing a modification of the schedule 604. Causing a modification of the schedule 604 may include generating a report outlining one or more of the identified problems. Additionally or alternatively, causing a modification may include providing indications of the problems to the compiler such that the compiler may correct the problems. For example, in response to one or more timing violations, the compiler may be configured to use more relaxed timing constraints (if possible) to help remedy the timing violations.

Additionally or alternatively, the remedial operations may include providing a report of the identified problems to the analysis engine 642, which may perform one or more analysis operations as discussed in the present disclosure. In these or other embodiments, the report may be included in the runtime log 640.

In these or other embodiments, the remedial operations may include initiating a safety protocol. For example, as discussed above, in some embodiments, the schedule 604 may relate to autonomous operations performed by an ego-machine, such as an autonomous vehicle. In some instances, a failure of one or more of the autonomous operations may result in less than desirable results—e.g., initiate a schedule switch/stop to direct the ego-machine to do a minimal risk maneuver and/or to disable primary system and fall back to backup system. As such, the safety protocol may include performing an emergency operation that moves the ego-machine out of harms way and causes the ego-machine to stop.

In some embodiments, the analysis engine 642 may include code and routines configured to allow a computing system to perform one or more operations. Additionally or alternatively, the analysis engine 642 may be implemented using hardware including one or more processors, central processing units (CPUs) graphics processing units (GPUs), data processing units (DPUs), parallel processing units (PPUs), microprocessors (e.g., to perform or control performance of one or more operations), field-programmable gate arrays (FPGA), and/or application-specific integrated circuits (ASICs). In some other instances, the analysis engine 642 may be implemented using a combination of hardware and software. As such, the analysis engine 642 and/or the computing system on which the analysis engine 642 may be implemented may be referred to as an analysis system in some embodiments. In the present disclosure, operations described as being performed by the analysis engine 642 may include operations that the analysis engine 642 may direct a corresponding computing system to perform.

As indicated in the present disclosure, the completion of events that correspond to execution of runnables may be logged in the runtime log 640. In some embodiments, the runtime log 640 may include a log of when each runnable actually started and ended. Further, the analysis engine 642 may be configured to analyze such execution.

For example, the analysis engine 642 may compile the information about runnable start and stop times from one or more execution runs of the schedule 604 by the runtime system 608. Based on the information, the analysis engine 642 may be configured to extract information such as actual runnable execution times of one or more of the runnables—e.g., average execution times of respective runnables over a set of execution runs, max execution times of respective runnables over a set of execution runs, min execution times of respective runnables over a set of execution runs, etc., which runnables are overrunning, which epochs or hyper-epochs are running longer than scheduled (also referred to as "overrunning"), a percentage of overruns over a set of execution runs, a total number of overruns over a set of execution runs, etc.

Additionally or alternatively, such metrics associated with runnables may also be determined with respect to frames, sub-frames, etc. For example, it may be determined as whether frames are under running or over running, resource utilization of frames, are frames executing when scheduled, etc.

Additionally or alternatively, the extracted information may include one or more execution time distributions that may indicate a distribution of the total execution time with respect to different runnables. For instance, a particular execution time distribution may indicate the percentage of time taken by one or more respective runnables of the total execution time of the execution run. In these or other embodiments, another execution time distribution may indicate the amount or percentage of time each compute engine is executing runnables during the execution run.

In these or other embodiments, the analysis engine 642 may be configured to analyze such obtained information with respect to expected information. For example, the actual runnable execution times may be compared against corresponding calculated worst case execution times (WCET) to determine an accuracy level of one or more of the WCETs. Additionally or alternatively, the execution time distributions may be used to determine whether certain runnables are disproportionately using resources or time. In these or other embodiments, the execution time distributions may indicate whether certain compute engines are being overutilized or underutilized.

In some embodiments, the analysis engine 642 may be configured to cause the generation and/or display of one or more visualizations of the runtime information that may be included and obtained from the runtime log 640 by the analysis engine and/or derived by the analysis engine 642 from the runtime log information. For example, FIGS. 6E-6H illustrate example visualizations of runtime information that may be obtained by (including derived by) the analysis engine 642, according to one or more embodiments of the present disclosure.

Additionally or alternatively, an analysis of overruns may be performed by the runtime log 640. The overrun analysis may be used to determine whether certain compute resources have issues or whether the underlying runnables have issues. For example, a disproportionate amount of overruns that correspond to a particular compute engine may indicate that the particular compute engine is having problems. Conversely, a particular runnable having overruns when other runnables that are executed by the same compute engine do not have overruns may indicate that the particular runnable may be problematic.

In these or other embodiments, the analysis may be used to analyze the schedule 604. For example, an analysis of runnable execution times may indicate that certain runnable execution times are significantly shorter than the allocated time in the schedule 604 for such runnables. Additionally or alternatively, the analysis of runnable execution times may indicate that other runnable execution times are longer than the allocated time in many instances (e.g., in a threshold percentage of the time). Additionally as indicated in the present disclosure, the analysis may indicate that the schedule 604 may overutilize or underutilize certain compute engines. Additionally or alternatively, the analysis may indicate that certain epochs or hyper-epochs are longer than needed or not long enough.

In some embodiments, the analysis engine 642 may be configured to perform one or more modification operations based on the analysis of the runtime information included in the runtime log 640. For example, the analysis engine 642 may be configured to adjust one or more factors included in application data that is used to generate the schedule 604. For instance, the analysis engine 642 may adjust one or more respective WCETs of one or more runnables in corresponding runnable data based on the analysis. Additionally or alternatively, the analysis engine 642 may be configured to adjust one or more execution constraints such as epoch times, hyper-epoch times, compute engine utilizations, etc. In these or other embodiments, the analysis engine 642 may indicate to the compiler and/or a user direct adjustments that may be made to the schedule 604. Further, in some instances, the runtime information may indicate which runnables may be contending on resources and interfering with each other. In these or other embodiments, the modification operations may include mutually excluding the scheduling of such runnables.

Modifications, additions, or omissions may be made to the embodiments and examples described herein with respect to FIGS. 6A-6H without departing from the scope of the present disclosure. For example, it should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1400 of FIGS. 14A-14D, example computing device 1500 of FIG. 15, and/or example data center 1600 of FIG. 16.

Figure 7:
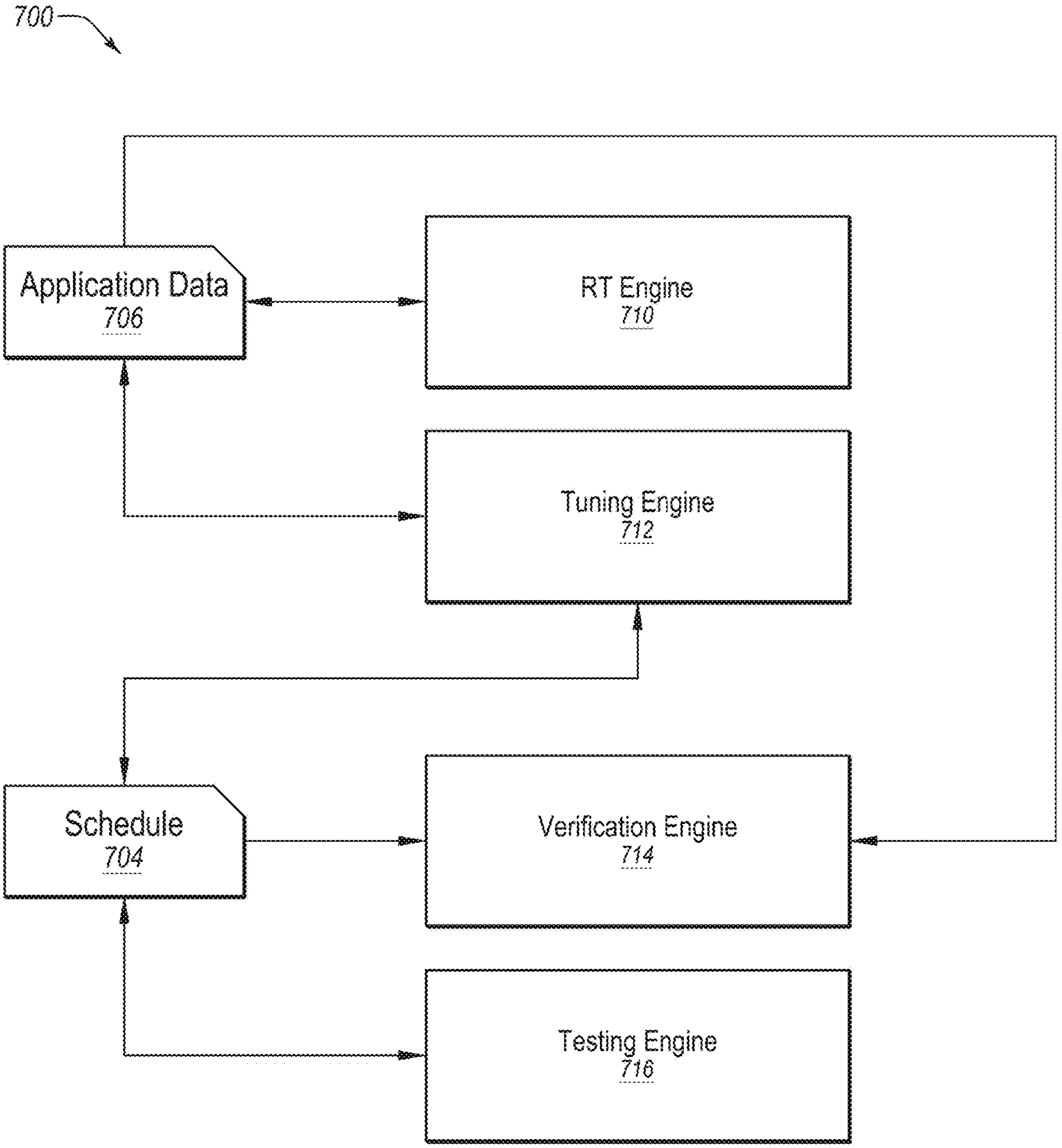
FIG. 7 illustrates an example QA system configured to perform one or more schedule QA operations, according to one or more embodiments of the present disclosure.

FIG. 7 illustrates an example QA system 700 configured to perform one or more schedule QA operations, according to one or more embodiments of the present disclosure. In the example of FIG. 7, the QA system 700 may include one or more of a runtime check engine 710 ("RT engine 710"), a tuning engine 712, a verification engine 714, or a testing engine 716. In some embodiments, the QA system 700 may be configured to perform the QA analysis with respect to application data 706 ("app data 706") and/or a schedule 704. The app data 206 of FIG. 2A may be an example of the app data 706 and the schedule 204 or the intermediate schedule 224 of FIG. 2A may be an example of the schedule 704.

One or more of these engines of the QA system 700 may include code and routines configured to allow a computing system to perform one or more operations. Additionally or alternatively, one or more of these engines may be implemented using hardware including one or more processors, central processing units (CPUs) graphics processing units (GPUs), data processing units (DPUs), parallel processing units (PPUs), microprocessors (e.g., to perform or control performance of one or more operations), field-programmable gate arrays (FPGA), and/or application-specific integrated circuits (ASICs). In some other instances, one or more of these engines may be implemented using a combination of hardware and software. As such, in some embodiments, one or more of these engines may be configured as or part of a corresponding computing system. In the present disclosure, operations described as being performed by one of these engines may include operations that the corresponding engine may direct a corresponding computing system to perform. Further, the specific discussion and separation of these engines is to help facilitate the explanation of certain operations performed by the QA system 700 and is not meant to a be a limiting implementation.

The RT engine 710 may be configured to perform a dynamic analysis with respect to the code of a computing application (e.g., the code of one or more runnables of the computing application) that may be included in the app data 706. In general, the RT engine 710 may be configured to identify portions of the code that may cause problems associated with executing the computing application according to the schedule 704.

For example, the schedule 704 may dictate synchronization and scheduling of runnables of the computing application. Additionally, in some instances, the code of computing applications may attempt to handle such synchronization. However, the synchronization included in the code may be inconsistent with the schedule 704, which may lead to issues such as deadlocks.

The RT engine 710 may accordingly be configured to identify elements of the computing application code that may cause such issues and may provide a message indicating that such portions may be or are prohibited or incompatible with a target use of the computing application. The indication may accordingly allow a developer of the computing application to make changes accordingly.

Some examples of types of code elements that the RT engine 710 may be configured to identify are synchronization APIs that may be configured to perform synchronization operations. For example, one or more different CUDA APIs may perform some sort of synchronization, which may be implicit or explicit. As such, in some embodiment, the RT engine 710 may be configured to identify CUDA APIs as being potentially problematic (e.g., flag such sections as being prohibited or incompatible).

Another example of code elements that the RT engine 710 may be configured to identify may include a runnable that is not indicated as a submitter runnable submitting work to a submittee compute engine, such as a GPU. Runnables that are not indicated as submitter runnables may include runnables whose work and related work is designated in the app data 706 as being strictly performed by a CPU. As such, if such a runnable submits work to a GPU, this may be inconsistent with the corresponding execution constraints used to generate the schedule 704. Therefore, the RT engine 710 may be configured to identify and flag such elements as being potentially problematic.

Other examples of code elements that may be identified as potentially problematic may include looking for certain memory allocations during runtime that may affect determinism. For example, checking whether any GPU memory is pinned (not-pageable), which may negatively affect determinism because page swaps may be performed randomly during runtime.

The tuning engine 712 may be configured to tune one or more of the schedule 704 and/or the application data 706. For example, as indicated in the present disclosure, the tuning engine 712 may be configured to determine and/or modify one or more respective WCETs of one or more runnables.

In some embodiments, the tuning engine 712 may be configured to use the schedule 704 and/or a compute graph of the app data 706 to execute one runnable at a time in order to determine the WCET for that particular runnable. For example, where the schedule 704 includes multiple runnables on multiple different compute engines at any one time, the tuning engine 712 may only execute one runnable on one compute engine at a time, and the other runnables scheduled at that time may be delayed—e.g., pushed out for serial execution on their respective engine—such that the WCET for the current runnable may be computed without any system interference or latency from other runnables.

For example, referring back to FIG. 6B, runnable B may be scheduled to execute at a same time as runnables A' according to the schedule 662. However, the tuning engine 712 may only execute B, or only execute A' at one time in order to measure the WCET for the particular runnable on the compute engine without interference. In these or other embodiments, the tuning engine 712 may be configured to perform multiple different iterations of multiple different compute tasks for a particular runnable to determine the WCET. In some embodiments, the tuning engine 712 may be configured to select a certain percentile number of execution times as the WCET.

In these or other embodiments, the tuning engine 712 may be configured to test runnable runtimes based on a parallel execution as dictated by the schedule 704 instead of serializing the schedule 704. Additionally or alternatively, rather than explicitly directing a parallel execution, the tuning engine 712 may be configured to access a runtime log (although not explicitly illustrated in FIG. 7), such as the runtime log 640 of FIG. 6A, to compare the serialized runtimes with the parallelized runtimes.

By profiling the single runnable in this way and comparing the profile with the profile of the same runnable when executed in a concurrent setting the tuning engine 712 may be configured to determine interferences. For example, in response to an actual runtime of a runnable being higher than the WCET runtime that may be calculated by the tuning engine 712 for that runnable, the tuning engine 712 may determine that at least some of the parallel processing of other runnables may be interfering with the execution of that runnable. In these or other embodiments, the tuning engine 712 may be configured to adjust one or more respective WCETs based on the further analysis. For example, based on the concurrent analysis, one or more WCETs may be adjusted downward or upward.

Additionally or alternatively, the tuning engine 712 may be configured to automatically adjust the percentiles used to determine the WCETs based on the comparison between concurrent and serial executions. For example, the comparison may indicate that the runnables are consistently finishing substantially sooner than their calculated WCET's such that the percentile used to determine the WCETs may be lowered. Conversely, the comparison may indicate that the runnables are consistently overrunning such that the percentile used to determine the WCETs may be raised. Additionally or alternatively, the tuning engine 712 may be configured to perform a regression analysis and/or a linear multivariate analysis to determine the WCETs. Such analyses and percentile applications may be performed with respect to WCETs determined using a serial execution, a parallel execution, or a combination of the two. In some embodiments, a compiler—such as the compiler 202 of FIG. 2A—may be configured to determine a new schedule based on changes made to the WCETs.

Additionally, although not expressly illustrated in FIG. 7, the operations of the tuning engine 712 with respect to making adjustments may be based on interactions of the tuning engine 712 with one or more other components. For example, the tuning engine 712 may interact with a compiler, a runtime system, an analysis engine and/or the application data to automate this tuning process end to end—e.g., the tuning engine 712 may run the compiler to produce the serial/parallel schedules (parallel based on BSA/BNB), then uses those schedules to launch applications on the target, extracts the logs from the run, runs them through the analysis engine, gets the execution times to either tune the input DAG/Schedule or to do further analysis as indicated. Additionally or alternatively, the tuning engine 712 may be configurable for each of one or more of these operations.

The verification engine 714 may be configured to verify that the scheduling included in the schedule 704 is consistent with the execution constraints included in the app data 706. Additionally or alternatively, the verification engine 714 may be configured to verify that the schedule 704 is deterministic in that the execution order of the runnables is consistent across multiple executions. In these or other embodiments, the verification engine 714 may be configured to check for one or more different errors including determinism errors, dependency errors, post-fence errors, deadlock errors, fence signaling errors ("sig fence errors") and/or timing violation errors.

Checking for determinism errors may include checking whether the execution order of runnables in every compute engine is the same in all runs of the schedule 704. For example, two runnables, R1 & R2, may be scheduled for a particular resource (e.g., CPU, GPU, DLA, etc.) such that R2 is scheduled after R1. A determinism error may occur in response to R2 executing prior to R1 in a run of the schedule 704.

Checking for dependency errors may include checking whether all parent runnables have finished execution prior to their respective child runnables beginning execution. For example, a runnable R3 may be a parent runnable of a runnable R4 such that runnable R4 depends on R3. A dependency error may occur in response to R4 beginning execution prior to R3 finishing execution.

Checking for post-fence errors may include checking whether wait instructions in the schedule 704 corresponding to waiting on certain fence values of fences are executed prior to the corresponding fence values being posted. For example, a wait instruction W may be such that W is not to be executed until a fence F has a value V associated therewith. A post-fence error may occur in response to the wait instruction W executing when the value of F is not V. Therefore, a post-fence error may be identified in response to a fence value is being waited on prior to the fence value being submitted.

Checking for sig fence errors may include checking whether fence value changes are consistent with scheduled changes. For example, to determine whether increments in integers used as fence values conform with scheduled strides.

Checking for deadlock errors may include checking whether every compute engine indicated in the schedule 704 runs to completion as scheduled. Checking for timing violations may include checking to see if every runnable starts at the time allocated in the schedule 704.

In some embodiments, the verification engine 714 may be configured to simulate execution of the schedule 704 to check for errors. In these or other embodiments, the simulation may be performed in a virtual environment that includes a virtual rendering of the runtime system that is to execute the schedule 704. In some embodiments, the virtual rendering of the runtime system may include generating virtual compute engines and corresponding compute resources. For example, different threads spawned by the runtime may be modeled as virtual resources. Additionally or alternatively, as another example, streams of certain compute engines—e.g., GPU streams—may also be modeled as virtual resources. In these or other embodiments, linear execution units may be modeled as virtual resources as well. The term "linear" may indicate that two consecutive instructions—e.g., two consecutive runnables—on a particular resource (e.g., compute engine and/or corresponding threads or streams) are guaranteed to have a happens before relationship such that "linear execution units" may be resources that have such a linear requirement. A "happens before" relationship may be that one execution unit executes before the other in the relationship. In these or other embodiments, the verification engine 714 may be configured to read the instructions—e.g., such as those included in an command set such as described in the present disclosure—included in the schedule 704 and to cause the instructions to be executed in the virtual environment.

Additionally or alternatively, the simulation may include using certain parameters to help facilitate the simulating. For example, in some embodiments, each virtual compute engine may be completely isolated from the other virtual compute engines to ensure that the virtual compute engines do not interfere with each other, which may help allow for checking for determinism errors. Additionally or alternatively, the signaling performed in the simulation may be modeled as being instantaneous. In these or other embodiments, vector clocks may be used to simulate the timestamps. The vector clocks may include integer values that respectively correspond clock values associated with the different virtual compute engines. Additionally or alternatively, all of the synchronization primitives may be modeled as global objects.

The simulation may include iterating through the various resources and executing the corresponding instructions associated therewith. In some embodiments, the iterating may include cooperative yielding in the threads for simplicity. In these or other embodiments, the simulation may include executing an infinite while loop that iteratively works through the instructions associated with the different resources. For example, the while loop may start with a first resource that is indicated as executing the first runnable of the schedule 704—e.g., thread 1 of a CPU 1, or stream 1 of GPU 1—and may execute the instructions associated therewith—e.g., the instructions associated with the corresponding runnable. The while loop may check to see if corresponding signaling has occurred for that resource—e.g., if one or more fence values have been signaled to indicate moving to another runnable. In response to fence values being signaled, the while loop may continue working through the instructions and corresponding resources. For example, when a post-fence is signaled, the corresponding fence may be set to ungate the corresponding wait on fence instructions that waits on this fence, which may trigger the execution of one or more corresponding runnables.

In these or other embodiments, every time an instruction is executed on a resource, a corresponding vector clock may be incremented. For example, every event (signal, wait, task start, task end etc.) in the simulated system may be logged with its corresponding vector clock. Every time an engine signals another compute engine, the vector clock of the receiving compute engine may be updated. Further, in some embodiments, every fence may store the timestamp of when it was signaled (e.g., via a post-fence operation) and, when the post-fence is signaled, the current timestamp of the runnable that triggers the post-fence may be stored with the fence. Similarly, when a wait on fence instruction finishes it may update its timestamp with the max of current timestamp or the timestamp of the corresponding sync object. In these or other embodiments, every compute engine may maintain its last runnable vector clock.

Additionally or alternatively, vector clocks associated with different resources may be configured based on the resources. For example, the instructions on a CUDA stream may be populated on the fly vs instructions for an underlying compute engine, which may be available at program load. Therefore, in some embodiments, CUDA instructions may have two vector clocks associated therewith—the record vector clock when the submit was done and the play vector clock when the kernel was executed.

In some embodiments, the verification engine 714 may be configured to check for one or more of the errors discussed above based on the vector clocks. For example, a vector clock V1 being less than a vector clock V2 ("$V1<V2$") may indicate that a runnable R1 corresponding to V1 finished before a runnable R2 corresponding to V2 started. Dependency errors may accordingly be identified by comparing child vector clocks to their corresponding parent vector clocks to determine whether the parent vector clocks are less than their corresponding child vector clocks. In the present disclosure, $V1<V2$ if all elements of $V1<=V2$ and at least one element of $V1<V2$ and likewise for $V1>V2$.

As another example, concurrency of vector clocks may indicate that determinism between the corresponding runnables may not be guaranteed. Therefore, determinism errors may be identified by checking whether two runnables that are not scheduled at the same time have concurrent vector clock values—e.g., vector clock V1 associated with runnable R1 may be considered concurrent to vector clock V2 of R2 (as noted by "$V1\|V2$") in response to V1 being equal to V2—e.g., $V1\|V2$ indicates that V1 is concurrent with V2; if V1 is not less than V2 and V1 is not greater than V2.

As another example, a vector clock V3 may correspond to a post-fence operation of a fence that results in the fence triggering a particular wait instruction W, which may have a corresponding vector clock V4. Therefore, V3 being less than V4 may indicate that the wait instruction W (that corresponds to V4) did not execute prior to the post-fence operation that corresponds to V3. As such, in some embodiments, post-fence errors may be identified by checking whether triggering post-fence values occur prior to their corresponding wait operation execution—e.g., in the example above by checking whether $V3<V4$.

Timing violation errors may be identified by comparing the vector clocks associated with the respective runnables to scheduled execution times of the corresponding runnables. For example, a timing violation error may be identified in response to the vector clock corresponding to a start time of a particular runnable not having a value that corresponds to its scheduled start time.

Deadlock errors may be identified by determining whether every compute engine runs to completion during the simulation. In some embodiments, this determination may be made by determining whether every compute engine executed its corresponding command set. As indicated in the present disclosure, in some embodiments, a sig fence error may be raised in response to fence changes being inconsistent with scheduled changes.

As such, in some embodiments, the verification engine 714 may be used to certify that the schedule 704 works, that there are no deadlocks, and/or that the schedule 704 is safe to execute, in some embodiments. Further, all of the streams and hardware engines may be simulated in software, and the instructions may be simulated to model an ideal runtime system. Further, such use of the verification engine 714 may be used to get around the safety burden of certifying a compiler in that the verification engine 714 may operate as a theoretical checker for the schedule 704. The verification engine 714 may therefore verify that user constraints are matched and that the operating paradigm in which the scheduling is operating is matched.

The testing engine 716 may be configured to test execution of the schedule 704 by a runtime system (e.g., the runtime system 608 of FIG. 6A). In some embodiments, the testing engine 716 may be configured to instantiate a dummy client in the runtime system. For example, the dummy client may be similar to the clients 620 of FIG. 1A, except rather than including actual application code—such as app code 626—the dummy client may include dummy code. The dummy client may also include a dummy runtime library that is configured to execute the command set of the schedule 704 with respect to the dummy code, such as described at least with respect to FIG. 6A.

The dummy code may be configured to mimic the operations of the computing application associated with the schedule 704. The mimicking of the operations may include mimicking the runtimes of runnables, the memory accessing of the runnables, the fence signaling etc., without having to actually execute the computing application. The dummy code may therefore allow for testing of runtime handling of the schedule 704 without having to actually execute the underlying computing application.

For example, to mimic runtimes, the dummy code may have execution times that correspond to WCETs of corresponding runnables. For instance, dummy code for a particular runnable with a WCET of 5 ms may include a loop that executes for 5 ms. The mimicking of memory calls and fence signaling may include triggering the dummy operations of the dummy code based on the command set of the schedule 704 as loaded in the dummy runtime library.

The use of the dummy client may accordingly be used to test for potential issues that may occur when executing the schedule 704 on the runtime system. For example, the testing may indicate whether cross engine interference may occur between two or more compute engines.

In addition, in some embodiments, the dummy code may help facilitate the testing of error handling. For example, in some embodiments, the testing engine 716 may be configured to perform different testing iterations with different versions of dummy code. The different versions may include having one or more runnables have different runtimes—e.g., longer or shorter than their respective WCETs. Additionally or alternatively, the dummy code may simulate an application crash. The different versions of dummy code may accordingly be used to determine what the runtime system does in different error scenarios. In these or other embodiments, the testing of the different error scenarios may also be used to determine how an STM of the runtime system (e.g. the STM 622 of FIG. 6A) and/or a monitoring engine (e.g., the monitoring engine 612 of FIG. 6A) handles errors. For instance, the testing may allow for a determination as to how the monitoring engine may respond to execution errors such as runnable overruns, frame overruns, execution order violations etc. similar to fault injection testing, but without involving the actual application code.

In these or other embodiments, the testing may indicate whether the STM is able to handle the errors or if the STM enters an error state. In these or other embodiments, the testing may therefore also be used to determine how well the monitoring engine may monitor the health of the STM.

In these or other embodiments, the dummy code may correspond to multiple different computing applications and/or secondary applications. In these or other embodiments, the testing engine 716 may accordingly be configured to inject errors and/or provide a testing platform with respect to the performance of schedule switches.

As indicated in the present disclosure, the testing engine 716 may accordingly facilitate the testing of one or more operations of a runtime system and/or one or more related operations without having to run actual computing application code. This may allow for easier testing of different scenarios rather than having to make changes to actual computing application code, which may be much more complex and time consuming than making changes to dummy code.

Modifications, additions, or omissions may be made to the embodiments and examples described herein with respect to FIG. 7 without departing from the scope of the present disclosure. For example, it should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1400 of FIGS. 14A-14D, example computing device 1500 of FIG. 15, and/or example data center 1600 of FIG. 16.

Figure 8:
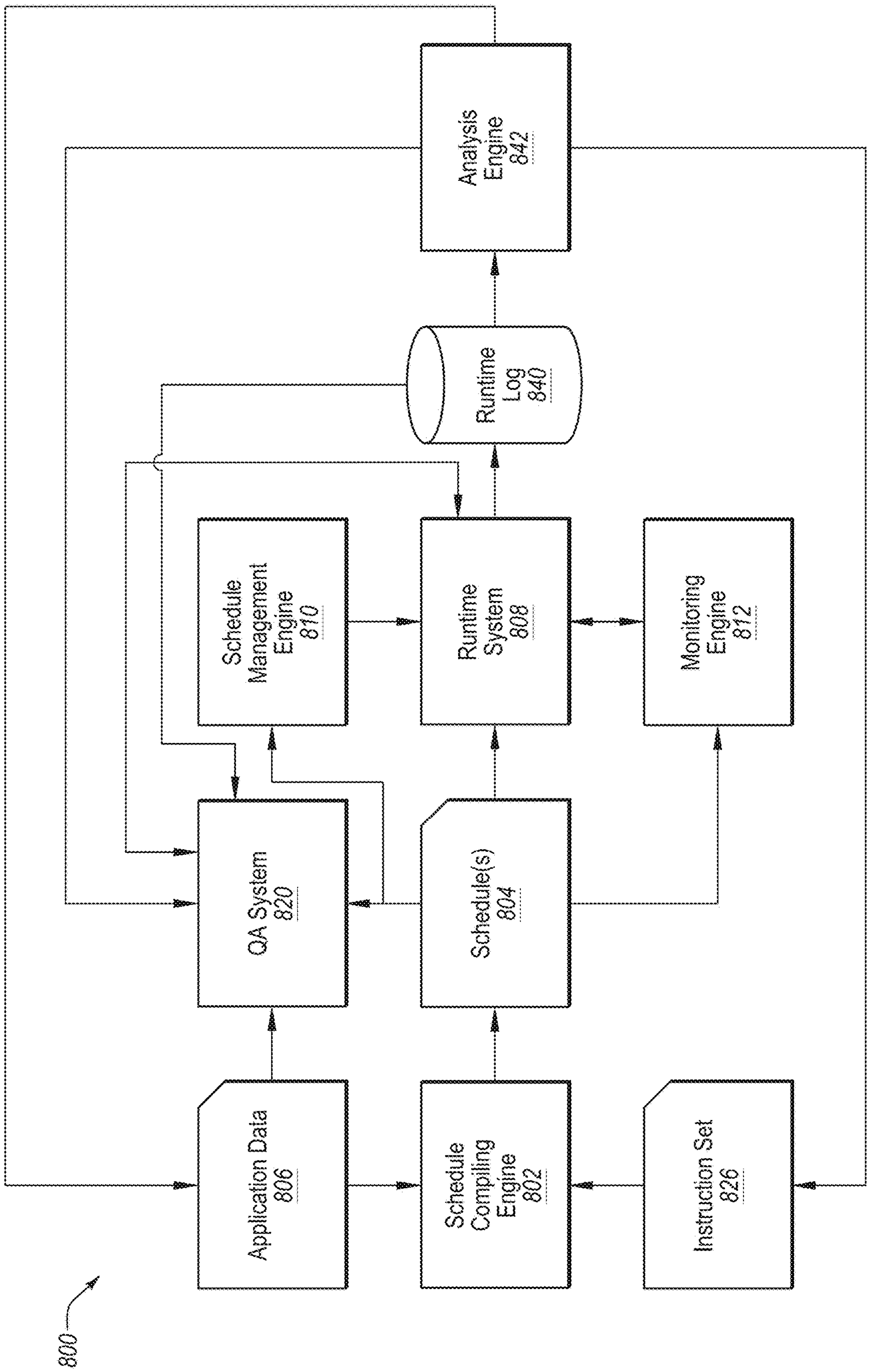
FIG. 8 illustrates an overall task management system, according to one or more embodiments of the present disclosure.

FIG. 8 illustrates an overall task management system 800 ("system 800"), according to one or more embodiments of the present disclosure. The illustration of system 800 in FIG. 8 illustrates example interactions between different aspects of the present disclosure discussed herein.

For example, the system 800 may include a schedule compiling engine 802 ("compiler 802"), which may be similar or analogous to the compiler 202 of FIG. 2A. The compiler 802 may be configured to generate one or more schedules 804 based on application data 806 and/or an instruction set 826. The application data 806 may be similar or analogous to the app data 206 of FIG. 2A, the instruction set 826 may be similar or analogous to the instruction set 226 of FIG. 2A and the schedules 804 may be similar or analogous to the schedules 204 of FIG. 2A. Additionally or alternatively, the compiler 802 may be configured to generate the schedule 804 according to one or more of the operations described at least with respect to FIGS. 2A-5.

In these or other embodiments, the system 800 may include a runtime system 808 that may be similar or analogous to the runtime system 608 of FIG. 6A. The runtime system 808 may be configured to execute the schedule 804, such as described with respect to FIG. 6A.

Additionally or alternatively, the system 800 may include a monitoring engine 812 that may be similar or analogous to the monitoring engine 612 of FIG. 6A. The monitoring engine 812 may accordingly be configured to monitor runtime operations of the runtime system 808, such as described with respect to FIGS. 6A-6D.

In these or other embodiments, the system 800 may include a schedule management engine 810 that may be similar or analogous to the schedule management engine 610 of FIG. 6A. The schedule management engine 610 may accordingly be configured to the execution of different schedules 804 by the runtime system 808, such as described with respect to FIGS. 6A-6D.

Additionally or alternatively, the system 800 may include a runtime log 840 and an analysis engine 842, which may be similar or analogous to the runtime log 640 and the analysis engine 642 of FIG. 6A. The analysis engine 842 may accordingly be configured to perform statistical analysis and/or corresponding remedial operations based on runtime data that may be included in the runtime log 840, such as described with respect to FIGS. 6A and 6E-6H.

In these or other embodiments, the system 800 may include a QA system 820 that may be similar or analogous to the QA system 700 of FIG. 7. The QA system 820 may accordingly be configured to perform one or more QA operations with respect to generation and/or execution of the schedules 804, such as described with respect to FIG. 7.

Modifications, additions, or omissions may be made to the embodiments and examples described herein with respect to FIG. 8 without departing from the scope of the present disclosure. For example, it should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1400 of FIGS. 14A-14D, example computing device 1500 of FIG. 15, and/or example data center 1600 of FIG. 16.

Figure 9:
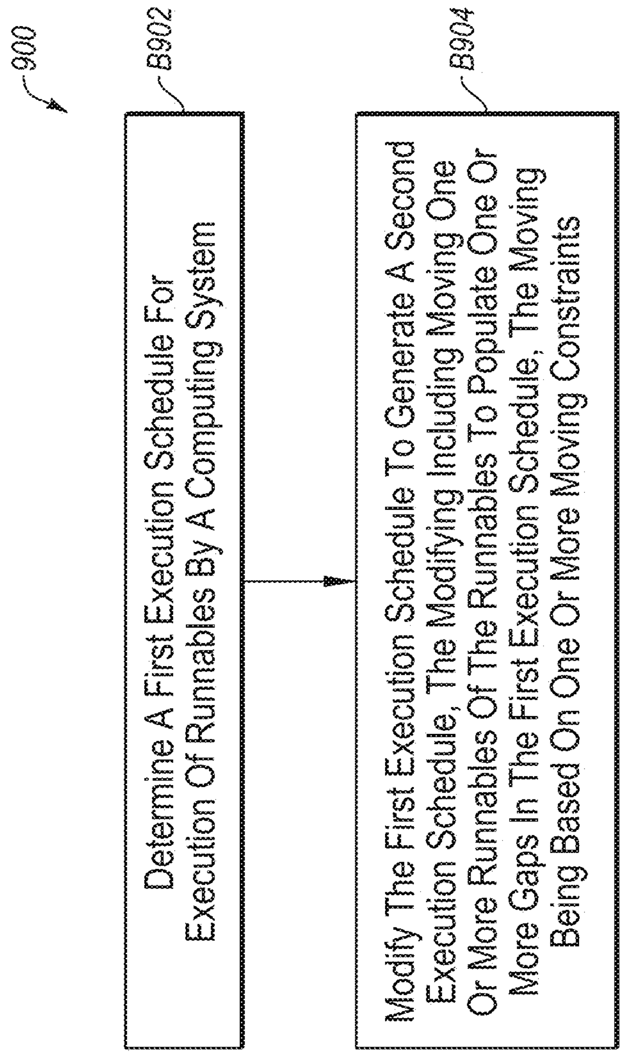
FIG. 9 illustrates an example method for generating an execution schedule based on a bubble sorting process according to one or more embodiments of the present disclosure.

FIG. 9 illustrates an example method 900 for generating an execution schedule based on a bubble sorting process according to one or more embodiments of the present disclosure. The method 900 may be performed by any suitable system, apparatus, or device using any combination of hardware, firmware, and/or software. For instance, various operations may be carried out by one or more processors executing instructions stored in memory. The operations of the method 900 may also be embodied as computer-usable instructions stored on computer storage media. Additionally or alternatively, one or more of the operations of the method 900 may be provided by a standalone application, a service or hosted service (standalone or in combination with another hosted service), or a plug-in to another product, to name a few. By way of example, in some embodiments, one or more operations of the method 900 may be performed by the schedule compiling engine 202 described with respect to FIG. 2A. In these or other embodiments, one or more operations may be performed by one or more computing devices, such as that described in further detail at least with respect to FIG. 15. In these or other embodiments, one or more operations of the method 900 may be performed by a computing system disposed on an ego-machine, such as a vehicle as described at least with respect to FIGS. 14A-14D. Additionally or alternatively, one or more of the operations of the method 900 may correspond to the process 300 described with respect to FIG. 3A.

In some embodiments, the method 900, at block B902, may include determining a first execution schedule for execution of runnables by a computing system. In some embodiments, the computing system may include or may correspond to a runtime system, such as described in the present disclosure. Additionally or alternatively, the computing system may be a heterogenous computing system, such as described in the present disclosure. In these or other embodiments, the runnables may correspond to a process (e.g., computing application) executed using the computing system.

In these or other embodiments, one or more of the interim schedules described with respect to FIG. 3A may be examples of the first execution schedule. In these or other embodiments, the first execution schedule may be determined based on an initial sequence of tasks, such as, by way of example and not limitation, described above with respect to determining an initial interim schedule based on the initial sequence 326 described at least with respect to FIG. 3A. In these or other embodiments, the initial sequence of tasks may be determined based on a critical path, such as, for example, discussed at least with respect to FIG. 3A. In these or other embodiments, the first execution schedule may be determined based on individual rankings of one or more of the runnables, such as described at least with respect to FIG. 3A (e.g., based on rankings determined based on placement in the initial sequence and/or based on respective relationships of the one or more runnables with respect to a critical path within a compute graph that includes the runnables).

At block B904, the first execution schedule may be modified to generate a second execution schedule. In some embodiments, the modifying may include moving one or more runnables of the runnables to populate one or more gaps (e.g., bubbles) in the first execution schedule. In these or other embodiments, the moving may be based on one or more moving constraints, such as one or more of the moving constraints described at least with respect to FIG. 3A.

For example, the moving constraints may include one or more of: a dependency constraint that prevents child runnables from being scheduled to begin execution prior to corresponding parent runnables finishing execution, a level constraint that restrains movement of the one or more runnables based at least on hierarchal levels associated with the one or more runnables as indicated by a compute graph that includes the plurality of runnables, or a coupling constraint related to at least one first runnable for execution on a first compute engine of the plurality of compute engines that triggers execution of at least one second runnable on a second compute engine of the compute engines of the computing system (e.g., in which the first runnable is a submitter runnable and the second runnable is a submittee runnable). In these or other embodiments, the coupling constraint may require one or more of: that the at least one first runnable and the at least one second runnable are moved together or requires that a first processing queue that includes the at least one first runnable and that is on the first compute engine matches a second processing queue that includes the at least one second runnable and that is on the second compute engine.

Modifications, additions, or omissions may be made to the method 900 without departing from the scope of the present disclosure. For example, the order of one or more of the operations described may vary than the order in which they were described or are illustrated. Further, each operation may include more or fewer operations than those described. In addition, the delineation of the operations and elements is meant for explanatory purposes and is not meant to be limiting with respect to actual implementations. For instance, in some embodiments, the method 900 may include one or more operations of the process 300 described with respect to FIG. 3A that may not be explicitly discussed with respect to the method 900. Additionally, one or more of any of the other operations described in the present disclosure with respect any of the other FIGS. may be included in the method 900 in some instances.

Figure 10:
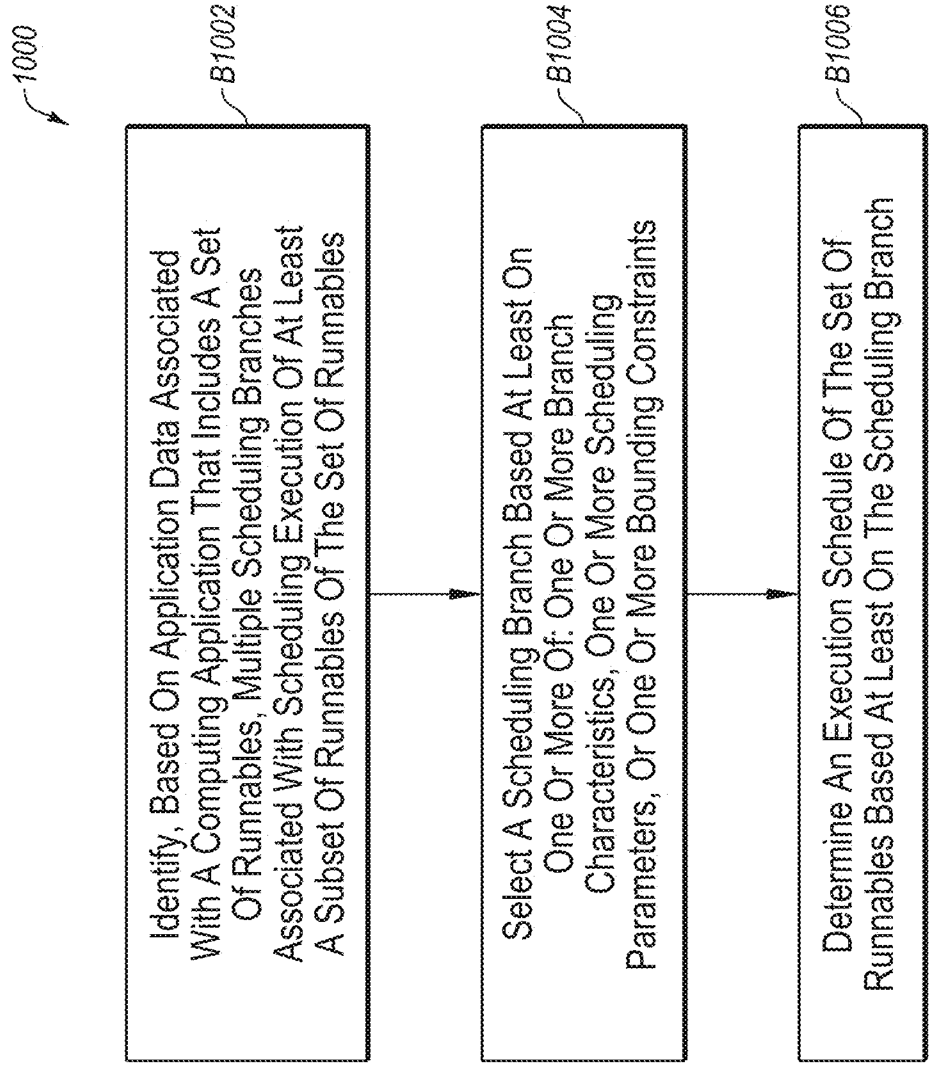
FIG. 10 illustrates an example method for generating an execution schedule based on a branch and bound (BNB) process, according to one or more embodiments of the present disclosure.

FIG. 10 illustrates an example method 1000 for generating an execution schedule based on a branch and bound (BNB) process according to one or more embodiments of the present disclosure. The method 1000 may be performed by any suitable system, apparatus, or device using any combination of hardware, firmware, and/or software. For instance, various operations may be carried out by one or more processors executing instructions stored in memory. The operations of the method 1000 may also be embodied as computer-usable instructions stored on computer storage media. Additionally or alternatively, one or more of the operations of the method 1000 may be provided by a standalone application, a service or hosted service (standalone or in combination with another hosted service), or a plug-in to another product, to name a few. By way of example, in some embodiments, one or more operations of the method 1000 may be performed by the schedule compiling engine 202 described with respect to FIG. 2A. In these or other embodiments, one or more operations may be performed by one or more computing devices, such as that described in further detail at least with respect to FIG. 15. In these or other embodiments, one or more operations of the method 1000 may be performed by a computing system disposed on an ego-machine, such as a vehicle as described at least with respect to FIGS. 14A-14D. Additionally or alternatively, one or more of the operations of the method 1000 may correspond to the process 400 described with respect to FIG. 4A.

In some embodiments, the method 1000, at block B1002, may include identifying, based on application data associated with a computing application that includes a set of runnables, multiple scheduling branches associated with scheduling execution of at least a subset of runnables of the set of runnables. In some embodiments, by way of example and not limitation, one or more operations of the branch analysis 408 of FIG. 4A may be performed to identify the scheduling branches.

At block B1004, a scheduling branch may be selected from the scheduling branches. In these or other embodiments, the scheduling branch may be selected based at least on one or more branch characteristics, one or more scheduling parameters, and/or one or more bounding constraints, such as, for example and not by way of limitation, described above with respect to FIG. 4A. For instance, in some embodiments, the scheduling branch may be selected based at least on a coupling constraint that is applied to related runnables of at least the subset of runnables. The related runnables may include a first runnable that is designated for execution on a first compute engine and that triggers execution of a second runnable on a second compute engine (e.g., in which the first runnable is a submitter runnable and the second runnable is a submittee runnable). In these or other embodiments, the coupling constraint may requires that a first processing queue that includes the first runnable and that is on the first compute engine matches a second processing queue that includes the second runnable and that is on the second compute engine.

Additionally or alternatively, the selecting of the scheduling branch may be based at least on one or more of: a total time constraint related to respective execution times of the of scheduling branches; a runtime constraint related to minimum execution times of runnables that may trigger a scheduling branch; a bubble avoidance constraint related to avoiding scheduling gaps (e.g., bubbles); a dependency constraint related to avoiding runnable dependency violations; or scheduling prioritization with respect to a critical path within a compute graph that includes the set of runnables. In these or other embodiments, the selecting of the scheduling branch may be based at least on an execution time of the scheduling branch. One or more operations of such selection are given in further detail at least with respect to the description of the process 400 of FIG. 4A.

At block B1006, an execution schedule of the set of runnables may be determined based at least on the scheduling branch. For example, an execution schedule may be generated such as at least described above with respect to the process 400 of FIG. 4A. In some embodiments, the execution schedule may be for execution of the runnables by a computing system. In some embodiments, the computing system may include or may correspond to a runtime system, such as described in the present disclosure. Additionally or alternatively, the computing system may be a heterogenous computing system, such as described in the present disclosure.

Modifications, additions, or omissions may be made to the method 1000 without departing from the scope of the present disclosure. For example, the order of one or more of the operations described may vary than the order in which they were described or are illustrated. Further, each operation may include more or fewer operations than those described. In addition, the delineation of the operations and elements is meant for explanatory purposes and is not meant to be limiting with respect to actual implementations. For instance, in some embodiments, the method 1000 may include one or more operations of the process 400 described with respect to FIG. 4A that may not be explicitly discussed with respect to the method 1000. Additionally, one or more of any of the other operations described in the present disclosure with respect any of the other FIGS. may be included in the method 1000 in some instances.

Figure 11:
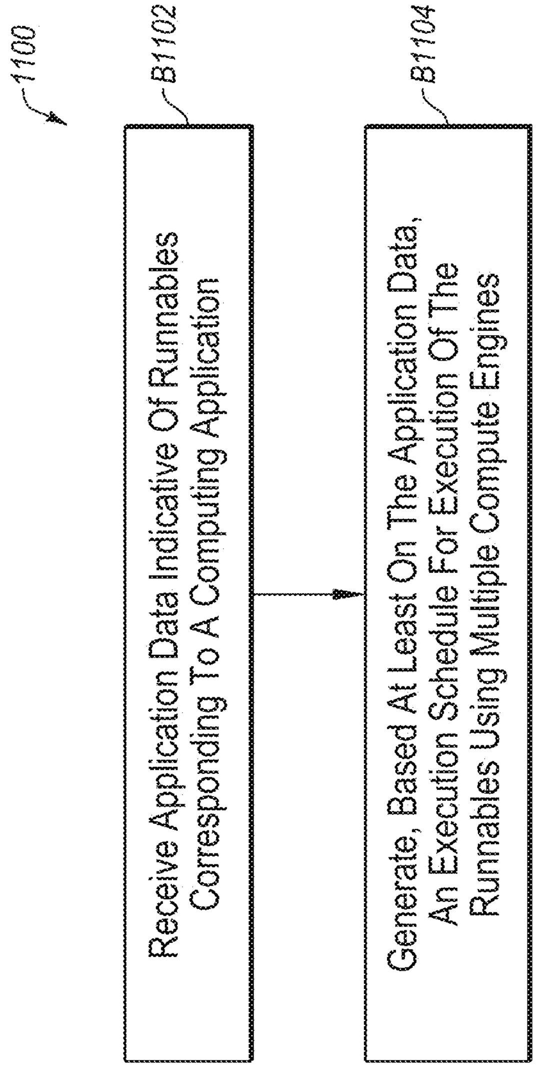
FIG. 11 illustrates an example method for generating an execution schedule using an instruction set, according to one or more embodiments of the present disclosure.

FIG. 11 illustrates an example method 1100 for generating an execution schedule using an instruction set, according to one or more embodiments of the present disclosure. The method 1100 may be performed by any suitable system, apparatus, or device using any combination of hardware, firmware, and/or software. For instance, various operations may be carried out by one or more processors executing instructions stored in memory. The operations of the method 1100 may also be embodied as computer-usable instructions stored on computer storage media. Additionally or alternatively, one or more of the operations of the method 1100 may be provided by a standalone application, a service or hosted service (standalone or in combination with another hosted service), or a plug-in to another product, to name a few. By way of example, in some embodiments, one or more operations of the method 1100 may be performed by the schedule compiling engine 202 described with respect to FIG. 2A. In these or other embodiments, one or more operations may be performed by one or more computing devices, such as that described in further detail at least with respect to FIG. 15. In these or other embodiments, one or more operations of the method 1100 may be performed by a computing system disposed on an ego-machine, such as a vehicle as described at least with respect to FIGS. 14A-14D.

In some embodiments, the method 1100, at block B1102, may include receiving application data indicative of runnables corresponding to a computing application. The various instances of application data described in the present disclosure may be examples of the received application data.

At block B1104, an execution schedule for execution of the runnables using multiple compute engines may be generated based at least on the application data. The execution schedule may include one or more commands corresponding to one or more timing fences. The one or more timing fences may dictate a timing and order of execution between at least a first runnable and a second runnable of the of runnables. In some embodiments, the commands may be based on an instruction set, such as described at least with respect to FIG. 2A. Additionally or alternatively, by way of example and not limitation, one or more of the operations described with respect to the post-processing engine 216 of FIG. 2A may be used to generate the execution schedule.

In some embodiments, the execution schedule may be for execution of the runnables by a computing system. In some embodiments, the computing system may include or may correspond to a runtime system, such as described in the present disclosure. Additionally or alternatively, the computing system may be a heterogenous computing system, such as described in the present disclosure.

Modifications, additions, or omissions may be made to the method 1100 without departing from the scope of the present disclosure. For example, the order of one or more of the operations described may vary than the order in which they were described or are illustrated. Further, each operation may include more or fewer operations than those described. In addition, the delineation of the operations and elements is meant for explanatory purposes and is not meant to be limiting with respect to actual implementations. Additionally, one or more of any of the other operations described in the present disclosure with respect any of the FIGS. may be included in the method 1100 in some instances.

Figure 12:
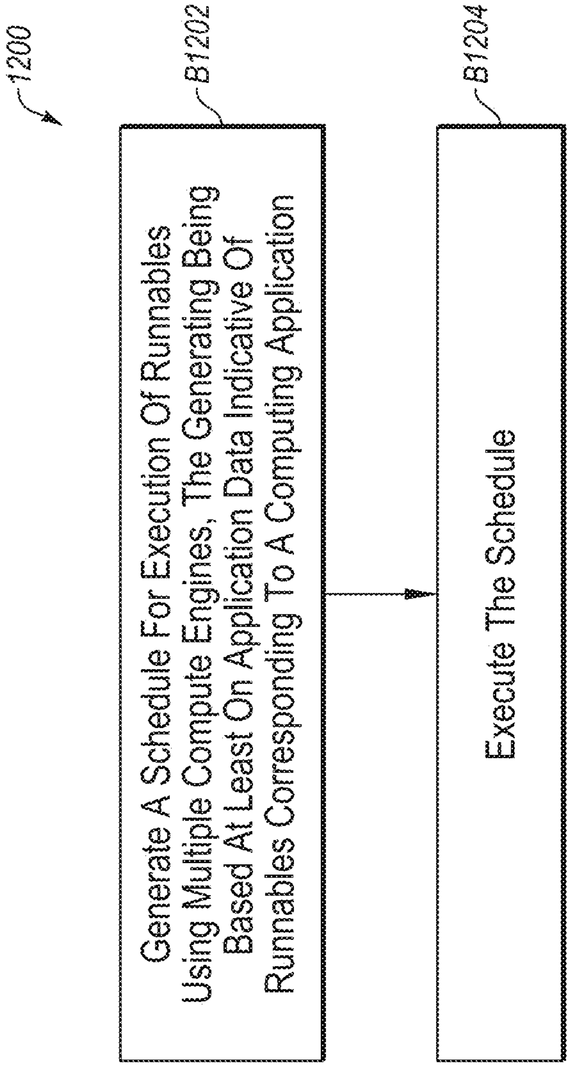
FIG. 12 illustrates an example method for system task management, according to one or more embodiments of the present disclosure.

FIG. 12 illustrates an example method 1200 for system task management, according to one or more embodiments of the present disclosure. The method 1200 may be performed by any suitable system, apparatus, or device using any combination of hardware, firmware, and/or software. For instance, various operations may be carried out by one or more processors executing instructions stored in memory. The operations of the method 1200 may also be embodied as computer-usable instructions stored on computer storage media. Additionally or alternatively, one or more of the operations of the method 1200 may be provided by a standalone application, a service or hosted service (standalone or in combination with another hosted service), or a plug-in to another product, to name a few. By way of example, in some embodiments, one or more operations of the method 1200 may be performed by one or more elements depicted in FIG. 8. In these or other embodiments, one or more operations may be performed by one or more computing devices, such as that described in further detail at least with respect to FIG. 15. In these or other embodiments, one or more operations of the method 1200 may be performed by a computing system disposed on an ego-machine, such as a vehicle as described at least with respect to FIGS. 14A-14D.

In some embodiments, the method 1200, at block B1202, may include generating an execution schedule for execution of runnables using multiple compute engines. In some embodiments, the execution schedule may be generated based at least on application data indicative of runnables corresponding to a computing application. The various instances of application data described in the present disclosure may be examples of the received application data. In some embodiments, the execution schedule may be generated by a schedule compiling engine, such as, by way of example and not limitation, the schedule compiling engine 202 of FIG. 2A.

The execution schedule may include one or more commands corresponding to one or more timing fences. The one or more timing fences may dictate a timing and order of execution between at least a first runnable and a second runnable of the of runnables. In some embodiments, the commands may be based on an instruction set, such as described at least with respect to FIG. 2A. Additionally or alternatively, by way of example and not limitation, one or more of the operations described with respect to the post-processing engine 216 of FIG. 2A may be used to generate the execution schedule. Additionally, in some embodiments, one or more of the operations described with respect to one or more of FIGS. 2A-2D, FIGS. 3A and 3B, FIGS. 4A and 4B, FIG. 5, or FIGS. 9-11 may be used to generate and/or determine the execution schedule.

At block B1204, the execution schedule may be executed by a computing system. In some embodiments, the computing system may include or may correspond to a runtime system, such as described in the present disclosure. Additionally or alternatively, the computing system may be a heterogenous computing system, such as described in the present disclosure. In some embodiments, by way of example and not limitation, the execution of the computing system may include one or more operations described with respect to FIG. 6A.

Modifications, additions, or omissions may be made to the method 1200 without departing from the scope of the present disclosure. For example, the order of one or more of the operations described may vary than the order in which they were described or are illustrated. Further, each operation may include more or fewer operations than those described. In addition, the delineation of the operations and elements is meant for explanatory purposes and is not meant to be limiting with respect to actual implementations.

For instance, in some embodiments, the method 1200 may include one or more operations described with respect to one or more of the elements described with respect to FIG. 8 that may not be explicitly discussed with respect to the method 1200. Additionally, one or more of any of the other operations described in the present disclosure with respect any of the other FIGS. may be included in the method 1200 in some instances.

Figure 13:
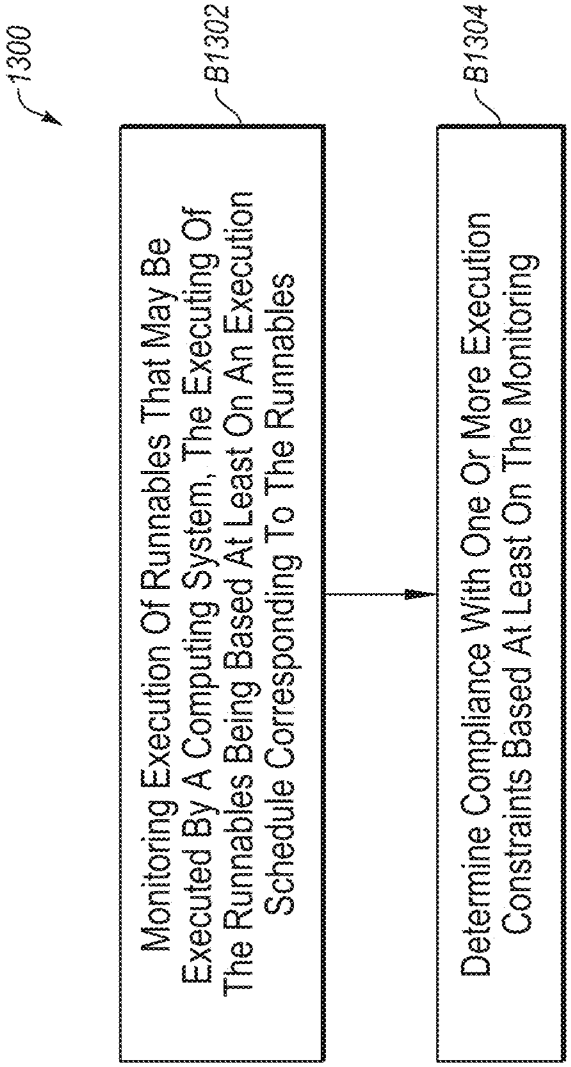
FIG. 13 illustrates an example method for monitoring the execution of the tasks by a runtime system, according to one or more embodiments of the present disclosure.

FIG. 13 illustrates an example method 1300 for monitoring the execution of runnables, according to one or more embodiments of the present disclosure. The method 1300 may be performed by any suitable system, apparatus, or device using any combination of hardware, firmware, and/or software. For instance, various operations may be carried out by one or more processors executing instructions stored in memory. The operations of the method 1300 may also be embodied as computer-usable instructions stored on computer storage media. Additionally or alternatively, one or more of the operations of the method 1300 may be provided by a standalone application, a service or hosted service (standalone or in combination with another hosted service), or a plug-in to another product, to name a few. By way of example, in some embodiments, one or more operations of the method 1300 may be performed by the monitoring engine 612 of FIG. 6A. In these or other embodiments, one or more operations may be performed by one or more computing devices, such as that described in further detail at least with respect to FIG. 15. In these or other embodiments, one or more operations of the method 1300 may be performed by a computing system disposed on an ego-machine, such as a vehicle as described at least with respect to FIGS. 14A-14D.

In some embodiments, the method 1300, at block B1302, may include monitoring execution of runnables that may be executed by a computing system. In some embodiments, the computing system may include or may correspond to a runtime system, such as described in the present disclosure. Additionally or alternatively, the computing system may be a heterogenous computing system, such as described in the present disclosure. In these or other embodiments, the executing of the runnables may be based at least on an execution schedule corresponding to the runnables. Additionally or alternatively, the monitoring may include monitoring compliance with the execution schedule.

In some embodiments, the monitoring may include monitoring timing of execution of the runnables—e.g., in which the execution schedule may indicate the timing the runnables are scheduled to follow. For instance, in some embodiments, by way of example and not limitation, one or more operations performed by the timing checker 644 of FIG. 6A may be included in the monitoring.

Additionally or alternatively, in some embodiments, the monitoring may include monitoring one or more sequences of execution of the runnables—e.g., in which the execution schedule may indicate which order the runnables are scheduled to follow. For instance, in some embodiments, by way of example and not limitation, one or more operations performed by the sequence checker 646 of FIG. 6A may be included in the monitoring.

Additionally or alternatively, in some embodiments, the monitoring may include monitoring the health of at least a portion of the computing system executing the runnables—e.g., monitoring the health of a system task management module, such as the STM 622 of FIG. 6A. For instance, in some embodiments, by way of example and not limitation, one or more operations performed by the health checker 648 of FIG. 6A may be included in the monitoring.

At block B1304, compliance with respect to one or more execution constraints may be determined based at least on the monitoring. For example, it may be determined whether one or more timing constraints have been met and/or are being met, such as, by way of example and not limitation, described with respect to the timing checker 644 of FIG. 6A. Additionally or alternatively, it may be determined whether one or more sequence constraints corresponding to runnable execution order have been met and/or are being met, such as, by way of example and not limitation, described with respect to the sequence checker 646 of FIG. 6A. In these or other embodiments, it may be determined whether one or more health metrics corresponding to operation of the at least portion of the computing system have been met and/or are being met, such as, by way of example and not limitation, described with respect to the health checker 648 of FIG. 6A.

Modifications, additions, or omissions may be made to the method 1300 without departing from the scope of the present disclosure. For example, the order of one or more of the operations described may vary than the order in which they were described or are illustrated. Further, each operation may include more or fewer operations than those described. In addition, the delineation of the operations and elements is meant for explanatory purposes and is not meant to be limiting with respect to actual implementations.

For instance, in some embodiments, the method 1300 may include one or more operations of the monitoring engine 612 described with respect to FIG. 6A that may not be explicitly discussed with respect to the method 1300. For instance, the method 1300 may include performance of one or more remedial operations, such as, by way of example and not limitation, described with respect to the monitoring engine 612 of FIG. 6A. Additionally, one or more of any of the other operations described in the present disclosure with respect any of the other FIGS. may be included in the method 1300 in some instances.

Example Autonomous Vehicle

Figure 14A:
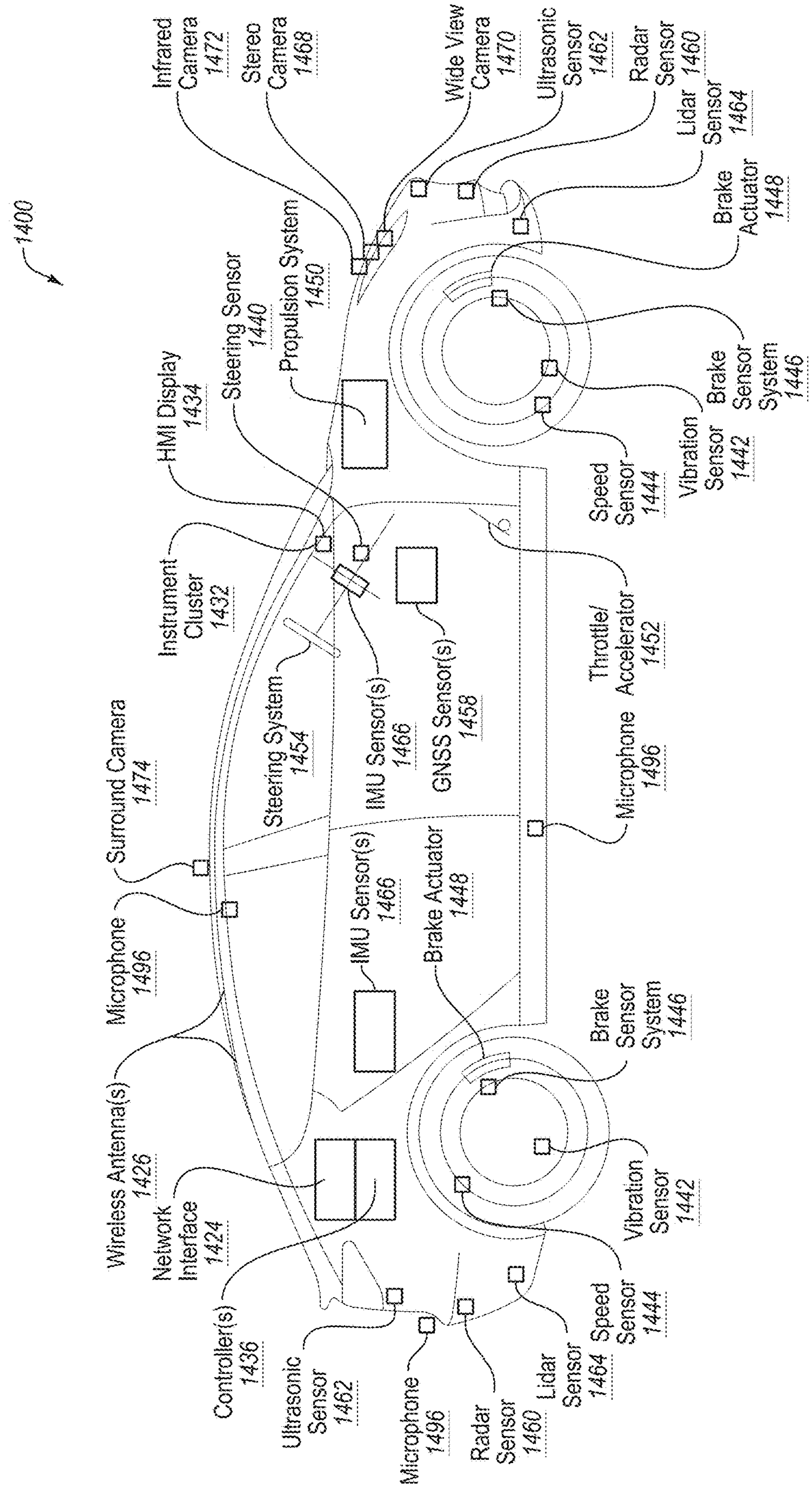
FIG. 14A is an illustration of an example autonomous vehicle, in accordance with some embodiments of the present disclosure.

FIG. 14A is an illustration of an example autonomous vehicle 1400, in accordance with some embodiments of the present disclosure. The autonomous vehicle 1400 (alternatively referred to herein as the "vehicle 1400") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1400 may be capable of functionality in accordance with one or more of Level 3-Level 5 of the autonomous driving levels. The vehicle 1400 may be capable of functionality in accordance with one or more of Level 1-Level 5 of the autonomous driving levels. For example, the vehicle 1400 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1400 or other machine, such as being fully autonomous, being highly autonomous, being conditionally autonomous, being partially autonomous, providing assistive autonomy, being semi-autonomous, being primarily autonomous, or other designation.

The vehicle 1400 may include components such as a chassis, a vehicle body, wheels (e.g., 2, 4, 6, 8, 18, etc.), tires, axles, and other components of a vehicle. The vehicle 1400 may include a propulsion system 1450, such as an internal combustion engine, hybrid electric power plant, an all-electric engine, and/or another propulsion system type. The propulsion system 1450 may be connected to a drive train of the vehicle 1400, which may include a transmission, to enable the propulsion of the vehicle 1400. The propulsion system 1450 may be controlled in response to receiving signals from the throttle/accelerator 1452.

A steering system 1454, which may include a steering wheel, may be used to steer the vehicle 1400 (e.g., along a desired path or route) when the propulsion system 1450 is operating (e.g., when the vehicle is in motion). The steering system 1454 may receive signals from a steering actuator 1456. The steering wheel may be optional for full automation (Level 5) functionality.

The brake sensor system 1446 may be used to operate the vehicle brakes in response to receiving signals from the brake actuators 1448 and/or brake sensors.

Controller(s) 1436, which may include one or more system on chips (SoCs) 1404 (FIG. 14C) and/or GPU(s), may provide signals (e.g., representative of commands) to one or more components and/or systems of the vehicle 1400. For example, the controller(s) may send signals to operate the vehicle brakes via one or more brake actuators 1448, to operate the steering system 1454 via one or more steering actuators 1456, to operate the propulsion system 1450 via one or more throttle/accelerators 1452. The controller(s) 1436 may include one or more onboard (e.g., integrated) computing devices (e.g., supercomputers) that process sensor signals, and output operation commands (e.g., signals representing commands) to enable autonomous driving and/or to assist a human driver in driving the vehicle 1400. The controller(s) 1436 may include a first controller 1436 for autonomous driving functions, a second controller 1436 for functional safety functions, a third controller 1436 for artificial intelligence functionality (e.g., computer vision), a fourth controller 1436 for infotainment functionality, a fifth controller 1436 for redundancy in emergency conditions, and/or other controllers. In some examples, a single controller 1436 may handle two or more of the above functionalities, two or more controllers 1436 may handle a single functionality, and/or any combination thereof.

The controller(s) 1436 may provide the signals for controlling one or more components and/or systems of the vehicle 1400 in response to sensor data received from one or more sensors (e.g., sensor inputs). The sensor data may be received from, for example and without limitation, global navigation satellite systems sensor(s) 1458 (e.g., Global Positioning System sensor(s)), RADAR sensor(s) 1460, ultrasonic sensor(s) 1462, LIDAR sensor(s) 1464, inertial measurement unit (IMU) sensor(s) 1466 (e.g., accelerometer(s), gyroscope(s), magnetic compass(es), magnetometer(s), etc.), microphone(s) 1496, stereo camera(s) 1468, wide-view camera(s) 1470 (e.g., fisheye cameras), infrared camera(s) 1472, surround camera(s) 1474 (e.g., 360 degree cameras), long-range and/or mid-range camera(s) 1498, speed sensor(s) 1444 (e.g., for measuring the speed of the vehicle 1400), vibration sensor(s) 1442, steering sensor(s) 1440, brake sensor(s) (e.g., as part of the brake sensor system 1446), and/or other sensor types.

One or more of the controller(s) 1436 may receive inputs (e.g., represented by input data) from an instrument cluster 1432 of the vehicle 1400 and provide outputs (e.g., represented by output data, display data, etc.) via a human-machine interface (HMI) display 1434, an audible annunciator, a loudspeaker, and/or via other components of the vehicle 1400. The outputs may include information such as vehicle velocity, speed, time, map data (e.g., the HD map 1422 of FIG. 14C), location data (e.g., the vehicle's 1400 location, such as on a map), direction, location of other vehicles (e.g., an occupancy grid), information about objects and status of objects as perceived by the controller(s) 1436, etc. For example, the HMI display 1434 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1400 further includes a network interface 1424 which may use one or more wireless antenna(s) 1415 and/or modem(s) to communicate over one or more networks. For example, the network interface 1424 may be capable of communication over LTE, WCDMA, UMTS, GSM, CDMA2000, etc. The wireless antenna(s) 1415 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 14B:
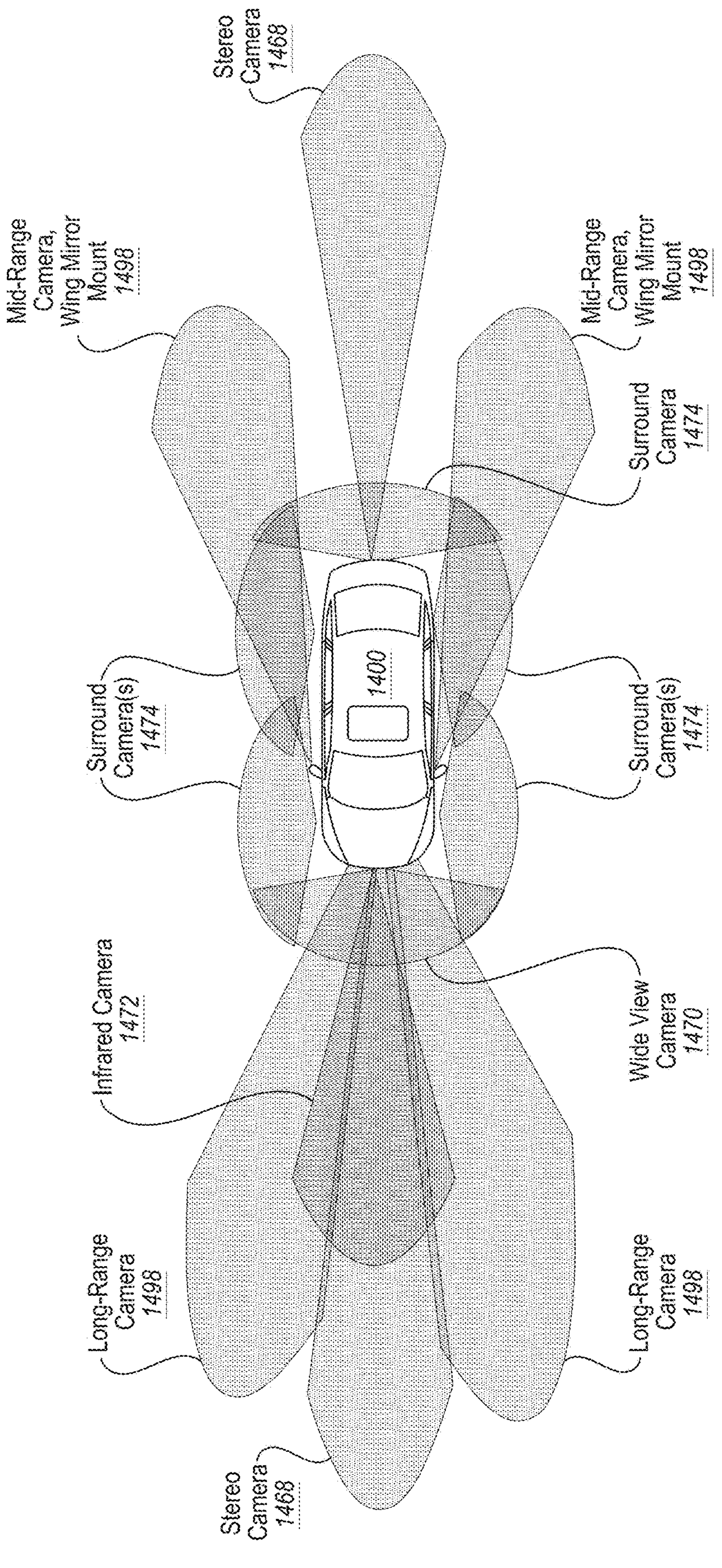
FIG. 14B is an example of camera locations and fields of view for the example autonomous vehicle of FIG. 14A, in accordance with some embodiments of the present disclosure.

FIG. 14B is an example of camera locations and fields of view for the example autonomous vehicle 1400 of FIG. 14A, in accordance with some embodiments of the present disclosure. The cameras and respective fields of view are one example embodiment and are not intended to be limiting. For example, additional and/or alternative cameras may be included and/or the cameras may be located at different locations on the vehicle 1400.

The camera types for the cameras may include, but are not limited to, digital cameras that may be adapted for use with the components and/or systems of the vehicle 1400. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1400 (e.g., front-facing cameras) may be used for surround view, to help identify forward facing paths and obstacles, as well aid in, with the help of one or more controllers 1436 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1470 that may be used to perceive objects coming into view from the periphery (e.g., pedestrians, crossing traffic or bicycles). Although only one wide-view camera is illustrated in FIG. 14B, there may any number of wide-view cameras 1470 on the vehicle 1400. In addition, long-range camera(s) 1498 (e.g., a long-view stereo camera pair) may be used for depth-based object detection, especially for objects for which a neural network has not yet been trained. The long-range camera(s) 1498 may also be used for object detection and classification, as well as basic object tracking.

One or more stereo cameras 1468 may also be included in a front-facing configuration. The stereo camera(s) 1468 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1468 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1468 may be used in addition to, or alternatively from, those described herein.

Cameras with a field of view that include portions of the environment to the side of the vehicle 1400 (e.g., side-view cameras) may be used for surround view, providing information used to create and update the occupancy grid, as well as to generate side impact collision warnings. For example, surround camera(s) 1474 (e.g., four surround cameras 1474 as illustrated in FIG. 14B) may be positioned to on the vehicle 1400. The surround camera(s) 1474 may include wide-view camera(s) 1470, fisheye camera(s), 360 degree camera(s), and/or the like. Four example, four fisheye cameras may be positioned on the vehicle's front, rear, and sides. In an alternative arrangement, the vehicle may use three surround camera(s) 1474 (e.g., left, right, and rear), and may leverage one or more other camera(s) (e.g., a forward-facing camera) as a fourth surround view camera.

Cameras with a field of view that include portions of the environment to the rear of the vehicle 1400 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1498, stereo camera(s) 1468), infrared camera(s) 1472, etc.), as described herein.

Figure 14C:
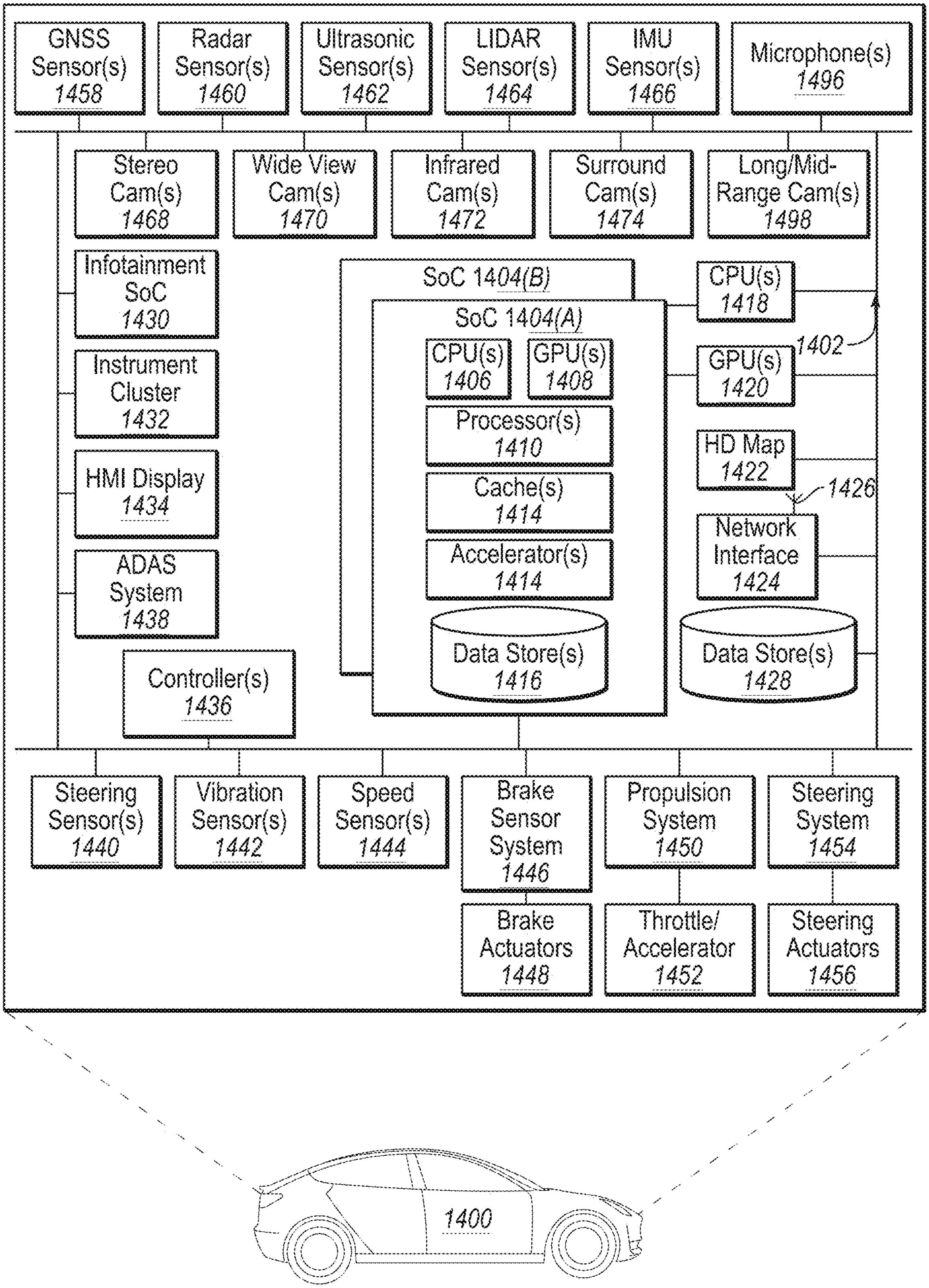
FIG. 14C is a block diagram of an example system architecture for the example autonomous vehicle of FIG. 14A, in accordance with some embodiments of the present disclosure.

FIG. 14C is a block diagram of an example system architecture for the example autonomous vehicle 1400 of FIG. 14A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1400 in FIG. 14C are illustrated as being connected via bus 1402. The bus 1402 may include a Controller Area Network (CAN) data interface (alternatively referred to herein as a "CAN bus"). A CAN may be a network inside the vehicle 1400 used to aid in control of various features and functionality of the vehicle 1400, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1402 is described herein as being a CAN bus, this is not intended to be limiting. For example, in addition to, or alternatively from, the CAN bus, FlexRay and/or Ethernet may be used. Additionally, although a single line is used to represent the bus 1402, this is not intended to be limiting. For example, there may be any number of busses 1402, which may include one or more CAN busses, one or more FlexRay busses, one or more Ethernet busses, and/or one or more other types of busses using a different protocol. In some examples, two or more busses 1402 may be used to perform different functions, and/or may be used for redundancy. For example, a first bus 1402 may be used for collision avoidance functionality and a second bus 1402 may be used for actuation control. In any example, each bus 1402 may communicate with any of the components of the vehicle 1400, and two or more busses 1402 may communicate with the same components. In some examples, each SoC 1404, each controller 1436, and/or each computer within the vehicle may have access to the same input data (e.g., inputs from sensors of the vehicle 1400), and may be connected to a common bus, such the CAN bus.

The vehicle 1400 may include one or more controller(s) 1436, such as those described herein with respect to FIG. 14A. The controller(s) 1436 may be used for a variety of functions. The controller(s) 1436 may be coupled to any of the various other components and systems of the vehicle 1400, and may be used for control of the vehicle 1400, artificial intelligence of the vehicle 1400, infotainment for the vehicle 1400, and/or the like.

The vehicle 1400 may include a system(s) on a chip (SoC) 1404. The SoC 1404 may include CPU(s) 1406, GPU(s) 1408, processor(s) 1410, cache(s) 1412, accelerator(s) 1414, data store(s) 1416, and/or other components and features not illustrated. The SoC(s) 1404 may be used to control the vehicle 1400 in a variety of platforms and systems. For example, the SoC(s) 1404 may be combined in a system (e.g., the system of the vehicle 1400) with an HD map 1422 which may obtain map refreshes and/or updates via a network interface 1424 from one or more servers (e.g., server(s) 1478 of FIG. 14D).

The CPU(s) 1406 may include a CPU cluster or CPU complex (alternatively referred to herein as a "CCPLEX"). The CPU(s) 1406 may include multiple cores and/or L2 caches. For example, in some embodiments, the CPU(s) 1406 may include eight cores in a coherent multi-processor configuration. In some embodiments, the CPU(s) 1406 may include four dual-core clusters where each cluster has a dedicated L2 cache (e.g., a 2 MB L2 cache). The CPU(s) 1406 (e.g., the CCPLEX) may be configured to support simultaneous cluster operation enabling any combination of the clusters of the CPU(s) 1406 to be active at any given time.

The CPU(s) 1406 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1406 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1408 may include an integrated GPU (alternatively referred to herein as an "iGPU"). The GPU(s) 1408 may be programmable and may be efficient for parallel workloads. The GPU(s) 1408, in some examples, may use an enhanced tensor instruction set. The GPU(s) 1408 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1408 may include at least eight streaming microprocessors. The GPU(s) 1408 may use compute application programming interface(s) (API(s)). In addition, the GPU(s) 1408 may use one or more parallel computing platforms and/or programming models (e.g., NVIDIA's CUDA).

The GPU(s) 1408 may be power-optimized for best performance in automotive and embedded use cases. For example, the GPU(s) 1408 may be fabricated on a Fin field-effect transistor (FinFET). However, this is not intended to be limiting and the GPU(s) 1408 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1408 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1408 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1408 to access the CPU(s) 1406 page tables directly. In such examples, when the GPU(s) 1408 memory management unit (MMU) experiences a miss, an address translation request may be transmitted to the CPU(s) 1406. In response, the CPU(s) 1406 may look in its page tables for the virtual-to-physical mapping for the address and transmits the translation back to the GPU(s) 1408. As such, unified memory technology may allow a single unified virtual address space for memory of both the CPU(s) 1406 and the GPU(s) 1408, thereby simplifying the GPU(s) 1408 programming and porting of applications to the GPU(s) 1408.

In addition, the GPU(s) 1408 may include an access counter that may keep track of the frequency of access of the GPU(s) 1408 to memory of other processors. The access counter may help ensure that memory pages are moved to the physical memory of the processor that is accessing the pages most frequently.

The SoC(s) 1404 may include any number of cache(s) 1412, including those described herein. For example, the cache(s) 1412 may include an L3 cache that is available to both the CPU(s) 1406 and the GPU(s) 1408 (e.g., that is connected both the CPU(s) 1406 and the GPU(s) 1408). The cache(s) 1412 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1404 may include an arithmetic logic unit(s) (ALU(s)) which may be leveraged in performing processing with respect to any of the variety of tasks or operations of the vehicle 1400—such as processing DNNs. In addition, the SoC(s) 1404 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1406 and/or GPU(s) 1408.

The SoC(s) 1404 may include one or more accelerators 1414 (e.g., hardware accelerators, software accelerators, or a combination thereof). For example, the SoC(s) 1404 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1408 and to off-load some of the tasks of the GPU(s) 1408 (e.g., to free up more cycles of the GPU(s) 1408 for performing other tasks). As an example, the accelerator(s) 1414 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1414 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1408, and by using an inference accelerator, for example, a designer may target either the DLA(s) or the GPU(s) 1408 for any function. For example, the designer may focus processing of CNNs and floating point operations on the DLA(s) and leave other functions to the GPU(s) 1408 and/or other accelerator(s) 1414.

The accelerator(s) 1414 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced sy computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1406. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1414 (e.g., the hardware acceleration cluster) may include a computer vision network on-chip and SRAM, for providing a high-bandwidth, low latency SRAM for the accelerator(s) 1414. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1404 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1414 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1466 output that correlates with the vehicle 1400 orientation, distance, 3D location estimates of the object obtained from the neural network and/or other sensors (e.g., LIDAR sensor(s) 1464 or RADAR sensor(s) 1460), among others.

The SoC(s) 1404 may include data store(s) 1416 (e.g., memory). The data store(s) 1416 may be on-chip memory of the SoC(s) 1404, which may store neural networks to be executed on the GPU and/or the DLA. In some examples, the data store(s) 1416 may be large enough in capacity to store multiple instances of neural networks for redundancy and safety. The data store(s) 1412 may comprise L2 or L3 cache(s) 1412. Reference to the data store(s) 1416 may include reference to the memory associated with the PVA, DLA, and/or other accelerator(s) 1414, as described herein.

The SoC(s) 1404 may include one or more processor(s) 1410 (e.g., embedded processors). The processor(s) 1410 may include a boot and power management processor that may be a dedicated processor and subsystem to handle boot power and management functions and related security enforcement. The boot and power management processor may be a part of the SoC(s) 1404 boot sequence and may provide runtime power management services. The boot power and management processor may provide clock and voltage programming, assistance in system low power state transitions, management of SoC(s) 1404 thermals and temperature sensors, and/or management of the SoC(s) 1404 power states. Each temperature sensor may be implemented as a ring-oscillator whose output frequency is proportional to temperature, and the SoC(s) 1404 may use the ring-oscillators to detect temperatures of the CPU(s) 1406, GPU(s) 1408, and/or accelerator(s) 1414. If temperatures are determined to exceed a threshold, the boot and power management processor may enter a temperature fault routine and put the SoC(s) 1404 into a lower power state and/or put the vehicle 1400 into a chauffeur to safe stop mode (e.g., bring the vehicle 1400 to a safe stop).

The processor(s) 1410 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1410 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1410 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1410 may further include a real-time camera engine that may include a dedicated processor subsystem for handling real-time camera management.

The processor(s) 1410 may further include a high-dynamic range signal processor that may include an image signal processor that is a hardware engine that is part of the camera processing pipeline.

The processor(s) 1410 may include a video image compositor that may be a processing block (e.g., implemented on a microprocessor) that implements video post-processing functions needed by a video playback application to produce the final image for the player window. The video image compositor may perform lens distortion correction on wide-view camera(s) 1470, surround camera(s) 1474, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1408 is not required to continuously render new surfaces. Even when the GPU(s) 1408 is powered on and active doing 3D rendering, the video image compositor may be used to offload the GPU(s) 1408 to improve performance and responsiveness.

The SoC(s) 1404 may further include a mobile industry processor interface (MIPI) camera serial interface for receiving video and input from cameras, a high-speed interface, and/or a video input block that may be used for camera and related pixel input functions. The SoC(s) 1404 may further include an input/output controller(s) that may be controlled by software and may be used for receiving I/O signals that are uncommitted to a specific role.

The SoC(s) 1404 may further include a broad range of peripheral interfaces to enable communication with peripherals, audio codecs, power management, and/or other devices. The SoC(s) 1404 may be used to process data from cameras (e.g., connected over Gigabit Multimedia Serial Link and Ethernet), sensors (e.g., LIDAR sensor(s) 1464, RADAR sensor(s) 1460, etc. that may be connected over Ethernet), data from bus 1402 (e.g., speed of vehicle 1400, steering wheel position, etc.), data from GNSS sensor(s) 1458 (e.g., connected over Ethernet or CAN bus). The SoC(s) 1404 may further include dedicated high-performance mass storage controllers that may include their own DMA engines, and that may be used to free the CPU(s) 1406 from routine data management tasks.

The SoC(s) 1404 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1404 may be faster, more reliable, and even more energy-efficient and space-efficient than conventional systems. For example, the accelerator(s) 1414, when combined with the CPU(s) 1406, the GPU(s) 1408, and the data store(s) 1416, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1420) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1408.

In some examples, a CNN for facial recognition and vehicle owner identification may use data from camera sensors to identify the presence of an authorized driver and/or owner of the vehicle 1400. The always on sensor processing engine may be used to unlock the vehicle when the owner approaches the driver door and turn on the lights, and, in security mode, to disable the vehicle when the owner leaves the vehicle. In this way, the SoC(s) 1404 provide for security against theft and/or carjacking.

In another example, a CNN for emergency vehicle detection and identification may use data from microphones 1496 to detect and identify emergency vehicle sirens. In contrast to conventional systems, that use general classifiers to detect sirens and manually extract features, the SoC(s) 1404 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1458. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1462, until the emergency vehicle(s) passes.

The vehicle may include a CPU(s) 1418 (e.g., discrete CPU(s), or dCPU(s)), that may be coupled to the SoC(s) 1404 via a high-speed interconnect (e.g., PCIe). The CPU(s) 1418 may include an X86 processor, for example. The CPU(s) 1418 may be used to perform any of a variety of functions, including arbitrating potentially inconsistent results between ADAS sensors and the SoC(s) 1404, and/or monitoring the status and health of the controller(s) 1436 and/or infotainment SoC 1430, for example.

The vehicle 1400 may include a GPU(s) 1420 (e.g., discrete GPU(s), or dGPU(s)), that may be coupled to the SoC(s) 1404 via a high-speed interconnect (e.g., NVIDIA's NVLINK). The GPU(s) 1420 may provide additional artificial intelligence functionality, such as by executing redundant and/or different neural networks, and may be used to train and/or update neural networks based on input (e.g., sensor data) from sensors of the vehicle 1400.

The vehicle 1400 may further include the network interface 1424 which may include one or more wireless antennas 1415 (e.g., one or more wireless antennas for different communication protocols, such as a cellular antenna, a Bluetooth antenna, etc.). The network interface 1424 may be used to enable wireless connectivity over the Internet with the cloud (e.g., with the server(s) 1478 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1400 information about vehicles in proximity to the vehicle 1400 (e.g., vehicles in front of, on the side of, and/or behind the vehicle 1400). This functionality may be part of a cooperative adaptive cruise control functionality of the vehicle 1400.

The network interface 1424 may include a SoC that provides modulation and demodulation functionality and enables the controller(s) 1436 to communicate over wireless networks. The network interface 1424 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1400 may further include data store(s) 1428 which may include off-chip (e.g., off the SoC(s) 1404) storage. The data store(s) 1428 may include one or more storage elements including RAM, SRAM, DRAM, VRAM, Flash, hard disks, and/or other components and/or devices that may store at least one bit of data.

The vehicle 1400 may further include GNSS sensor(s) 1458. The GNSS sensor(s) 1458 (e.g., GPS, assisted GPS sensors, differential GPS (DGPS) sensors, etc.), to assist in mapping, perception, occupancy grid generation, and/or path planning functions. Any number of GNSS sensor(s) 1458 may be used, including, for example and without limitation, a GPS using a USB connector with an Ethernet to Serial (RS-232) bridge.

The vehicle 1400 may further include RADAR sensor(s) 1460. The RADAR sensor(s) 1460 may be used by the vehicle 1400 for long-range vehicle detection, even in darkness and/or severe weather conditions. RADAR functional safety levels may be ASIL B. The RADAR sensor(s) 1460 may use the CAN and/or the bus 1402 (e.g., to transmit data generated by the RADAR sensor(s) 1460) for control and to access object tracking data, with access to Ethernet to access raw data in some examples. A wide variety of RADAR sensor types may be used. For example, and without limitation, the RADAR sensor(s) 1460 may be suitable for front, rear, and side RADAR use. In some example, Pulse Doppler RADAR sensor(s) are used.

The RADAR sensor(s) 1460 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 140 m range. The RADAR sensor(s) 1460 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1400 surroundings at higher speeds with minimal interference from traffic in adjacent lanes. The other two antennae may expand the field of view, making it possible to quickly detect vehicles entering or leaving the vehicle's 1400 lane.

Mid-range RADAR systems may include, as an example, a range of up to 1460 m (front) or 80 m (rear), and a field of view of up to 42 degrees (front) or 1450 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1400 may further include ultrasonic sensor(s) 1462. The ultrasonic sensor(s) 1462, which may be positioned at the front, back, and/or the sides of the vehicle 1400, may be used for park assist and/or to create and update an occupancy grid. A wide variety of ultrasonic sensor(s) 1462 may be used, and different ultrasonic sensor(s) 1462 may be used for different ranges of detection (e.g., 2.5 m, 4 m). The ultrasonic sensor(s) 1462 may operate at functional safety levels of ASIL B.

The vehicle 1400 may include LIDAR sensor(s) 1464. The LIDAR sensor(s) 1464 may be used for object and pedestrian detection, emergency braking, collision avoidance, and/or other functions. The LIDAR sensor(s) 1464 may be functional safety level ASIL B. In some examples, the vehicle 1400 may include multiple LIDAR sensors 1464 (e.g., two, four, six, etc.) that may use Ethernet (e.g., to provide data to a Gigabit Ethernet switch).

In some examples, the LIDAR sensor(s) 1464 may be capable of providing a list of objects and their distances for a 360-degree field of view. Commercially available LIDAR sensor(s) 1464 may have an advertised range of approximately 1400 m, with an accuracy of 2 cm-3 cm, and with support for a 1400 Mbps Ethernet connection, for example. In some examples, one or more non-protruding LIDAR sensors 1464 may be used. In such examples, the LIDAR sensor(s) 1464 may be implemented as a small device that may be embedded into the front, rear, sides, and/or corners of the vehicle 1400. The LIDAR sensor(s) 1464, in such examples, may provide up to a 120-degree horizontal and 35-degree vertical field-of-view, with a 200 m range even for low-reflectivity objects. Front-mounted LIDAR sensor(s) 1464 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1400. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1464 may be less susceptible to motion blur, vibration, and/or shock.

The vehicle may further include IMU sensor(s) 1466. The IMU sensor(s) 1466 may be located at a center of the rear axle of the vehicle 1400, in some examples. The IMU sensor(s) 1466 may include, for example and without limitation, an accelerometer(s), a magnetometer(s), a gyroscope(s), a magnetic compass(es), and/or other sensor types. In some examples, such as in six-axis applications, the IMU sensor(s) 1466 may include accelerometers and gyroscopes, while in nine-axis applications, the IMU sensor(s) 1466 may include accelerometers, gyroscopes, and magnetometers.

In some embodiments, the IMU sensor(s) 1466 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1466 may enable the vehicle 1400 to estimate heading without requiring input from a magnetic sensor by directly observing and correlating the changes in velocity from GPS to the IMU sensor(s) 1466. In some examples, the IMU sensor(s) 1466 and the GNSS sensor(s) 1458 may be combined in a single integrated unit.

The vehicle may include microphone(s) 1496 placed in and/or around the vehicle 1400. The microphone(s) 1496 may be used for emergency vehicle detection and identification, among other things.

The vehicle may further include any number of camera types, including stereo camera(s) 1468, wide-view camera (s) 1470, infrared camera(s) 1472, surround camera(s) 1474, long-range and/or mid-range camera(s) 1498, and/or other camera types. The cameras may be used to capture image data around an entire periphery of the vehicle 1400. The types of cameras used depends on the embodiments and requirements for the vehicle 1400, and any combination of camera types may be used to provide the necessary coverage around the vehicle 1400. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 14A and FIG. 14B.

The vehicle 1400 may further include vibration sensor(s) 1442. The vibration sensor(s) 1442 may measure vibrations of components of the vehicle, such as the axle(s). For example, changes in vibrations may indicate a change in road surfaces. In another example, when two or more vibration sensors 1442 are used, the differences between the vibrations may be used to determine friction or slippage of the road surface (e.g., when the difference in vibration is between a power-driven axle and a freely rotating axle).

The vehicle 1400 may include an ADAS system 1438. The ADAS system 1438 may include a SoC, in some examples. The ADAS system 1438 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1460, LIDAR sensor(s) 1464, and/or a camera(s). The ACC systems may include longitudinal ACC and/or lateral ACC. Longitudinal ACC monitors and controls the distance to the vehicle immediately ahead of the vehicle 1400 and automatically adjust the vehicle speed to maintain a safe distance from vehicles ahead. Lateral ACC performs distance keeping, and advises the vehicle 1400 to change lanes when necessary. Lateral ACC is related to other ADAS applications such as LCA and CWS.

CACC uses information from other vehicles that may be received via the network interface 1424 and/or the wireless antenna(s) 1415 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1400), while the I2V communication concept provides information about traffic further ahead. CACC systems may include either or both 12V and V2V information sources. Given the information of the vehicles ahead of the vehicle 1400, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1460, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1460, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1400 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1400 if the vehicle 1400 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1460, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1400 is backing up. Some RCTW systems include AEB to ensure that the vehicle brakes are applied to avoid a crash. RCTW systems may use one or more rear-facing RADAR sensor(s) 1460, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1400, the vehicle 1400 itself must, in the case of conflicting results, decide whether to heed the result from a primary computer or a secondary computer (e.g., a first controller 1436 or a second controller 1436). For example, in some embodiments, the ADAS system 1438 may be a backup and/or secondary computer for providing perception information to a backup computer rationality module. The backup computer rationality monitor may run a redundant diverse software on hardware components to detect faults in perception and dynamic driving tasks. Outputs from the ADAS system 1438 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1404.

In other examples, ADAS system 1438 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1438 may be fed into the primary computer's perception block and/or the primary computer's dynamic driving task block. For example, if the ADAS system 1438 indicates a forward crash warning due to an object immediately ahead, the perception block may use this information when identifying objects. In other examples, the secondary computer may have its own neural network which is trained and thus reduces the risk of false positives, as described herein.

The vehicle 1400 may further include the infotainment SoC 1430 (e.g., an in-vehicle infotainment system (IVI)). Although illustrated and described as a SoC, the infotainment system may not be a SoC, and may include two or more discrete components. The infotainment SoC 1430 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1400. For example, the infotainment SoC 1430 may radios, disk players, navigation systems, video players, USB and Bluetooth connectivity, carputers, in-car entertainment, Wi-Fi, steering wheel audio controls, hands free voice control, a heads-up display (HUD), an HMI display 1434, a telematics device, a control panel (e.g., for controlling and/or interacting with various components, features, and/or systems), and/or other components. The infotainment SoC 1430 may further be used to provide information (e.g., visual and/or audible) to a user(s) of the vehicle, such as information from the ADAS system 1438, autonomous driving information such as planned vehicle maneuvers, trajectories, surrounding environment information (e.g., intersection information, vehicle information, road information, etc.), and/or other information.

The infotainment SoC 1430 may include GPU functionality. The infotainment SoC 1430 may communicate over the bus 1402 (e.g., CAN bus, Ethernet, etc.) with other devices, systems, and/or components of the vehicle 1400. In some examples, the infotainment SoC 1430 may be coupled to a supervisory MCU such that the GPU of the infotainment system may perform some self-driving functions in the event that the primary controller(s) 1436 (e.g., the primary and/or backup computers of the vehicle 1400) fail. In such an example, the infotainment SoC 1430 may put the vehicle 1400 into a chauffeur to safe stop mode, as described herein.

The vehicle 1400 may further include an instrument cluster 1432 (e.g., a digital dash, an electronic instrument cluster, a digital instrument panel, etc.). The instrument cluster 1432 may include a controller and/or supercomputer (e.g., a discrete controller or supercomputer). The instrument cluster 1432 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1430 and the instrument cluster 1432. In other words, the instrument cluster 1432 may be included as part of the infotainment SoC 1430, or vice versa.

Figure 14D:
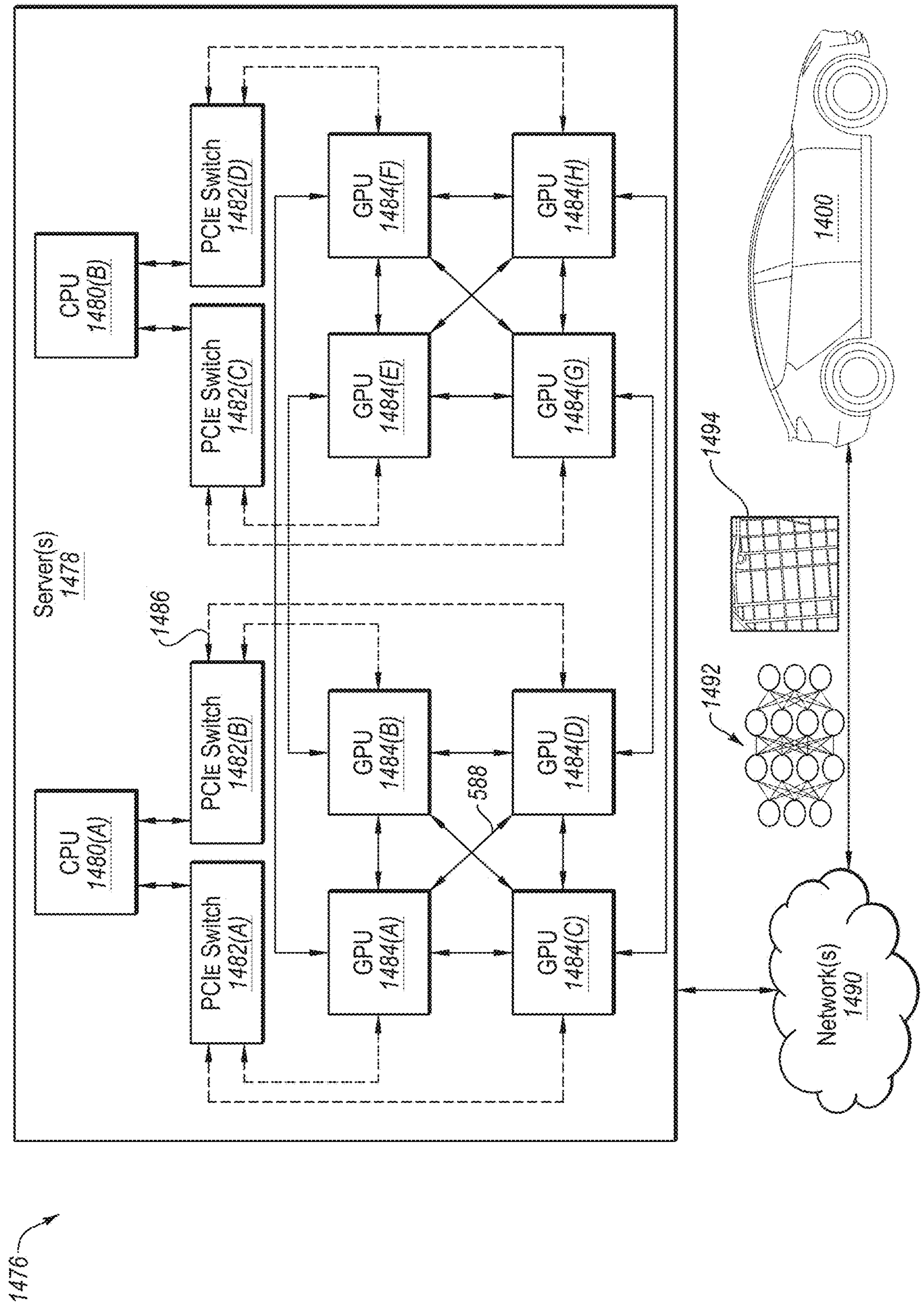
FIG. 14D is a system diagram for communication between cloud-based server(s) and the example autonomous vehicle of FIG. 14A, in accordance with some embodiments of the present disclosure.

FIG. 14D is a system diagram for communication between cloud-based server(s) and the example autonomous vehicle 1400 of FIG. 14A, in accordance with some embodiments of the present disclosure. The system 1476 may include server(s) 1478, network(s) 1490, and vehicles, including the vehicle 1400. The server(s) 1478 may include a plurality of GPUs 1484(A)-1484(H) (collectively referred to herein as GPUs 1484), PCIe switches 1482(A)-1482(H) (collectively referred to herein as PCIe switches 1482), and/or CPUs 1480(A)-1480(B) (collectively referred to herein as CPUs 1480). The GPUs 1484, the CPUs 1480, and the PCIe switches may be interconnected with high-speed interconnects such as, for example and without limitation, NVLink interfaces 1488 developed by NVIDIA and/or PCIe connections 1486. In some examples, the GPUs 1484 are connected via NVLink and/or NVSwitch SoC and the GPUs 1484 and the PCIe switches 1482 are connected via PCIe interconnects. Although eight GPUs 1484, two CPUs 1480, and two PCIe switches are illustrated, this is not intended to be limiting. Depending on the embodiment, each of the server(s) 1478 may include any number of GPUs 1484, CPUs 1480, and/or PCIe switches. For example, the server(s) 1478 may each include eight, sixteen, thirty-two, and/or more GPUs 1484.

The server(s) 1478 may receive, over the network(s) 1490 and from the vehicles, image data representative of images showing unexpected or changed road conditions, such as recently commenced road-work. The server(s) 1478 may transmit, over the network(s) 1490 and to the vehicles, neural networks 1492, updated neural networks 1492, and/or map information 1494, including information regarding traffic and road conditions. The updates to the map information 1494 may include updates for the HD map 1422, such as information regarding construction sites, potholes, detours, flooding, and/or other obstructions. In some examples, the neural networks 1492, the updated neural networks 1492, and/or the map information 1494 may have resulted from new training and/or experiences represented in data received from any number of vehicles in the environment, and/or based on training performed at a datacenter (e.g., using the server(s) 1478 and/or other servers).

The server(s) 1478 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1490, and/or the machine learning models may be used by the server(s) 1478 to remotely monitor the vehicles.

In some examples, the server(s) 1478 may receive data from the vehicles and apply the data to up-to-date real-time neural networks for real-time intelligent inferencing. The server(s) 1478 may include deep-learning supercomputers and/or dedicated AI computers powered by GPU(s) 1484, such as a DGX and DGX Station machines developed by NVIDIA. However, in some examples, the server(s) 1478 may include deep learning infrastructure that use only CPU-powered datacenters.

The deep-learning infrastructure of the server(s) 1478 may be capable of fast, real-time inferencing, and may use that capability to evaluate and verify the health of the processors, software, and/or associated hardware in the vehicle 1400. For example, the deep-learning infrastructure may receive periodic updates from the vehicle 1400, such as a sequence of images and/or objects that the vehicle 1400 has located in that sequence of images (e.g., via computer vision and/or other machine learning object classification techniques). The deep-learning infrastructure may run its own neural network to identify the objects and compare them with the objects identified by the vehicle 1400 and, if the results do not match and the infrastructure concludes that the AI in the vehicle 1400 is malfunctioning, the server(s) 1478 may transmit a signal to the vehicle 1400 instructing a fail-safe computer of the vehicle 1400 to assume control, notify the passengers, and complete a safe parking maneuver.

For inferencing, the server(s) 1478 may include the GPU(s) 1484 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 15:
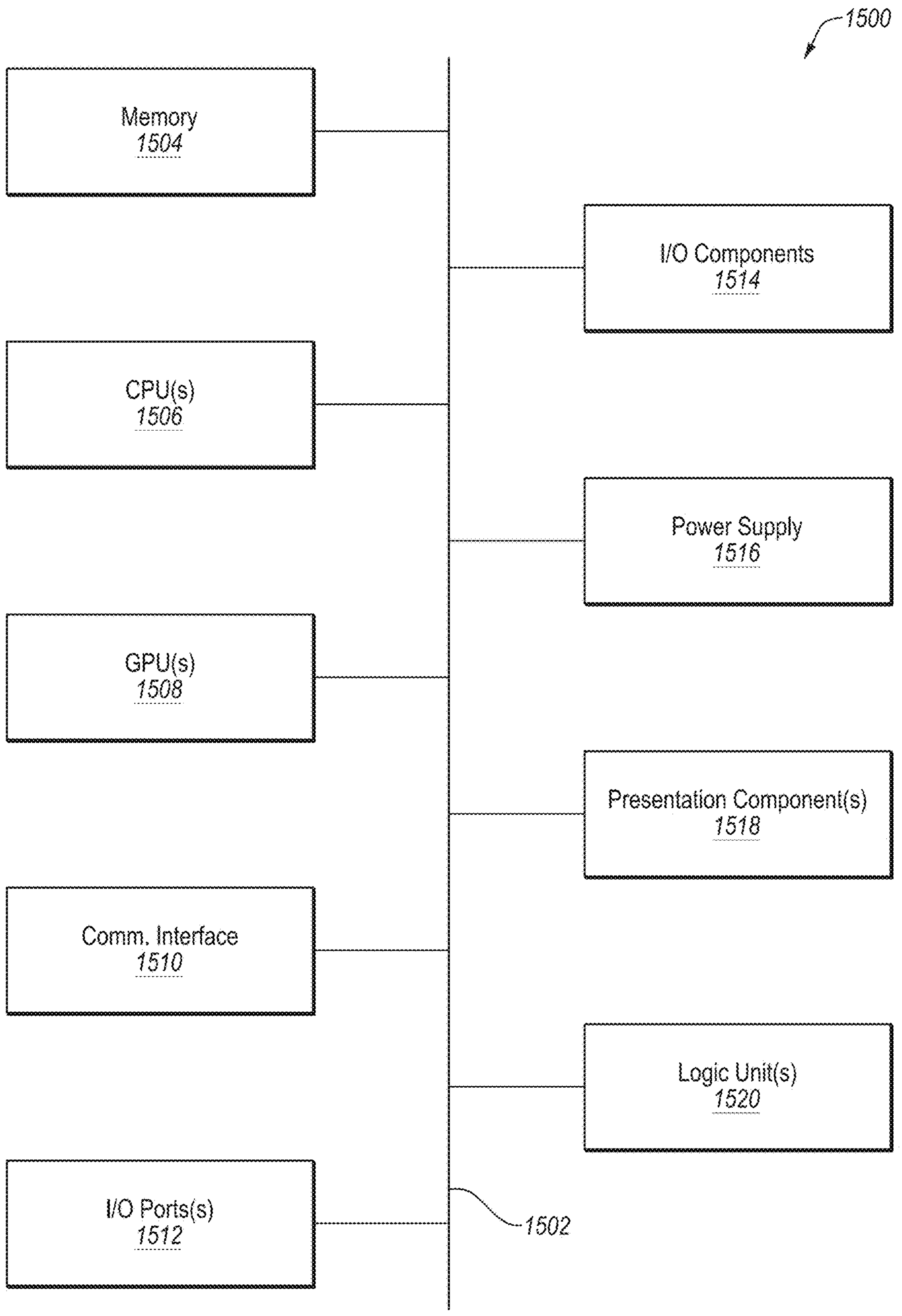
FIG. 15 is a block diagram of an example computing device suitable for use in implementing some embodiments of the present disclosure.

FIG. 15 is a block diagram of an example computing device(s) 1500 suitable for use in implementing some embodiments of the present disclosure. Computing device 1500 may include an interconnect system 1502 that directly or indirectly couples the following devices: memory 1504, one or more central processing units (CPUs) 1506, one or more graphics processing units (GPUs) 1508, a communication interface 1510, input/output (I/O) ports 1512, input/output components 1514, a power supply 1516, one or more presentation components 1518 (e.g., display(s)), and one or more logic units 1520. In at least one embodiment, the computing device(s) 1500 may comprise one or more virtual machines (VMs), and/or any of the components thereof may comprise virtual components (e.g., virtual hardware components). For non-limiting examples, one or more of the GPUs 1508 may comprise one or more vGPUs, one or more of the CPUs 1506 may comprise one or more vCPUs, and/or one or more of the logic units 1520 may comprise one or more virtual logic units. As such, a computing device(s) 1500 may include discrete components (e.g., a full GPU dedicated to the computing device 1500), virtual components (e.g., a portion of a GPU dedicated to the computing device 1500), or a combination thereof.

Although the various blocks of FIG. 15 are shown as connected via the interconnect system 1502 with lines, this is not intended to be limiting and is for clarity only. For example, in some embodiments, a presentation component 1518, such as a display device, may be considered an I/O component 1514 (e.g., if the display is a touch screen). As another example, the CPUs 1506 and/or GPUs 1508 may include memory (e.g., the memory 1504 may be representative of a storage device in addition to the memory of the GPUs 1508, the CPUs 1506, and/or other components). In other words, the computing device of FIG. 15 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 15.

The interconnect system 1502 may represent one or more links or busses, such as an address bus, a data bus, a control bus, or a combination thereof. The interconnect system 1502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1506 may be directly connected to the memory 1504. Further, the CPU 1506 may be directly connected to the GPU 1508. Where there is direct, or point-to-point connection between components, the interconnect system 1502 may include a PCIe link to carry out the connection. In these examples, a PCI bus need not be included in the computing device 1500.

The memory 1504 may include any of a variety of computer-readable media. The computer-readable media may be any available media that may be accessed by the computing device 1500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1506 may be configured to execute at least some of the computer-readable instructions to control one or more components of the computing device 1500 to perform one or more of the methods and/or processes described herein. The CPU(s) 1506 may each include one or more cores (e.g., one, two, four, eight, twenty-eight, seventy-two, etc.) that are capable of handling a multitude of software threads simultaneously. The CPU(s) 1506 may include any type of processor, and may include different types of processors depending on the type of computing device 1500 implemented (e.g., processors with fewer cores for mobile devices and processors with more cores for servers). For example, depending on the type of computing device 1500, the processor may be an Advanced RISC Machines (ARM)

processor implemented using Reduced Instruction Set Computing (RISC) or an x86 processor implemented using Complex Instruction Set Computing (CISC). The computing device 1500 may include one or more CPUs 1506 in addition to one or more microprocessors or supplementary co-processors, such as math co-processors.

In addition to or alternatively from the CPU(s) 1506, the GPU(s) 1508 may be configured to execute at least some of the computer-readable instructions to control one or more components of the computing device 1500 to perform one or more of the methods and/or processes described herein. One or more of the GPU(s) 1508 may be an integrated GPU (e.g., with one or more of the CPU(s) 1506 and/or one or more of the GPU(s) 1508 may be a discrete GPU. In embodiments, one or more of the GPU(s) 1508 may be a coprocessor of one or more of the CPU(s) 1506. The GPU(s) 1508 may be used by the computing device 1500 to render graphics (e.g., 3D graphics) or perform general purpose computations. For example, the GPU(s) 1508 may be used for General-Purpose computing on GPUs (GPGPU). The GPU(s) 1508 may include hundreds or thousands of cores that are capable of handling hundreds or thousands of software threads simultaneously. The GPU(s) 1508 may generate pixel data for output images in response to rendering commands (e.g., rendering commands from the CPU(s) 1506 received via a host interface). The GPU(s) 1508 may include graphics memory, such as display memory, for storing pixel data or any other suitable data, such as GPGPU data. The display memory may be included as part of the memory 1504. The GPU(s) 1508 may include two or more GPUs operating in parallel (e.g., via a link). The link may directly connect the GPUs (e.g., using NVLINK) or may connect the GPUs through a switch (e.g., using NVSwitch). When combined together, each GPU 1508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1506 and/or the GPU(s) 1508, the logic unit(s) 1520 may be configured to execute at least some of the computer-readable instructions to control one or more components of the computing device 1500 to perform one or more of the methods and/or processes described herein. In embodiments, the CPU(s) 1506, the GPU(s) 1508, and/or the logic unit(s) 1520 may discretely or jointly perform any combination of the methods, processes and/or portions thereof. One or more of the logic units 1520 may be part of and/or integrated in one or more of the CPU(s) 1506 and/or the GPU(s) 1508 and/or one or more of the logic units 1520 may be discrete components or otherwise external to the CPU(s) 1506 and/or the GPU(s) 1508. In embodiments, one or more of the logic units 1520 may be a coprocessor of one or more of the CPU(s) 1506 and/or one or more of the GPU(s) 1508.

Examples of the logic unit(s) 1520 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1510 may include one or more receivers, transmitters, and/or transceivers that enable the computing device 1500 to communicate with other computing devices via an electronic communication network, included wired and/or wireless communications. The communication interface 1510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1520 and/or communication interface 1510 may include one or more data processing units (DPUs) to transmit data received over a network and/or through interconnect system 1502 directly to (e.g., a memory of) one or more GPU(s) 1508.

The I/O ports 1512 may enable the computing device 1500 to be logically coupled to other devices including the I/O components 1514, the presentation component(s) 1518, and/or other components, some of which may be built in to (e.g., integrated in) the computing device 1500. Illustrative I/O components 1514 include a microphone, mouse, keyboard, joystick, game pad, game controller, satellite dish, scanner, printer, wireless device, etc. The I/O components 1514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail in the present disclosure) associated with a display of the computing device 1500. The computing device 1500 may be include depth cameras, such as stereoscopic camera systems, infrared camera systems, RGB camera systems, touchscreen technology, and combinations of these, for gesture detection and recognition. Additionally, the computing device 1500 may include accelerometers or gyroscopes (e.g., as part of an inertia measurement unit (IMU)) that enable detection of motion. In some examples, the output of the accelerometers or gyroscopes may be used by the computing device 1500 to render immersive augmented reality or virtual reality.

The power supply 1516 may include a hard-wired power supply, a battery power supply, or a combination thereof. The power supply 1516 may provide power to the computing device 1500 to enable the components of the computing device 1500 to operate.

The presentation component(s) 1518 may include a display (e.g., a monitor, a touch screen, a television screen, a heads-up-display (HUD), other display types, or a combination thereof), speakers, and/or other presentation components. The presentation component(s) 1518 may receive data from other components (e.g., the GPU(s) 1508, the CPU(s) 1506, DPUs, etc.), and output the data (e.g., as an image, video, sound, etc.).

Example Data Center

Figure 16:
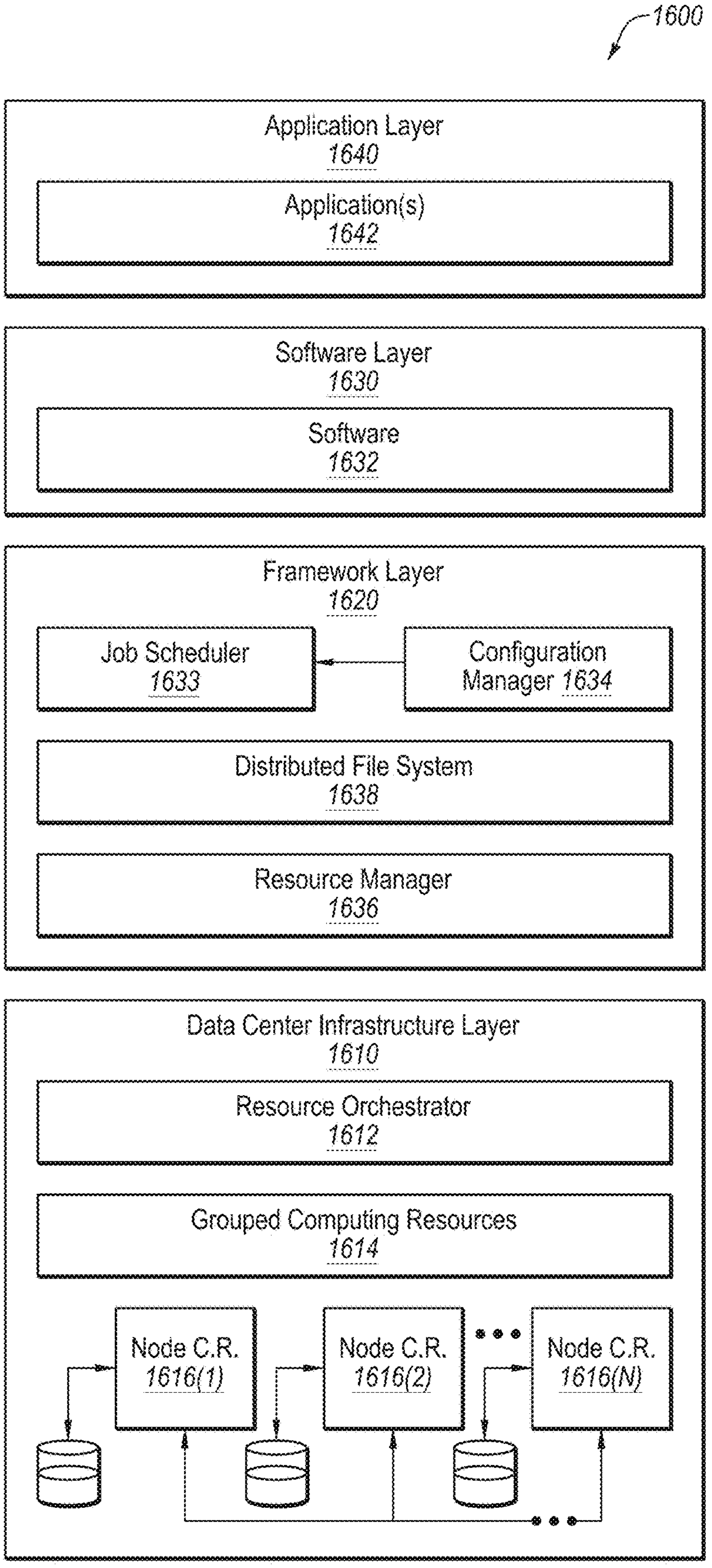
FIG. 16 is a block diagram of an example data center suitable for use in implementing some embodiments of the present disclosure.

FIG. 16 illustrates an example data center 1600 that may be used in at least one embodiments of the present disclosure. The data center 1600 may include a data center infrastructure layer 1610, a framework layer 1620, a software layer 1630, and/or an application layer 1640.

As shown in FIG. 16, the data center infrastructure layer 1610 may include a resource orchestrator 1612, grouped computing resources 1614, and node computing resources ("node C.R.s") 1616(1)-1616(N), where "N" represents any whole, positive integer. In at least one embodiment, node C.R.s 1616(1)-1616(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1616(1)-1616(N) may correspond to a server having one or more of the above-mentioned computing resources. In addition, in some embodiments, the node C.R.s 1616(1)-16161 (N) may include one or more virtual components, such as vGPUs, vCPUs, and/or the like, and/or one or more of the node C.R.s 1616(1)-1616(N) may correspond to a virtual machine (VM).

In at least one embodiment, grouped computing resources 1614 may include separate groupings of node C.R.s 1616 housed within one or more racks (not shown), or many racks housed in data centers at various geographical locations (also not shown). Separate groupings of node C.R.s 1616 within grouped computing resources 1614 may include grouped compute, network, memory or storage resources that may be configured or allocated to support one or more workloads. In at least one embodiment, several node C.R.s 1616 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1612 may configure or otherwise control one or more node C.R.s 1616(1)-1616(N) and/or grouped computing resources 1614. In at least one embodiment, resource orchestrator 1612 may include a software design infrastructure (SDI) management entity for the data center 1600. The resource orchestrator 1612 may include hardware, software, or some combination thereof.

In at least one embodiment, as shown in FIG. 16, framework layer 1620 may include a job scheduler 1632, a configuration manager 1634, a resource manager 1636, and/or a distributed file system 1638. The framework layer 1620 may include a framework to support software 1632 of software layer 1630 and/or one or more application(s) 1642 of application layer 1640. The software 1632 or application(s) 1642 may respectively include web-based service software or applications, such as those provided by Amazon Web Services, Google Cloud and Microsoft Azure. The framework layer 1620 may be, but is not limited to, a type of free and open-source software web application framework such as Apache Spark™ (hereinafter "Spark") that may utilize distributed file system 1638 for large-scale data processing (e.g., "big data"). In at least one embodiment, job scheduler 1632 may include a Spark driver to facilitate scheduling of workloads supported by various layers of data center 1600. The configuration manager 1634 may be capable of configuring different layers such as software layer 1630 and framework layer 1620 including Spark and distributed file system 1638 for supporting large-scale data processing. The resource manager 1636 may be capable of managing clustered or grouped computing resources mapped to or allocated for support of distributed file system 1638 and job scheduler 1632. In at least one embodiment, clustered or grouped computing resources may include grouped computing resource 1614 at data center infrastructure layer 1610. The resource manager 1636 may coordinate with resource orchestrator 1612 to manage these mapped or allocated computing resources.

In at least one embodiment, software 1632 included in software layer 1630 may include software used by at least portions of node C.R.s 1616(1)-1616(N), grouped computing resources 1614, and/or distributed file system 1638 of framework layer 1620. One or more types of software may include, but are not limited to, Internet web page search software, e-mail virus scan software, database software, and streaming video content software.

In at least one embodiment, application(s) 1642 included in application layer 1640 may include one or more types of applications used by at least portions of node C.R.s 1616 (1)-1616(N), grouped computing resources 1614, and/or distributed file system 1638 of framework layer 1620. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1634, resource manager 1636, and resource orchestrator 1612 may implement any number and type of self-modifying actions based on any amount and type of data acquired in any technically feasible fashion. Self-modifying actions may relieve a data center operator of data center 1600 from making possibly bad configuration decisions and possibly avoiding underutilized and/or poor performing portions of a data center.

The data center 1600 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described in the present disclosure with respect to the data center 1600. In at least one embodiment, trained or deployed machine learning models corresponding to one or more neural networks may be used to infer or predict information using resources described in the present disclosure with respect to the data center 1600 by using weight parameters calculated through one or more training techniques, such as but not limited to those described herein.

In at least one embodiment, the data center 1600 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described in the present disclosure may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1500 of FIG. 15—e.g., each device may include similar components, features, and/or functionality of the computing device(s) 1500. In addition, where backend devices (e.g., servers, NAS, etc.) are implemented, the backend devices may be included as part of a data center 1600, an example of which is described in more detail herein with respect to FIG. 16.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1500 described herein with respect to FIG. 15. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B. Additionally, use of the term "based on" should not be interpreted as "only based on" or "based only on." Rather, a first element being "based on" a second element includes instances in which the first element is based on the second element but may also be based on one or more additional elements.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:

one or more processing units to perform operations comprising:

identifying, based at least on a compute graph associated with a computing application that includes a set of runnables, a plurality of scheduling branches associated with scheduling execution of at least a subset of runnables of the set of runnables, the plurality of scheduling branches individually including candidate execution orderings of two or more runnables of the set of runnables as determined at least from corresponding branching points in the compute graph;

selecting a scheduling branch from the plurality of scheduling branches based at least on a coupling constraint that is applied to related runnables of at least the subset of runnables, wherein:

the related runnables include a first runnable that is designated for execution on a first compute engine and that triggers execution of a second runnable on a second compute engine, scheduling branches that include candidate execution orderings that violate the coupling constraint are removed from consideration for selection; and the application of the coupling constraint to the related runnables ensures that the scheduling branch, as selected, maintains that the first runnable as executed on the first compute engine triggers execution of the second runnable on the second compute engine; and determining, based at least on the scheduling branch as selected, a deterministic execution schedule of the set of runnables, the deterministic execution schedule being fixed across multiple different execution iterations of the computing application.

2. The system of claim 1, wherein the application of the coupling constraint to the related runnables further ensures that the scheduling branch, as selected, maintains that a first processing queue that includes the first runnable and that is on the first compute engine matches a second processing queue that includes the second runnable and that is on the second compute engine.

3. The system of claim 1, wherein the selecting of the scheduling branch is further based at least on one or more of:

a total time constraint related to respective execution times of the plurality of scheduling branches;

a runtime constraint related to minimum execution times of runnables that may trigger a scheduling branch;

a bubble avoidance constraint related to avoiding scheduling gaps;

a dependency constraint related to avoiding runnable dependency violations; or scheduling prioritization with respect to a critical path within a compute graph that includes the set of runnables.

4. The system of claim 3, wherein the total time constraint is based at least on an execution time of a previously determined execution schedule.

5. The system of claim 3, wherein the runtime constraint is reduced as compared to another runtime constraint that was used in determining a prior execution schedule.

6. The system of claim 1, wherein the operations further comprise determining an execution time of the scheduling branch, and further wherein the selecting of the scheduling branch is based at least on the execution time.

7. The system of claim 6, wherein the determining the execution time includes removing one or more execution constraints with respect to one or more runnables included in the scheduling branch.

8. The system of claim 1, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for presenting at least one of augmented reality content, virtual reality content, or mixed reality content;

a system for hosting one or more real-time streaming applications;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

9. A method comprising:

identifying, based at least on application data associated with a computing application that includes a set of runnables, a plurality of scheduling branches associated with scheduling execution of at least a subset of runnables of the set of runnables, the plurality of scheduling branches individually including candidate execution orderings of two or more runnables of the set of runnables as identified at least from the application data;

selecting, as a selected scheduling branch, a scheduling branch from the plurality of scheduling branches based at least on the candidate execution orderings of the selected scheduling branch satisfying a coupling constraint that is applied to related runnables of at least the subset of runnables; and determining, based at least on the selected scheduling branch, a deterministic execution schedule of the set of runnables, the deterministic execution schedule being fixed across multiple different execution iterations of the computing application.

10. The method of claim 9, wherein the coupling constraint requires that a first processing queue that includes a first runnable and that is on a first compute engine matches a second processing queue that includes a second runnable and that is on a second compute engine.

11. The method of claim 9, wherein the selecting of the selected scheduling branch is further based at least on one or more of:

a total time constraint related to respective execution times of the plurality of scheduling branches;

a runtime constraint related to minimum execution times of runnables that may trigger a scheduling branch;

a bubble avoidance constraint related to avoiding scheduling gaps;

a dependency constraint related to avoiding runnable dependency violations; or scheduling prioritization with respect to a critical path within a compute graph that includes the set of runnables.

12. The method of claim 11, wherein the total time constraint is based at least on an execution time of a previously determined execution schedule.

13. The method of claim 11, wherein the runtime constraint is reduced as compared to another runtime constraint that was used in determining a prior execution schedule.

14. The method of claim 9, further comprising determining an execution time of the selected scheduling branch, and further wherein the selecting of the selected scheduling branch is based at least on the execution time.

15. The method of claim 14, wherein the determining the execution time includes removing one or more execution constraints with respect to one or more runnables included in the selected scheduling branch.

16. One or more processors comprising:

processing circuitry to cause performance of operations comprising:

identifying, based at least on application data associated with a computing application that includes a set of runnables, a plurality of candidate scheduling branches that individually indicate execution orders of at least a subset of runnables of the set of runnables;

selecting, as a selected scheduling branch, a particular candidate scheduling branch from the plurality of candidate scheduling branches based at least on a coupling constraint, the selecting being such that the execution order corresponding to the selected scheduling branch maintains an execution relationship between related runnables of at least the subset of runnables as dictated by the coupling constraint; and determining, based at least on the selected scheduling branch, a deterministic execution schedule of the set of runnables, the deterministic execution schedule being fixed across multiple different execution iterations of the computing application.

17. The one or more processors of claim 16, wherein the coupling constraint further requires that a first processing queue that includes a first runnable and that is on a first compute engine matches a second processing queue that includes a second runnable and that is on a second compute engine.

18. The one or more processors of claim 16, wherein the selecting of the selected scheduling branch is further based at least on one or more of:

a total time constraint related to respective execution times of the plurality of scheduling branches;

a runtime constraint related to minimum execution times of runnables that may trigger a scheduling branch;

a bubble avoidance constraint related to avoiding scheduling gaps;

a dependency constraint related to avoiding runnable dependency violations; or scheduling prioritization with respect to a critical path within a compute graph that includes the set of runnables.

19. The one or more processors of claim 18, wherein the total time constraint is based at least on an execution time of a previously determined execution schedule.

20. The one or more processors of claim 16, wherein the operations further comprise determining an execution time of the selected scheduling branch, and further wherein the selecting of the selected scheduling branch is based at least on the execution time.

* * * * *